(12) United States Patent
Tentori et al.

(10) Patent No.: US 12,416,603 B2
(45) Date of Patent: Sep. 16, 2025

(54) ELECTROPHORESIS CASSETTES AND INSTRUMENTATION

(71) Applicant: 10x Genomics, Inc., Pleasanton, CA (US)

(72) Inventors: Augusto Manuel Tentori, Dublin, CA (US); Hanyoup Kim, Foster City, CA (US); Felice Alessio Bava, Rome (IT); Rajiv Bharadwaj, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 413 days.

(21) Appl. No.: 17/923,436

(22) PCT Filed: May 18, 2021

(86) PCT No.: PCT/US2021/032944
§ 371 (c)(1),
(2) Date: Nov. 4, 2022

(87) PCT Pub. No.: WO2021/236625
PCT Pub. Date: Nov. 25, 2021

(65) Prior Publication Data
US 2023/0194469 A1  Jun. 22, 2023

Related U.S. Application Data

(60) Provisional application No. 63/026,975, filed on May 19, 2020.

(51) Int. Cl.
*G01N 27/447* (2006.01)
*G01N 27/453* (2006.01)

(52) U.S. Cl.
CPC . *G01N 27/44713* (2013.01); *G01N 27/44782* (2013.01)

(58) Field of Classification Search
CPC ....... G01N 27/44713; G01N 27/44782; G01N 27/44739; G01N 27/44791
See application file for complete search history.

(56) References Cited

U.S. PATENT DOCUMENTS

| | | |
|---|---|---|
| 4,557,903 A | 12/1985 | McCormick |
| 4,574,729 A | 3/1986 | Wells |

(Continued)

FOREIGN PATENT DOCUMENTS

| | | |
|---|---|---|
| CA | 3054046 | 3/2020 |
| CN | 1425133 | 6/2003 |

(Continued)

OTHER PUBLICATIONS

10xGenomics.com, [online], "Visium Spatial Gene Expression Reagent Kits—User Guide," Jan. 2022, retrieved on Jun. 27, 2024, retrieved from URL<https://web.archive.org/web/20230326192142/https://www.10xgenomics.com/support/spatial-gene-expression-fresh-frozen/documentation/steps/library-construction/visium-spatial-gene-expression-reagent-kits-user-guide>, 71 pages.

(Continued)

*Primary Examiner* — Alexander S Noguerola
(74) *Attorney, Agent, or Firm* — Fish & Richardson P.C.

(57) ABSTRACT

Various implementations of electrophoretic systems and instruments are provided to improve electrophoresis and ease of use. Various electrophoretic systems and instruments utilize different electrode designs that can result in uniform electromigration of analytes. The electrophoretic systems and instrumentations optimize the size and/or location of electrodes relative to a sample, thereby increasing uniformity of electric field and reducing or minimizing drift of analyte migration. In addition, the electrophoresis systems and instruments provide a solution to conveniently check for electrical connections in the systems and instruments, and (Continued)

alert users of potential improper electrical connections, prior to performing electrophoresis.

20 Claims, 28 Drawing Sheets

(56) References Cited

U.S. PATENT DOCUMENTS

| | | | |
|---|---|---|---|
| 4,683,195 A | 7/1987 | Mullis | |
| 4,683,202 A | 7/1987 | Mullis | |
| 4,800,159 A | 1/1989 | Mullis | |
| 4,883,867 A | 11/1989 | Lee | |
| 4,965,188 A | 10/1990 | Mullis | |
| 5,002,882 A | 3/1991 | Lunnen | |
| 5,061,049 A | 10/1991 | Hornbeck | |
| 5,130,238 A | 7/1992 | Malek | |
| 5,183,053 A | 2/1993 | Yeh et al. | |
| 5,308,751 A | 5/1994 | Ohkawa | |
| 5,321,130 A | 6/1994 | Yue | |
| 5,410,030 A | 4/1995 | Yue | |
| 5,436,134 A | 7/1995 | Haugland | |
| 5,455,166 A | 10/1995 | Walker | |
| 5,494,810 A | 2/1996 | Barany et al. | |
| 5,503,980 A | 4/1996 | Cantor | |
| 5,512,439 A | 4/1996 | Hornes | |
| 5,512,462 A | 4/1996 | Cheng | |
| 5,559,032 A | 9/1996 | Pomeroy | |
| 5,582,977 A | 12/1996 | Yue | |
| 5,599,675 A | 2/1997 | Brenner | |
| 5,641,658 A | 6/1997 | Adams | |
| 5,648,245 A | 7/1997 | Fire et al. | |
| 5,658,751 A | 8/1997 | Yue | |
| 5,716,825 A | 2/1998 | Hancock et al. | |
| 5,750,341 A | 5/1998 | Macevicz | |
| 5,763,175 A | 6/1998 | Brenner | |
| 5,830,711 A | 11/1998 | Barany et al. | |
| 5,837,832 A | 11/1998 | Chee et al. | |
| 5,854,033 A | 12/1998 | Lizardi | |
| 5,863,753 A | 1/1999 | Haugland | |
| 5,871,921 A | 2/1999 | Landegren et al. | |
| 5,912,148 A | 6/1999 | Eggerding | |
| 6,013,440 A | 1/2000 | Lipshutz | |
| 6,027,889 A | 2/2000 | Barany et al. | |
| 6,060,240 A | 5/2000 | Kamb et al. | |
| 6,083,761 A | 7/2000 | Kedar et al. | |
| 6,130,073 A | 10/2000 | Eggerding | |
| 6,136,592 A | 10/2000 | Leighton | |
| 6,143,496 A | 11/2000 | Brown | |
| 6,153,389 A | 11/2000 | Haarer | |
| 6,157,432 A | 12/2000 | Helbing | |
| 6,165,714 A | 12/2000 | Lane et al. | |
| 6,210,891 B1 | 4/2001 | Nyren | |
| 6,210,894 B1 | 4/2001 | Brennan | |
| 6,214,587 B1 | 4/2001 | Dattagupta | |
| 6,221,654 B1 | 4/2001 | Quake | |
| 6,258,568 B1 | 7/2001 | Nyren | |
| 6,266,459 B1 | 7/2001 | Walt | |
| 6,274,320 B1 | 8/2001 | Rothberg | |
| 6,291,180 B1 | 9/2001 | Chu | |
| 6,300,063 B1 | 10/2001 | Lipshutz et al. | |
| 6,309,824 B1 | 10/2001 | Drmanac | |
| 6,337,472 B1 | 1/2002 | Garner et al. | |
| 6,344,316 B1 | 2/2002 | Lockhart | |
| 6,348,990 B1 | 2/2002 | Igasaki et al. | |
| 6,355,431 B1 | 3/2002 | Chee | |
| 6,368,801 B1 | 4/2002 | Faruqi | |
| 6,401,267 B1 | 6/2002 | Drmanac | |
| 6,404,907 B1 | 6/2002 | Gilchrist | |
| 6,432,360 B1 | 8/2002 | Church et al. | |
| 6,485,982 B1 | 11/2002 | Charlton | |
| 6,503,713 B1 | 1/2003 | Rana | |
| 6,506,561 B1 | 1/2003 | Cheval et al. | |
| 6,544,732 B1 | 4/2003 | Chee | |
| 6,565,727 B1 | 5/2003 | Shenderov | |
| 6,620,584 B1 | 9/2003 | Chee | |
| 6,632,641 B1 | 10/2003 | Brennan | |
| 6,673,620 B1 | 1/2004 | Loeffler | |
| 6,737,236 B1 | 5/2004 | Pieken et al. | |
| 6,770,441 B2 | 8/2004 | Dickinson | |
| 6,773,566 B2 | 8/2004 | Shenderov | |
| 6,773,886 B2 | 8/2004 | Kaufman | |
| 6,787,308 B2 | 9/2004 | Balasubramanian | |
| 6,800,453 B2 | 10/2004 | Labaer | |
| 6,812,005 B2 | 11/2004 | Fan et al. | |
| 6,828,100 B1 | 12/2004 | Ronaghi | |
| 6,833,246 B2 | 12/2004 | Balasubramanian | |
| 6,859,570 B2 | 2/2005 | Walt | |
| 6,864,052 B1 | 3/2005 | Drmanac | |
| 6,897,023 B2 | 5/2005 | Fu | |
| 6,911,132 B2 | 6/2005 | Pamula | |
| 6,911,345 B2 | 6/2005 | Quake | |
| 6,913,921 B2 | 7/2005 | Fischer | |
| 6,942,968 B1 | 9/2005 | Dickinson et al. | |
| 6,969,488 B2 | 11/2005 | Bridgham | |
| 6,977,033 B2 | 12/2005 | Becker | |
| 7,001,792 B2 | 2/2006 | Sauer et al. | |
| 7,052,244 B2 | 5/2006 | Fouillet | |
| 7,057,026 B2 | 6/2006 | Barnes | |
| 7,098,041 B2 | 8/2006 | Kaylor et al. | |
| 7,115,400 B1 | 10/2006 | Adessi | |
| 7,118,883 B2 | 10/2006 | Inoue | |
| 7,163,612 B2 | 1/2007 | Sterling | |
| 7,166,431 B2 | 1/2007 | Chee et al. | |
| 7,211,414 B2 | 5/2007 | Hardin | |
| 7,223,371 B2 | 5/2007 | Hayenga et al. | |
| 7,244,559 B2 | 7/2007 | Rothberg | |
| 7,255,994 B2 | 8/2007 | Lao | |
| 7,258,976 B2 | 8/2007 | Mitsuhashi | |
| 7,264,929 B2 | 9/2007 | Rothberg | |
| 7,297,518 B2 | 11/2007 | Quake | |
| 7,328,979 B2 | 2/2008 | Decre | |
| 7,329,492 B2 | 2/2008 | Hardin | |
| 7,361,488 B2 | 4/2008 | Fan et al. | |
| 7,378,242 B2 | 5/2008 | Hurt | |
| 7,393,665 B2 | 7/2008 | Brenner | |
| 7,405,281 B2 | 7/2008 | Xu | |
| 7,407,757 B2 | 8/2008 | Brenner | |
| 7,456,012 B2 | 11/2008 | Ryttsen et al. | |
| 7,462,449 B2 | 12/2008 | Quake | |
| 7,500,637 B2 * | 3/2009 | Marimon | B64B 1/60 244/128 |
| 7,501,245 B2 | 3/2009 | Quake | |
| 7,510,637 B2 | 3/2009 | Barlow et al. | |
| 7,537,897 B2 | 5/2009 | Brenner | |
| 7,547,380 B2 | 6/2009 | Velev | |
| 7,561,336 B2 | 7/2009 | Osaka et al. | |
| 7,563,576 B2 | 7/2009 | Chee | |
| 7,582,420 B2 | 9/2009 | Oliphant et al. | |
| 7,595,883 B1 | 9/2009 | El Gamal | |
| 7,601,492 B2 | 10/2009 | Fu et al. | |
| 7,601,498 B2 | 10/2009 | Mao | |
| 7,635,566 B2 | 12/2009 | Brenner | |
| 7,641,779 B2 | 1/2010 | Becker | |
| 7,674,752 B2 | 3/2010 | He | |
| 7,709,198 B2 | 5/2010 | Luo et al. | |
| 7,741,106 B2 * | 6/2010 | Moyle | G01N 33/54373 435/6.12 |
| 7,776,567 B2 | 8/2010 | Mao | |
| 7,785,869 B2 | 8/2010 | Belgrader et al. | |
| 7,803,943 B2 | 9/2010 | Mao | |
| 7,858,321 B2 | 12/2010 | Glezer | |
| 7,910,304 B2 | 3/2011 | Drmanac | |
| 7,955,794 B2 | 6/2011 | Shen et al. | |
| 7,960,119 B2 | 6/2011 | Chee | |
| 8,003,354 B2 | 8/2011 | Shen et al. | |
| 8,148,068 B2 | 4/2012 | Brenner | |
| 8,206,917 B2 | 6/2012 | Chee | |
| 8,278,034 B2 | 10/2012 | Muraca | |
| 8,288,103 B2 | 10/2012 | Oliphant | |
| 8,330,087 B2 | 12/2012 | Domenicali | |
| 8,460,865 B2 | 6/2013 | Chee | |
| 8,481,257 B2 | 7/2013 | Van Eijk | |
| 8,603,743 B2 | 12/2013 | Liu et al. | |
| 8,604,182 B2 | 12/2013 | Luo et al. | |

(56) References Cited

U.S. PATENT DOCUMENTS

| | | |
|---|---|---|
| 8,637,242 B2 | 1/2014 | Shen |
| 8,778,849 B2 | 7/2014 | Bowen |
| 8,815,512 B2 | 8/2014 | Van Eijk |
| 8,835,358 B2 | 9/2014 | Fodor |
| 8,900,529 B2 | 12/2014 | Shaikh et al. |
| 8,911,945 B2 | 12/2014 | Van Eijk |
| 8,951,726 B2 | 2/2015 | Luo et al. |
| 8,951,781 B2 | 2/2015 | Reed |
| 9,062,348 B1 | 6/2015 | Van Eijk |
| 9,194,001 B2 | 11/2015 | Brenner |
| 9,201,063 B2 | 12/2015 | Sood et al. |
| 9,290,808 B2 | 3/2016 | Fodor |
| 9,290,809 B2 | 3/2016 | Fodor |
| 9,328,383 B2 | 5/2016 | Van Eijk |
| 9,334,536 B2 | 5/2016 | Van Eijk |
| 9,371,598 B2 | 6/2016 | Chee |
| 9,416,409 B2 | 8/2016 | Hayden |
| 9,506,061 B2 | 11/2016 | Brown et al. |
| 9,557,330 B2 | 1/2017 | Siciliano et al. |
| 9,582,877 B2 | 2/2017 | Fu |
| 9,593,365 B2 | 3/2017 | Frisen et al. |
| 9,644,204 B2 | 5/2017 | Hindson et al. |
| 9,694,361 B2 | 7/2017 | Bharadwaj |
| 9,702,004 B2 | 7/2017 | Van Eijk |
| 9,727,810 B2 | 8/2017 | Fodor et al. |
| 9,777,324 B2 | 10/2017 | Van Eijk |
| 9,783,841 B2 | 10/2017 | Nolan et al. |
| 9,799,992 B2 | 10/2017 | Hirose et al. |
| 9,834,814 B2 | 12/2017 | Peter et al. |
| 9,850,536 B2 | 12/2017 | Oliphant et al. |
| 9,868,979 B2 | 1/2018 | Chee et al. |
| 9,879,313 B2 | 1/2018 | Chee et al. |
| 9,975,122 B2 | 5/2018 | Masquelier et al. |
| 10,002,316 B2 | 6/2018 | Fodor et al. |
| 10,023,907 B2 | 7/2018 | Van Eijk |
| 10,030,261 B2 | 7/2018 | Frisen et al. |
| 10,032,064 B2 | 7/2018 | Hoyt |
| 10,041,949 B2 | 8/2018 | Bendall et al. |
| 10,053,723 B2 | 8/2018 | Hindson et al. |
| 10,059,990 B2 | 8/2018 | Boyden et al. |
| 10,071,377 B2 | 9/2018 | Bharadwaj et al. |
| 10,208,982 B2 | 2/2019 | Bannish et al. |
| 10,246,700 B2 | 4/2019 | Dunaway et al. |
| 10,266,888 B2 | 4/2019 | Daugharthy et al. |
| 10,273,541 B2 | 4/2019 | Hindson et al. |
| 10,308,982 B2 | 6/2019 | Chee |
| 10,357,771 B2 | 7/2019 | Bharadwaj |
| 10,472,669 B2 | 11/2019 | Chee |
| 10,480,022 B2 | 11/2019 | Chee |
| 10,480,029 B2 | 11/2019 | Bent et al. |
| 10,494,667 B2 | 12/2019 | Chee |
| 10,495,554 B2 | 12/2019 | Deisseroth et al. |
| 10,550,429 B2 | 2/2020 | Harada et al. |
| 10,590,244 B2 | 3/2020 | Delaney et al. |
| 10,662,468 B2 | 5/2020 | Chee |
| 10,724,078 B2 | 7/2020 | Van Driel et al. |
| 10,725,027 B2 | 7/2020 | Bell |
| 10,774,372 B2 | 9/2020 | Chee et al. |
| 10,774,374 B2 | 9/2020 | Frisen et al. |
| 10,787,701 B2 | 9/2020 | Chee |
| 10,858,702 B2 | 12/2020 | Lucero et al. |
| 10,913,975 B2 | 2/2021 | So et al. |
| 10,914,730 B2 | 2/2021 | Chee et al. |
| 10,927,403 B2 | 2/2021 | Chee et al. |
| 10,961,566 B2 | 3/2021 | Chee |
| 11,001,879 B1 | 5/2021 | Chee |
| 11,008,607 B2 | 5/2021 | Chee |
| 11,046,996 B1 | 6/2021 | Chee et al. |
| 11,067,567 B2 | 7/2021 | Chee |
| 11,156,603 B2 | 10/2021 | Chee |
| 11,162,132 B2 | 11/2021 | Frisen et al. |
| 11,208,684 B2 | 12/2021 | Chee |
| 11,214,796 B2 | 1/2022 | Shirai et al. |
| 11,286,515 B2 | 3/2022 | Chee et al. |
| 11,293,917 B2 | 4/2022 | Chee |
| 11,299,774 B2 | 4/2022 | Frisen et al. |
| 11,313,856 B2 | 4/2022 | Chee |
| 11,332,790 B2 | 5/2022 | Chell et al. |
| 11,352,659 B2 | 6/2022 | Frisen et al. |
| 11,352,667 B2 | 6/2022 | Hauling et al. |
| 11,359,228 B2 | 6/2022 | Chee et al. |
| 11,365,442 B2 | 6/2022 | Chee |
| 11,371,086 B2 | 6/2022 | Chee |
| 11,384,386 B2 | 7/2022 | Chee |
| 11,390,912 B2 | 7/2022 | Frisen et al. |
| 11,401,545 B2 | 8/2022 | Chee |
| 11,407,992 B2 | 8/2022 | Dadhwal |
| 11,408,029 B2 | 8/2022 | Katiraee et al. |
| 11,434,524 B2 | 9/2022 | Ramachandran Iyer et al. |
| 11,459,607 B1 | 10/2022 | Terry et al. |
| 11,479,809 B2 | 10/2022 | Frisen et al. |
| 11,479,810 B1 | 10/2022 | Chee |
| 11,492,612 B1 | 11/2022 | Dadhwal |
| 11,501,440 B2 | 11/2022 | Weisenfeld et al. |
| 11,505,828 B2 | 11/2022 | Chell et al. |
| 11,512,308 B2 | 11/2022 | Gallant et al. |
| 11,519,022 B2 | 12/2022 | Chee |
| 11,519,033 B2 | 12/2022 | Schnall-Levin et al. |
| 11,530,438 B2 | 12/2022 | Persson et al. |
| 11,535,887 B2 | 12/2022 | Gallant et al. |
| 11,542,543 B2 | 1/2023 | Chee |
| 11,549,138 B2 | 1/2023 | Chee |
| 11,560,587 B2 | 1/2023 | Chee |
| 11,560,592 B2 | 1/2023 | Chew et al. |
| 11,560,593 B2 | 1/2023 | Chell et al. |
| 11,592,447 B2 | 2/2023 | Uytingco et al. |
| 11,608,498 B2 | 3/2023 | Gallant et al. |
| 11,608,520 B2 | 3/2023 | Galonska et al. |
| 11,613,773 B2 | 3/2023 | Frisen et al. |
| 11,618,897 B2 | 4/2023 | Kim et al. |
| 11,618,918 B2 | 4/2023 | Chee et al. |
| 11,624,063 B2 | 4/2023 | Dadhwal |
| 11,624,086 B2 | 4/2023 | Uytingco et al. |
| 11,634,756 B2 | 4/2023 | Chee |
| 11,649,485 B2 | 5/2023 | Yin et al. |
| 11,661,626 B2 | 5/2023 | Katiraee et al. |
| 11,680,260 B2 | 6/2023 | Kim et al. |
| 11,692,218 B2 | 7/2023 | Engblom et al. |
| 11,702,693 B2 | 7/2023 | Bharadwaj |
| 11,702,698 B2 | 7/2023 | Stoeckius |
| 11,713,480 B2 | 8/2023 | Lee |
| 11,732,292 B2 | 8/2023 | Chee |
| 11,732,299 B2 | 8/2023 | Ramachandran Iyer |
| 11,732,300 B2 | 8/2023 | Bava |
| 11,733,238 B2 | 8/2023 | Chee |
| 11,739,372 B2 | 8/2023 | Frisen et al. |
| 11,739,381 B2 | 8/2023 | Chew et al. |
| 11,753,673 B2 | 9/2023 | Chew et al. |
| 11,753,674 B2 | 9/2023 | Chee et al. |
| 11,753,675 B2 | 9/2023 | Ramachandran Iyer |
| 11,761,030 B2 | 9/2023 | Chee |
| 11,761,038 B1 | 9/2023 | Stoeckius |
| 11,767,550 B2 | 9/2023 | Chee |
| 11,768,175 B1 | 9/2023 | Kim et al. |
| 11,773,433 B2 | 10/2023 | Gallant et al. |
| 11,781,130 B2 | 10/2023 | Dadhwal |
| 11,788,122 B2 | 10/2023 | Frisen et al. |
| 11,795,498 B2 | 10/2023 | Frisen et al. |
| 11,795,507 B2 | 10/2023 | Chell et al. |
| 11,808,769 B2 | 11/2023 | Uytingco et al. |
| 11,821,024 B2 | 11/2023 | Chee et al. |
| 11,821,035 B1 | 11/2023 | Bent et al. |
| 11,827,935 B1 | 11/2023 | Ramachandran Iyer et al. |
| 11,835,462 B2 | 12/2023 | Bava |
| 11,840,687 B2 | 12/2023 | Gallant et al. |
| 11,840,724 B2 | 12/2023 | Chew et al. |
| 11,845,979 B2 | 12/2023 | Engblom et al. |
| 11,859,178 B2 | 1/2024 | Gallant et al. |
| 11,866,767 B2 | 1/2024 | Uytingco et al. |
| 11,866,770 B2 | 1/2024 | Chee |
| 11,873,482 B2 | 1/2024 | Kim et al. |
| 11,891,654 B2 | 2/2024 | Alvarado Martinez et al. |
| 11,898,205 B2 | 2/2024 | Bava |
| 11,926,822 B1 | 3/2024 | Gohil et al. |

(56) References Cited

U.S. PATENT DOCUMENTS

| | | |
|---|---|---|
| 11,926,863 B1 | 3/2024 | Boutet |
| 11,926,867 B2 | 3/2024 | Yin et al. |
| 11,933,957 B1 | 3/2024 | Tentori et al. |
| 11,952,627 B2 | 4/2024 | Stoeckius |
| 11,959,076 B2 | 4/2024 | Kim et al. |
| 11,959,130 B2 | 4/2024 | Galonska et al. |
| 11,965,213 B2 | 4/2024 | Williams |
| 11,970,739 B2 | 4/2024 | Chew et al. |
| 11,981,958 B1 | 5/2024 | Galonska |
| 11,981,960 B1 | 5/2024 | Lin et al. |
| 11,981,965 B2 | 5/2024 | Chell et al. |
| RE50,065 E | 7/2024 | Frisen et al. |
| 12,024,741 B2 | 7/2024 | Tentori et al. |
| 12,031,177 B1 | 7/2024 | Tentori et al. |
| 12,060,604 B2 | 8/2024 | Katiraee et al. |
| 12,071,655 B2 | 8/2024 | Sukovich et al. |
| 12,076,701 B2 | 9/2024 | Bava |
| 12,098,417 B2 | 9/2024 | Engblom et al. |
| 12,098,985 B2 | 9/2024 | Cox et al. |
| 12,110,541 B2 | 10/2024 | Bava |
| 12,117,439 B2 | 10/2024 | Delaney et al. |
| 12,128,403 B2 | 10/2024 | Kim et al. |
| 12,129,516 B2 | 10/2024 | Tentori et al. |
| 12,157,124 B2 | 12/2024 | Cox et al. |
| 12,180,543 B2 | 12/2024 | Uytingco et al. |
| 12,195,790 B2 | 1/2025 | Sukovich et al. |
| 12,203,134 B2 | 1/2025 | Nagendran et al. |
| 12,209,280 B1 | 1/2025 | Mignardi et al. |
| 12,223,751 B2 | 2/2025 | Li et al. |
| 12,228,544 B2 | 2/2025 | Kim et al. |
| 12,234,505 B2 | 2/2025 | Chee |
| 12,241,060 B2 | 3/2025 | Kim et al. |
| 12,241,890 B2 | 3/2025 | Delaney et al. |
| 12,249,085 B2 | 3/2025 | Tentori et al. |
| 12,265,079 B1 | 4/2025 | Bent |
| 12,270,077 B2 | 4/2025 | Schnall-Levin et al. |
| 12,275,988 B2 | 4/2025 | Galonska et al. |
| 12,281,357 B1 | 4/2025 | Tentori et al. |
| 12,286,673 B2 | 4/2025 | Bava |
| 12,287,264 B2 | 4/2025 | Cox et al. |
| 12,297,486 B2 | 5/2025 | Patterson et al. |
| 12,297,487 B2 | 5/2025 | Chee |
| 12,297,488 B2 | 5/2025 | Chee |
| 12,344,892 B2 | 7/2025 | Schnall-Levin et al. |
| 2002/0022261 A1 | 2/2002 | Anderson et al. |
| 2002/0040275 A1 | 4/2002 | Cravatt |
| 2002/0045272 A1 | 4/2002 | McDevitt et al. |
| 2002/0150909 A1 | 10/2002 | Stuelpnagel |
| 2002/0164611 A1 | 11/2002 | Bamdad |
| 2003/0017451 A1 | 1/2003 | Wang et al. |
| 2003/0022207 A1 | 1/2003 | Balasubramanian |
| 2003/0113713 A1 | 6/2003 | Glezer |
| 2003/0148335 A1 | 8/2003 | Shen et al. |
| 2003/0162216 A1 | 8/2003 | Gold |
| 2003/0175947 A1 | 9/2003 | Liu et al. |
| 2003/0190744 A1 | 10/2003 | McGarry et al. |
| 2003/0205632 A1 | 11/2003 | Kim et al. |
| 2003/0211489 A1 | 11/2003 | Shen et al. |
| 2003/0215936 A1 | 11/2003 | Kallioniemi et al. |
| 2003/0224419 A1 | 12/2003 | Corcoran |
| 2003/0232348 A1 | 12/2003 | Jones et al. |
| 2003/0232382 A1 | 12/2003 | Brennan |
| 2004/0033499 A1 | 2/2004 | Ilsley et al. |
| 2004/0050699 A1 | 3/2004 | Goncalves |
| 2004/0067492 A1 | 4/2004 | Peng et al. |
| 2004/0082058 A1 | 4/2004 | Schleifer et al. |
| 2004/0096853 A1 | 5/2004 | Mayer |
| 2004/0106110 A1 | 6/2004 | Balasubramanian |
| 2004/0112442 A1 | 6/2004 | Maerkl |
| 2004/0121456 A1 | 6/2004 | Fischer |
| 2004/0219588 A1 | 11/2004 | Furuta |
| 2004/0248287 A1 | 12/2004 | Hu et al. |
| 2005/0037393 A1 | 2/2005 | Gunderson et al. |
| 2005/0048580 A1 | 3/2005 | Labaer |
| 2005/0100900 A1 | 5/2005 | Kawashima et al. |
| 2005/0106617 A1 | 5/2005 | Besemer et al. |
| 2005/0130173 A1 | 6/2005 | Leamon et al. |
| 2005/0136414 A1 | 6/2005 | Gunderson et al. |
| 2005/0170373 A1 | 8/2005 | Monforte |
| 2005/0179746 A1 | 8/2005 | Roux et al. |
| 2005/0191656 A1 | 9/2005 | Drmanac et al. |
| 2005/0191698 A1 | 9/2005 | Chee et al. |
| 2005/0202433 A1 | 9/2005 | Van Beuningen |
| 2005/0226780 A1 | 10/2005 | Sandell et al. |
| 2005/0227271 A1 | 10/2005 | Kwon |
| 2005/0239192 A1 | 10/2005 | Nasarabadi et al. |
| 2005/0260653 A1 | 11/2005 | LaBaer |
| 2006/0039823 A1 | 2/2006 | Yamakawa et al. |
| 2006/0041385 A1 | 2/2006 | Bauer et al. |
| 2006/0063160 A1 | 3/2006 | West et al. |
| 2006/0127946 A1 | 6/2006 | Montagu et al. |
| 2006/0134669 A1 | 6/2006 | Casasanta |
| 2006/0164490 A1 | 7/2006 | Kim et al. |
| 2006/0180489 A1 | 8/2006 | Guiney et al. |
| 2006/0194331 A1 | 8/2006 | Pamula et al. |
| 2006/0211001 A1 | 9/2006 | Yu et al. |
| 2006/0216775 A1 | 9/2006 | Burkart et al. |
| 2006/0263789 A1 | 11/2006 | Kincaid |
| 2007/0020640 A1 | 1/2007 | McCloskey et al. |
| 2007/0023292 A1 | 2/2007 | Kim et al. |
| 2007/0036511 A1 | 2/2007 | Lundquist et al. |
| 2007/0054288 A1 | 3/2007 | Su et al. |
| 2007/0099208 A1 | 5/2007 | Drmanac et al. |
| 2007/0116612 A1 | 5/2007 | Williamson |
| 2007/0128071 A1 | 6/2007 | Shea et al. |
| 2007/0128624 A1 | 6/2007 | Gormley et al. |
| 2007/0128656 A1 | 6/2007 | Agrawal |
| 2007/0166725 A1 | 7/2007 | McBride et al. |
| 2007/0172873 A1 | 7/2007 | Brenner et al. |
| 2007/0184456 A1 | 8/2007 | Chee et al. |
| 2007/0207482 A1 | 9/2007 | Church et al. |
| 2007/0215466 A1 | 9/2007 | Okada |
| 2007/0243634 A1 | 10/2007 | Pamula et al. |
| 2007/0254305 A1 | 11/2007 | Paik et al. |
| 2007/0269805 A1 | 11/2007 | Hogers |
| 2008/0009071 A1 | 1/2008 | Sogard |
| 2008/0009420 A1 | 1/2008 | Schroth et al. |
| 2008/0043235 A1 | 2/2008 | Oldham et al. |
| 2008/0108804 A1 | 5/2008 | Hayashizaki et al. |
| 2008/0160580 A1 | 7/2008 | Adessi et al. |
| 2008/0218838 A1 | 9/2008 | Rey-Mermet |
| 2008/0220434 A1 | 9/2008 | Thomas |
| 2008/0261204 A1 | 10/2008 | Lexow |
| 2008/0286795 A1 | 11/2008 | Kawashima et al. |
| 2009/0005252 A1 | 1/2009 | Drmanac et al. |
| 2009/0006002 A1 | 1/2009 | Honisch et al. |
| 2009/0011943 A1 | 1/2009 | Drmanac et al. |
| 2009/0018024 A1 | 1/2009 | Church et al. |
| 2009/0023148 A1 | 1/2009 | Moyle et al. |
| 2009/0026082 A1 | 1/2009 | Rothberg et al. |
| 2009/0082212 A1 | 3/2009 | Williams |
| 2009/0099041 A1 | 4/2009 | Church et al. |
| 2009/0105959 A1 | 4/2009 | Braverman et al. |
| 2009/0117573 A1 | 5/2009 | Fu et al. |
| 2009/0127589 A1 | 5/2009 | Rothberg et al. |
| 2009/0155781 A1 | 6/2009 | Drmanac et al. |
| 2009/0169089 A1 | 7/2009 | Hunt et al. |
| 2009/0192044 A1 | 7/2009 | Fouillet |
| 2009/0197326 A1* | 8/2009 | El Gamal ............... C12Q 1/66 435/287.2 |
| 2009/0233802 A1 | 9/2009 | Bignell et al. |
| 2009/0239232 A1 | 9/2009 | Kurn |
| 2009/0253163 A1 | 10/2009 | Xie et al. |
| 2009/0253581 A1 | 10/2009 | van Eijk et al. |
| 2009/0253582 A1 | 10/2009 | Pena et al. |
| 2009/0270273 A1 | 10/2009 | Burns et al. |
| 2009/0291854 A1 | 11/2009 | Weisinger-Mayr et al. |
| 2009/0312193 A1 | 12/2009 | Kim et al. |
| 2009/0321262 A1 | 12/2009 | Adachi et al. |
| 2010/0009871 A1 | 1/2010 | Reed et al. |
| 2010/0031757 A1 | 2/2010 | Hoyer |
| 2010/0035249 A1 | 2/2010 | Hayashizaki et al. |
| 2010/0096266 A1 | 4/2010 | Kim et al. |
| 2010/0111768 A1 | 5/2010 | Banerjee et al. |

(56) References Cited

U.S. PATENT DOCUMENTS

| | | |
|---|---|---|
| 2010/0120097 A1 | 5/2010 | Matz et al. |
| 2010/0120098 A1 | 5/2010 | Grunenwald et al. |
| 2010/0126862 A1 | 5/2010 | Sabin et al. |
| 2010/0145037 A1 | 6/2010 | Brive et al. |
| 2010/0151511 A1 | 6/2010 | Gereenizer et al. |
| 2010/0267590 A1 | 10/2010 | Grudzien et al. |
| 2010/0273219 A1 | 10/2010 | May et al. |
| 2010/0273679 A1 | 10/2010 | Cuppoletti et al. |
| 2010/0282617 A1 | 11/2010 | Rothberg et al. |
| 2011/0028685 A1 | 2/2011 | Purkayastha et al. |
| 2011/0048951 A1 | 3/2011 | Wu |
| 2011/0059436 A1 | 3/2011 | Hardin et al. |
| 2011/0090563 A1 | 4/2011 | Krasov |
| 2011/0177518 A1 | 7/2011 | Kartalov et al. |
| 2011/0244448 A1 | 10/2011 | Shirai et al. |
| 2011/0245111 A1 | 10/2011 | Chee |
| 2012/0135871 A1 | 5/2012 | van Eijk et al. |
| 2012/0160683 A1 | 6/2012 | Ye et al. |
| 2012/0177543 A1 | 7/2012 | Battrell |
| 2012/0195810 A1 | 8/2012 | Cohen et al. |
| 2012/0202698 A1 | 8/2012 | van Eijk et al. |
| 2012/0270305 A1 | 10/2012 | Reed et al. |
| 2012/0279954 A1 | 11/2012 | Ceremony et al. |
| 2013/0053273 A1 | 2/2013 | Juncker et al. |
| 2013/0065788 A1 | 3/2013 | Glezer et al. |
| 2013/0146459 A1 | 6/2013 | Bazant et al. |
| 2013/0171621 A1 | 7/2013 | Luo et al. |
| 2013/0203100 A1 | 8/2013 | Otter et al. |
| 2013/0252847 A1 | 9/2013 | McKenna et al. |
| 2013/0260372 A1 | 10/2013 | Buermann et al. |
| 2013/0296174 A1 | 11/2013 | Peumans |
| 2014/0011707 A1 | 1/2014 | Ye et al. |
| 2014/0066318 A1 | 3/2014 | Frisen et al. |
| 2014/0155295 A1 | 6/2014 | Hindson et al. |
| 2014/0270435 A1 | 9/2014 | Dunn |
| 2014/0274731 A1 | 9/2014 | Raymond et al. |
| 2014/0323330 A1 | 10/2014 | Glezer et al. |
| 2014/0378350 A1 | 12/2014 | Hindson et al. |
| 2015/0000854 A1 | 1/2015 | Gann-Fetter et al. |
| 2015/0292988 A1 | 10/2015 | Bharadwaj et al. |
| 2015/0298091 A1 | 10/2015 | Weitz et al. |
| 2015/0344942 A1 | 12/2015 | Frisen et al. |
| 2016/0033496 A1 | 2/2016 | Chou et al. |
| 2016/0108458 A1 | 4/2016 | Frei et al. |
| 2016/0138091 A1 | 5/2016 | Chee et al. |
| 2016/0145677 A1 | 5/2016 | Chee et al. |
| 2016/0253584 A1 | 9/2016 | Fodor et al. |
| 2016/0289669 A1 | 10/2016 | Fan et al. |
| 2016/0289740 A1 | 10/2016 | Fu et al. |
| 2016/0298180 A1 | 10/2016 | Chee |
| 2016/0299165 A1 | 10/2016 | Zhou |
| 2017/0016053 A1 | 1/2017 | Beechem et al. |
| 2017/0029875 A1 | 2/2017 | Zhang et al. |
| 2017/0067096 A1 | 3/2017 | Wassie et al. |
| 2017/0089811 A1 | 3/2017 | Tillberg et al. |
| 2017/0159109 A1 | 6/2017 | Zheng et al. |
| 2017/0220733 A1 | 8/2017 | Zhuang et al. |
| 2017/0241911 A1 | 8/2017 | Rockel et al. |
| 2017/0342405 A1 | 11/2017 | Fu et al. |
| 2017/0349940 A1 | 12/2017 | Morin et al. |
| 2018/0051322 A1 | 2/2018 | Church et al. |
| 2018/0052082 A1 | 2/2018 | Groll et al. |
| 2018/0057873 A1 | 3/2018 | Zhou et al. |
| 2018/0074039 A1 | 3/2018 | Soper et al. |
| 2018/0080876 A1 | 3/2018 | Rockel et al. |
| 2018/0088112 A1 | 3/2018 | Fan et al. |
| 2018/0095067 A1 | 4/2018 | Huff et al. |
| 2018/0104694 A1 | 4/2018 | Huff et al. |
| 2018/0104964 A1 | 4/2018 | Uemura et al. |
| 2018/0112248 A1 | 4/2018 | Lam et al. |
| 2018/0112261 A1 | 4/2018 | Van Driel et al. |
| 2018/0120255 A1 | 5/2018 | Wu et al. |
| 2018/0201980 A1 | 7/2018 | Chee et al. |
| 2018/0216161 A1 | 8/2018 | Chen et al. |
| 2018/0216162 A1 | 8/2018 | Belhocine et al. |
| 2018/0217094 A1 | 8/2018 | Herr et al. |
| 2018/0245142 A1 | 8/2018 | So et al. |
| 2018/0251833 A1 | 9/2018 | Daugharthy et al. |
| 2018/0291439 A1 | 10/2018 | van Eijk et al. |
| 2018/0305681 A1 | 10/2018 | Jovanovich et al. |
| 2018/0334670 A1 | 11/2018 | Bharadwaj et al. |
| 2019/0055594 A1 | 2/2019 | Samusik et al. |
| 2019/0064173 A1 | 2/2019 | Bharadwaj et al. |
| 2019/0085383 A1 | 3/2019 | Church et al. |
| 2019/0099754 A1 | 4/2019 | Dupouy et al. |
| 2019/0113532 A1 | 4/2019 | Tan et al. |
| 2019/0126280 A1 | 5/2019 | Gach et al. |
| 2019/0155835 A1 | 5/2019 | Daugharthy et al. |
| 2019/0161796 A1 | 5/2019 | Hauling et al. |
| 2019/0177777 A1 | 6/2019 | Chee |
| 2019/0177778 A1 | 6/2019 | Chee |
| 2019/0177789 A1 | 6/2019 | Hindson et al. |
| 2019/0177800 A1 | 6/2019 | Boutet et al. |
| 2019/0194709 A1 | 6/2019 | Church et al. |
| 2019/0201891 A1 | 7/2019 | Pallas et al. |
| 2019/0203275 A1 | 7/2019 | Frisen et al. |
| 2019/0218276 A1 | 7/2019 | Regev et al. |
| 2019/0233878 A1 | 8/2019 | Delaney et al. |
| 2019/0249226 A1 | 8/2019 | Bent et al. |
| 2019/0262831 A1 | 8/2019 | West et al. |
| 2019/0264268 A1 | 8/2019 | Frisen et al. |
| 2019/0271030 A1 | 9/2019 | Chee |
| 2019/0271031 A1 | 9/2019 | Chee |
| 2019/0300943 A1 | 10/2019 | Chee et al. |
| 2019/0300944 A1 | 10/2019 | Chee et al. |
| 2019/0300945 A1 | 10/2019 | Chee et al. |
| 2019/0309353 A1 | 10/2019 | Chee |
| 2019/0309354 A1 | 10/2019 | Chee |
| 2019/0309355 A1 | 10/2019 | Chee |
| 2019/0323071 A1 | 10/2019 | Chee |
| 2019/0323088 A1 | 10/2019 | Boutet et al. |
| 2019/0330617 A1 | 10/2019 | Church et al. |
| 2019/0338353 A1 | 11/2019 | Belgrader et al. |
| 2019/0367969 A1 | 12/2019 | Belhocine et al. |
| 2019/0367982 A1 | 12/2019 | Belhocine et al. |
| 2019/0367997 A1 | 12/2019 | Bent et al. |
| 2020/0002763 A1 | 1/2020 | Belgrader et al. |
| 2020/0024641 A1 | 1/2020 | Nolan et al. |
| 2020/0047010 A1 | 2/2020 | Lee et al. |
| 2020/0048690 A1 | 2/2020 | Chee |
| 2020/0049599 A1 | 2/2020 | Alexander et al. |
| 2020/0063191 A1 | 2/2020 | Kennedy-Darling et al. |
| 2020/0063195 A1 | 2/2020 | Chee |
| 2020/0063196 A1 | 2/2020 | Chee |
| 2020/0071751 A1 | 3/2020 | Daugharthy et al. |
| 2020/0080136 A1 | 3/2020 | Zhang et al. |
| 2020/0109443 A1 | 4/2020 | Chee |
| 2020/0173985 A1 | 6/2020 | Dong et al. |
| 2020/0224244 A1 | 7/2020 | Nilsson et al. |
| 2020/0239946 A1 | 7/2020 | Dewal |
| 2020/0256867 A1 | 8/2020 | Hennek et al. |
| 2020/0277663 A1 | 9/2020 | Iyer |
| 2020/0277664 A1 | 9/2020 | Frenz |
| 2020/0298241 A1 | 9/2020 | Kabaha et al. |
| 2020/0299757 A1 | 9/2020 | Chee et al. |
| 2020/0325531 A1 | 10/2020 | Chee |
| 2020/0370095 A1 | 11/2020 | Farmer et al. |
| 2020/0393343 A1 | 12/2020 | Kennedy-Darling et al. |
| 2020/0399687 A1 | 12/2020 | Frisen et al. |
| 2020/0407781 A1 | 12/2020 | Schnall-Levin |
| 2021/0010068 A1 | 1/2021 | Chee et al. |
| 2021/0010070 A1 | 1/2021 | Schnall-Levin et al. |
| 2021/0095331 A1 | 4/2021 | Fan et al. |
| 2021/0123040 A1 | 4/2021 | Macosko et al. |
| 2021/0130881 A1 | 5/2021 | Cox |
| 2021/0140982 A1 | 5/2021 | Uytingco et al. |
| 2021/0150707 A1 | 5/2021 | Weisenfeld et al. |
| 2021/0155982 A1 | 5/2021 | Yin et al. |
| 2021/0158522 A1 | 5/2021 | Weisenfeld et al. |
| 2021/0172007 A1 | 6/2021 | Chee et al. |
| 2021/0189475 A1 | 6/2021 | Tentori et al. |
| 2021/0190770 A1 | 6/2021 | Delaney et al. |
| 2021/0198741 A1 | 7/2021 | Williams |
| 2021/0199660 A1 | 7/2021 | Williams et al. |

(56) References Cited

U.S. PATENT DOCUMENTS

| | | |
|---|---|---|
| 2021/0207202 A1 | 7/2021 | Chee |
| 2021/0214785 A1 | 7/2021 | Stoeckius |
| 2021/0222235 A1 | 7/2021 | Chee |
| 2021/0222241 A1 | 7/2021 | Bharadwaj |
| 2021/0222242 A1 | 7/2021 | Ramachandran Iyer |
| 2021/0222253 A1 | 7/2021 | Uytingco |
| 2021/0223227 A1 | 7/2021 | Stoeckius |
| 2021/0230584 A1 | 7/2021 | Mikkelsen et al. |
| 2021/0230681 A1 | 7/2021 | Patterson et al. |
| 2021/0230692 A1 | 7/2021 | Daugharthy et al. |
| 2021/0237022 A1 | 8/2021 | Bava |
| 2021/0238581 A1 | 8/2021 | Mikkelsen et al. |
| 2021/0238664 A1 | 8/2021 | Bava et al. |
| 2021/0238675 A1 | 8/2021 | Bava |
| 2021/0238680 A1 | 8/2021 | Bava |
| 2021/0247316 A1 | 8/2021 | Bava |
| 2021/0255175 A1 | 8/2021 | Chee et al. |
| 2021/0262018 A1 | 8/2021 | Bava et al. |
| 2021/0262019 A1 | 8/2021 | Alvarado Martinez et al. |
| 2021/0269864 A1 | 9/2021 | Chee |
| 2021/0270822 A1 | 9/2021 | Chee |
| 2021/0277460 A1 | 9/2021 | Bava |
| 2021/0285036 A1 | 9/2021 | Yin et al. |
| 2021/0285046 A1 | 9/2021 | Chell et al. |
| 2021/0292748 A1 | 9/2021 | Frisen et al. |
| 2021/0292822 A1 | 9/2021 | Frisen et al. |
| 2021/0317510 A1 | 10/2021 | Chee et al. |
| 2021/0317524 A1 | 10/2021 | Lucero et al. |
| 2021/0324457 A1 | 10/2021 | Ramachandran Iyer et al. |
| 2021/0332424 A1 | 10/2021 | Schnall-Levin |
| 2021/0332425 A1 | 10/2021 | Pfeiffer et al. |
| 2021/0348221 A1 | 11/2021 | Chell et al. |
| 2022/0002791 A1 | 1/2022 | Frisen et al. |
| 2022/0003755 A1 | 1/2022 | Chee |
| 2022/0010367 A1 | 1/2022 | Ramachandran Iyer et al. |
| 2022/0017951 A1 | 1/2022 | Ramachandran Iyer et al. |
| 2022/0025446 A1 | 1/2022 | Shah |
| 2022/0025447 A1 | 1/2022 | Tentori et al. |
| 2022/0033888 A1 | 2/2022 | Schnall-Levin et al. |
| 2022/0049293 A1 | 2/2022 | Frenz et al. |
| 2022/0049294 A1 | 2/2022 | Uytingco et al. |
| 2022/0064630 A1 | 3/2022 | Bent et al. |
| 2022/0081728 A1 | 3/2022 | Williams |
| 2022/0090058 A1 | 3/2022 | Frisen et al. |
| 2022/0090175 A1 | 3/2022 | Uytingco et al. |
| 2022/0098576 A1 | 3/2022 | Dadhwal |
| 2022/0098661 A1 | 3/2022 | Chew et al. |
| 2022/0106632 A1 | 4/2022 | Galonska et al. |
| 2022/0106633 A1 | 4/2022 | Engblom et al. |
| 2022/0112486 A1 | 4/2022 | Ramachandran Iyer et al. |
| 2022/0112545 A1 | 4/2022 | Chee |
| 2022/0119869 A1 | 4/2022 | Ramachandran Iyer et al. |
| 2022/0127659 A1 | 4/2022 | Frisen et al. |
| 2022/0127666 A1 | 4/2022 | Katiraee et al. |
| 2022/0127672 A1 | 4/2022 | Stoeckius |
| 2022/0145361 A1 | 5/2022 | Frenz et al. |
| 2022/0154255 A1 | 5/2022 | Chee et al. |
| 2022/0170083 A1 | 6/2022 | Khaled et al. |
| 2022/0195422 A1 | 6/2022 | Gallant et al. |
| 2022/0195505 A1 | 6/2022 | Frisen et al. |
| 2022/0196644 A1 | 6/2022 | Chee |
| 2022/0213526 A1 | 7/2022 | Frisen et al. |
| 2022/0220544 A1 | 7/2022 | Ach et al. |
| 2022/0241780 A1 | 8/2022 | Tentori et al. |
| 2022/0267844 A1 | 8/2022 | Ramachandran Iyer et al. |
| 2022/0282329 A1 | 9/2022 | Chell et al. |
| 2022/0290217 A1 | 9/2022 | Frenz et al. |
| 2022/0290219 A1 | 9/2022 | Chee |
| 2022/0298560 A1 | 9/2022 | Frisen et al. |
| 2022/0325325 A1 | 10/2022 | Chee et al. |
| 2022/0326251 A1 | 10/2022 | Uytingco et al. |
| 2022/0333171 A1 | 10/2022 | Chee |
| 2022/0333191 A1 | 10/2022 | Mikkelsen et al. |
| 2022/0333192 A1 | 10/2022 | Uytingco |
| 2022/0333195 A1 | 10/2022 | Schnall-Levin et al. |
| 2022/0334031 A1 | 10/2022 | Delaney et al. |
| 2022/0348905 A1 | 11/2022 | Dadhwal |
| 2022/0348992 A1 | 11/2022 | Stoeckius et al. |
| 2022/0356464 A1 | 11/2022 | Kim et al. |
| 2022/0364163 A1 | 11/2022 | Stahl et al. |
| 2022/0389491 A1 | 12/2022 | Chee |
| 2022/0389503 A1 | 12/2022 | Mikkelsen et al. |
| 2022/0389504 A1 | 12/2022 | Chew et al. |
| 2022/0403455 A1 | 12/2022 | Ramachandran Iyer et al. |
| 2022/0404245 A1 | 12/2022 | Chell et al. |
| 2023/0002812 A1 | 1/2023 | Stoeckius et al. |
| 2023/0014008 A1 | 1/2023 | Shastry |
| 2023/0017773 A1 | 1/2023 | Kim et al. |
| 2023/0031305 A1 | 2/2023 | Hernandez Neuta et al. |
| 2023/0033960 A1 | 2/2023 | Gallant et al. |
| 2023/0034039 A1 | 2/2023 | Shahjamali |
| 2023/0034216 A1 | 2/2023 | Bava |
| 2023/0040363 A1 | 2/2023 | Chee |
| 2023/0042088 A1 | 2/2023 | Chee |
| 2023/0042817 A1 | 2/2023 | Mignardi |
| 2023/0047782 A1 | 2/2023 | Tentori et al. |
| 2023/0056549 A1 | 2/2023 | Dadhwal |
| 2023/0064372 A1 | 3/2023 | Chell et al. |
| 2023/0069046 A1 | 3/2023 | Chew et al. |
| 2023/0077364 A1 | 3/2023 | Patterson et al. |
| 2023/0080543 A1 | 3/2023 | Katiraee et al. |
| 2023/0081381 A1 | 3/2023 | Chew et al. |
| 2023/0100497 A1 | 3/2023 | Frisen et al. |
| 2023/0107023 A1 | 4/2023 | Chee |
| 2023/0111225 A1 | 4/2023 | Chew et al. |
| 2023/0113230 A1 | 4/2023 | Kim et al. |
| 2023/0126825 A1 | 4/2023 | Nagendran et al. |
| 2023/0129552 A1 | 4/2023 | Ramachandran Iyer |
| 2023/0135010 A1 | 5/2023 | Tentori et al. |
| 2023/0143569 A1 | 5/2023 | Iyer et al. |
| 2023/0145575 A1 | 5/2023 | Gallant et al. |
| 2023/0147726 A1 | 5/2023 | Hadrup et al. |
| 2023/0151412 A1 | 5/2023 | Chee |
| 2023/0159994 A1 | 5/2023 | Chee |
| 2023/0159995 A1 | 5/2023 | Iyer et al. |
| 2023/0160008 A1 | 5/2023 | Chell et al. |
| 2023/0175045 A1 | 6/2023 | Katsori et al. |
| 2023/0183684 A1 | 6/2023 | Gallant et al. |
| 2023/0183785 A1 | 6/2023 | Frisen et al. |
| 2023/0194470 A1 | 6/2023 | Kim et al. |
| 2023/0203478 A1 | 6/2023 | Kim et al. |
| 2023/0212650 A1 | 7/2023 | Chew et al. |
| 2023/0212655 A1 | 7/2023 | Chee |
| 2023/0212656 A1 | 7/2023 | Chow et al. |
| 2023/0220368 A1 | 7/2023 | Kim |
| 2023/0220454 A1 | 7/2023 | Bent et al. |
| 2023/0220455 A1 | 7/2023 | Galonska et al. |
| 2023/0227811 A1 | 7/2023 | Dadhwal |
| 2023/0228762 A1 | 7/2023 | Uytingco et al. |
| 2023/0242973 A1 | 8/2023 | Frisen et al. |
| 2023/0242976 A1 | 8/2023 | Tentori et al. |
| 2023/0265488 A1 | 8/2023 | Gohil et al. |
| 2023/0265489 A1 | 8/2023 | Uytingco et al. |
| 2023/0265491 A1 | 8/2023 | Tentori et al. |
| 2023/0267625 A1 | 8/2023 | Tentori et al. |
| 2023/0279474 A1 | 9/2023 | Katiraee |
| 2023/0279477 A1 | 9/2023 | Kvastad et al. |
| 2023/0279481 A1 | 9/2023 | Marrache et al. |
| 2023/0287399 A1 | 9/2023 | Gallant et al. |
| 2023/0287475 A1 | 9/2023 | Chell et al. |
| 2023/0287481 A1 | 9/2023 | Katsori et al. |
| 2023/0295699 A1 | 9/2023 | Sukovich et al. |
| 2023/0295722 A1 | 9/2023 | Bharadwaj |
| 2023/0304072 A1 | 9/2023 | Gohil et al. |
| 2023/0304074 A1 | 9/2023 | Chee et al. |
| 2023/0304078 A1 | 9/2023 | Frisen et al. |
| 2023/0313279 A1 | 10/2023 | Giacomello et al. |
| 2023/0323340 A1 | 10/2023 | Dadhwal |
| 2023/0323434 A1 | 10/2023 | Yin et al. |
| 2023/0323436 A1 | 10/2023 | Chee |
| 2023/0323447 A1 | 10/2023 | Schnall-Levin et al. |
| 2023/0323453 A1 | 10/2023 | Stoeckius |
| 2023/0332138 A1 | 10/2023 | Kim et al. |
| 2023/0332211 A1 | 10/2023 | Chee |

(56) References Cited

U.S. PATENT DOCUMENTS

| | | |
|---|---|---|
| 2023/0332212 A1 | 10/2023 | Chew et al. |
| 2023/0332227 A1 | 10/2023 | Ramachandran Iyer |
| 2023/0332247 A1 | 10/2023 | Singh et al. |
| 2023/0351619 A1 | 11/2023 | Tentori et al. |
| 2023/0358733 A1 | 11/2023 | Chee |
| 2023/0366008 A1 | 11/2023 | Chew et al. |
| 2023/0383285 A1 | 11/2023 | Kim et al. |
| 2023/0383344 A1 | 11/2023 | Stoeckius |
| 2023/0392204 A1 | 12/2023 | Chell et al. |
| 2023/0393071 A1 | 12/2023 | Bava |
| 2023/0407404 A1 | 12/2023 | Baumgartner et al. |
| 2023/0416807 A1 | 12/2023 | Chee |
| 2023/0416808 A1 | 12/2023 | Sukovich et al. |
| 2023/0416850 A1 | 12/2023 | Singh et al. |
| 2024/0002931 A1 | 1/2024 | Bava |
| 2024/0011081 A1 | 1/2024 | Chee |
| 2024/0011090 A1 | 1/2024 | Chew et al. |
| 2024/0018572 A1 | 1/2024 | Mignardi |
| 2024/0018575 A1 | 1/2024 | Gallant et al. |
| 2024/0018589 A1 | 1/2024 | Schnall-Levin et al. |
| 2024/0026445 A1 | 1/2024 | Ramachandran Iyer et al. |
| 2024/0033743 A1 | 2/2024 | Tentori et al. |
| 2024/0035937 A1 | 2/2024 | Cox et al. |
| 2024/0043908 A1 | 2/2024 | Chew et al. |
| 2024/0043925 A1 | 2/2024 | Bent et al. |
| 2024/0052343 A1 | 2/2024 | Gallant et al. |
| 2024/0053351 A1 | 2/2024 | Uytingco et al. |
| 2024/0060115 A1 | 2/2024 | Chee et al. |
| 2024/0067953 A1 | 2/2024 | Mikkelsen et al. |
| 2024/0068016 A1 | 2/2024 | Frisen et al. |
| 2024/0068017 A1 | 2/2024 | Lundeberg et al. |
| 2024/0076723 A1 | 3/2024 | Mignardi |
| 2024/0080346 A1 | 3/2024 | Engblom et al. |
| 2024/0084365 A1 | 3/2024 | Frisen et al. |
| 2024/0084366 A1 | 3/2024 | Chee |
| 2024/0084383 A1 | 3/2024 | Ramachandran Iyer et al. |
| 2024/0093274 A1 | 3/2024 | Frisen et al. |
| 2024/0093290 A1 | 3/2024 | Stahl et al. |
| 2024/0110228 A1 | 4/2024 | Uytingco et al. |
| 2024/0124933 A1 | 4/2024 | Chell et al. |
| 2024/0125772 A1 | 4/2024 | Delaney et al. |
| 2024/0141327 A1 | 5/2024 | Kim et al. |
| 2024/0158838 A1 | 5/2024 | Alvarado Martinez et al. |
| 2024/0175080 A1 | 5/2024 | Galonska et al. |
| 2024/0182968 A1 | 6/2024 | Bava |
| 2024/0191286 A1 | 6/2024 | Boutet et al. |
| 2024/0200121 A1 | 6/2024 | Boutet |
| 2024/0209425 A1 | 6/2024 | Yin et al. |
| 2024/0218427 A1 | 7/2024 | Sukovich et al. |
| 2024/0218432 A1 | 7/2024 | Mielinis |
| 2024/0219701 A1 | 7/2024 | Tentori et al. |
| 2024/0253036 A1 | 8/2024 | Kim et al. |
| 2024/0263218 A1 | 8/2024 | Katiraee et al. |
| 2024/0271190 A1 | 8/2024 | Stoeckius et al. |
| 2024/0271195 A1 | 8/2024 | Mikhaiel et al. |
| 2024/0279747 A1 | 8/2024 | Williams |
| 2024/0287600 A1 | 8/2024 | Iyer et al. |
| 2024/0294971 A1 | 9/2024 | Galonska |
| 2024/0294974 A1 | 9/2024 | Galonska et al. |
| 2024/0294975 A1 | 9/2024 | Lin et al. |
| 2024/0301488 A1 | 9/2024 | Stoeckius |
| 2024/0301489 A1 | 9/2024 | Chew et al. |
| 2024/0360494 A1 | 10/2024 | Costa et al. |
| 2024/0368711 A1 | 11/2024 | Giacomello et al. |
| 2024/0377297 A1 | 11/2024 | Cox et al. |
| 2024/0385088 A1 | 11/2024 | Kim et al. |
| 2024/0392349 A1 | 11/2024 | Frisen et al. |
| 2024/0392351 A1 | 11/2024 | Chee |
| 2024/0392352 A1 | 11/2024 | Stahl et al. |
| 2024/0392353 A1 | 11/2024 | Engblom et al. |
| 2024/0401109 A1 | 12/2024 | Kim et al. |
| 2024/0401117 A1 | 12/2024 | Bava |
| 2024/0401118 A1 | 12/2024 | Tentori et al. |
| 2024/0404301 A1 | 12/2024 | Li et al. |
| 2024/0408593 A1 | 12/2024 | Kim et al. |
| 2024/0416315 A1 | 12/2024 | Bava |
| 2024/0417783 A1 | 12/2024 | Chew et al. |
| 2024/0417784 A1 | 12/2024 | Sukovich et al. |
| 2025/0002980 A1 | 1/2025 | Tentori et al. |
| 2025/0002982 A1 | 1/2025 | Stoeckius et al. |
| 2025/0003956 A1 | 1/2025 | Delaney et al. |
| 2025/0019689 A1 | 1/2025 | Galonska et al. |
| 2025/0019749 A1 | 1/2025 | Katiraee et al. |
| 2025/0066762 A1 | 2/2025 | Man et al. |
| 2025/0066770 A1 | 2/2025 | Costa |
| 2025/0073719 A1 | 3/2025 | Cox et al. |
| 2025/0075261 A1 | 3/2025 | Kim |
| 2025/0101501 A1 | 3/2025 | Chee |
| 2025/0101502 A1 | 3/2025 | Chee |
| 2025/0101504 A1 | 3/2025 | Nagendran et al. |
| 2025/0122564 A1 | 4/2025 | Mignardi et al. |
| 2025/0122565 A1 | 4/2025 | Schnall-Levin et al. |
| 2025/0129412 A1 | 4/2025 | Uytingco et al. |
| 2025/0129421 A1 | 4/2025 | Schnall-Levin et al. |
| 2025/0137043 A1 | 5/2025 | Tentori |
| 2025/0145984 A1 | 5/2025 | Ma et al. |
| 2025/0146057 A1 | 5/2025 | Schnall-Levin et al. |
| 2025/0146058 A1 | 5/2025 | Tentori |
| 2025/0146071 A1 | 5/2025 | Schnall-Levin et al. |
| 2025/0146072 A1 | 5/2025 | Schnall-Levin et al. |
| 2025/0154565 A1 | 5/2025 | Chee |
| 2025/0154566 A1 | 5/2025 | Chee |
| 2025/0154567 A1 | 5/2025 | Chee |
| 2025/0154568 A1 | 5/2025 | Frisen et al. |
| 2025/0154569 A1 | 5/2025 | Stoeckius et al. |
| 2025/0154571 A1 | 5/2025 | Ramachandran Iyer et al. |
| 2025/0154588 A1 | 5/2025 | Ramachandran Iyer et al. |
| 2025/0155446 A1 | 5/2025 | Uytingco et al. |
| 2025/0163501 A1 | 5/2025 | Singh et al. |
| 2025/0163509 A1 | 5/2025 | Daugharthy et al. |
| 2025/0171833 A1 | 5/2025 | Frisen et al. |
| 2025/0171848 A1 | 5/2025 | Chell et al. |
| 2025/0179475 A1 | 6/2025 | Borgstrom et al. |
| 2025/0182305 A1 | 6/2025 | Tentori et al. |
| 2025/0182503 A1 | 6/2025 | Li et al. |
| 2025/0188526 A1 | 6/2025 | Sukovich et al. |
| 2025/0189483 A1 | 6/2025 | Kim et al. |
| 2025/0197847 A1 | 6/2025 | Kim et al. |
| 2025/0197938 A1 | 6/2025 | Bjorninen |
| 2025/0207125 A1 | 6/2025 | Gupta et al. |
| 2025/0207182 A1 | 6/2025 | Chee |
| 2025/0207183 A1 | 6/2025 | Chee |
| 2025/0207195 A1 | 6/2025 | Chell et al. |
| 2025/0208115 A1 | 6/2025 | Bent |
| 2025/0215482 A1 | 7/2025 | Mignardi et al. |
| 2025/0215484 A1 | 7/2025 | Ramachandran Iyer et al. |
| 2025/0216300 A1 | 7/2025 | Delaney et al. |
| 2025/0216303 A1 | 7/2025 | Cox et al. |

FOREIGN PATENT DOCUMENTS

| | | |
|---|---|---|
| CN | 1680604 | 10/2005 |
| CN | 1934452 | 3/2007 |
| CN | 1981188 | 6/2007 |
| CN | 202548048 | 11/2012 |
| CN | 102851369 | 1/2013 |
| CN | 104513785 | 4/2015 |
| CN | 104541162 | 4/2015 |
| CN | 110998310 | 4/2020 |
| EP | 0961110 | 12/1999 |
| EP | 1878502 | 1/2008 |
| EP | 1923471 | 5/2008 |
| EP | 2002017 | 12/2008 |
| EP | 2130913 | 12/2009 |
| EP | 2881465 | 6/2015 |
| EP | 3013983 | 5/2016 |
| EP | 3013984 | 5/2016 |
| EP | 3511423 | 7/2019 |
| EP | 3541956 | 9/2019 |
| WO | WO 1989/010977 | 11/1989 |
| WO | WO 1991/006678 | 5/1991 |
| WO | WO 1995/025116 | 9/1995 |
| WO | WO 1995/035505 | 12/1995 |
| WO | WO 1998/010277 | 3/1998 |

(56) References Cited

FOREIGN PATENT DOCUMENTS

| | | |
|---|---|---|
| WO | WO 1999/063385 | 12/1999 |
| WO | WO 2000/063437 | 10/2000 |
| WO | WO 2002/040874 | 5/2002 |
| WO | WO 2002/059355 | 8/2002 |
| WO | WO 2002/077283 | 10/2002 |
| WO | WO 2003/002979 | 1/2003 |
| WO | WO 2003/010176 | 2/2003 |
| WO | WO 2003/106973 | 12/2003 |
| WO | WO 2004/028955 | 4/2004 |
| WO | WO 2004/108268 | 12/2004 |
| WO | WO 2005/007814 | 1/2005 |
| WO | WO 2006/056861 | 6/2006 |
| WO | WO 2007/073171 | 6/2007 |
| WO | WO 2007/076726 | 7/2007 |
| WO | WO 2007/120241 | 10/2007 |
| WO | WO 2007/123744 | 11/2007 |
| WO | WO 2007/145612 | 12/2007 |
| WO | WO 2008/075086 | 6/2008 |
| WO | WO 2008/157801 | 12/2008 |
| WO | WO 2009/032167 | 3/2009 |
| WO | WO 2009/152928 | 12/2009 |
| WO | WO 2010/088517 | 8/2010 |
| WO | WO 2010/126614 | 11/2010 |
| WO | WO 2011/068088 | 6/2011 |
| WO | WO 2011/102903 | 8/2011 |
| WO | WO 2012/058096 | 5/2012 |
| WO | WO 2012/159089 | 11/2012 |
| WO | WO 2012/168003 | 12/2012 |
| WO | WO 2013/123442 | 8/2013 |
| WO | WO 2013/131962 | 9/2013 |
| WO | WO 2013/138510 | 9/2013 |
| WO | WO 2013/150082 | 10/2013 |
| WO | WO 2013/150083 | 10/2013 |
| WO | WO 2014/060483 | 4/2014 |
| WO | WO 2014/128129 | 8/2014 |
| WO | WO 2014/142841 | 9/2014 |
| WO | WO 2014/210223 | 12/2014 |
| WO | WO 2014/210225 | 12/2014 |
| WO | WO 2014/210353 | 12/2014 |
| WO | WO 2015/031691 | 3/2015 |
| WO | WO 2016/138496 | 9/2016 |
| WO | WO 2016/138500 | 9/2016 |
| WO | WO 2016/162309 | 10/2016 |
| WO | WO 2016/166128 | 10/2016 |
| WO | WO 2016/168825 | 10/2016 |
| WO | WO 2016/172362 | 10/2016 |
| WO | WO 2017/019456 | 2/2017 |
| WO | WO 2017/048871 | 3/2017 |
| WO | WO 2017/075293 | 5/2017 |
| WO | WO 2017/112957 | 6/2017 |
| WO | WO 2017/096158 | 7/2017 |
| WO | WO 2017/144338 | 8/2017 |
| WO | WO 2018/064640 | 4/2018 |
| WO | WO 2018/075436 | 4/2018 |
| WO | WO 2018/091676 | 5/2018 |
| WO | WO 2018/148471 | 8/2018 |
| WO | WO 2018/175779 | 9/2018 |
| WO | WO 2019/104337 | 5/2019 |
| WO | WO 2019/113457 | 6/2019 |
| WO | WO 2019/140334 | 7/2019 |
| WO | WO 2019/213254 | 11/2019 |
| WO | WO 2019/213294 | 11/2019 |
| WO | WO 2020/028194 | 2/2020 |
| WO | WO 2020/047002 | 3/2020 |
| WO | WO 2020/047010 | 3/2020 |
| WO | WO 2020/053655 | 3/2020 |
| WO | WO 2020/061064 | 3/2020 |
| WO | WO 2020/061066 | 3/2020 |
| WO | WO 2020/061108 | 3/2020 |
| WO | WO 2020/076979 | 4/2020 |
| WO | WO 2020/099640 | 5/2020 |
| WO | WO 2020/123301 | 6/2020 |
| WO | WO 2020/123305 | 6/2020 |
| WO | WO 2020/123311 | 6/2020 |
| WO | WO 2020/123316 | 6/2020 |
| WO | WO 2020/123317 | 6/2020 |
| WO | WO 2020/123318 | 6/2020 |
| WO | WO 2020/123319 | 6/2020 |
| WO | WO 2020/123320 | 7/2020 |
| WO | WO 2020/160044 | 8/2020 |
| WO | WO 2020/167862 | 8/2020 |
| WO | WO 2020/176788 | 9/2020 |
| WO | WO 2020/176882 | 9/2020 |
| WO | WO 2020/190509 | 9/2020 |
| WO | WO 2020/198071 | 10/2020 |
| WO | WO 2020/206285 | 10/2020 |
| WO | WO 2020/219901 | 10/2020 |
| WO | WO 2020/243579 | 12/2020 |
| WO | WO 2021/041974 | 3/2021 |
| WO | WO 2021/067246 | 4/2021 |
| WO | WO 2021/067514 | 4/2021 |
| WO | WO 2021/102003 | 5/2021 |
| WO | WO 2021/102005 | 5/2021 |
| WO | WO 2021/102039 | 5/2021 |
| WO | WO 2021/116715 | 6/2021 |
| WO | WO 2021/133842 | 7/2021 |
| WO | WO 2021/133845 | 7/2021 |
| WO | WO 2021/133849 | 7/2021 |
| WO | WO 2021/142233 | 7/2021 |
| WO | WO 2021/168261 | 8/2021 |
| WO | WO 2021/168278 | 8/2021 |
| WO | WO 2021/207610 | 10/2021 |
| WO | WO 2021/216708 | 10/2021 |
| WO | WO 2021/225900 | 11/2021 |
| WO | WO 2021/236625 | 11/2021 |
| WO | WO 2021/236929 | 11/2021 |
| WO | WO 2021/237056 | 11/2021 |
| WO | WO 2021/237087 | 11/2021 |
| WO | WO 2021/242834 | 12/2021 |
| WO | WO 2021/247543 | 12/2021 |
| WO | WO 2021/247568 | 12/2021 |
| WO | WO 2021/247593 | 12/2021 |
| WO | WO 2021/252499 | 12/2021 |
| WO | WO 2021/252576 | 12/2021 |
| WO | WO 2021/252591 | 12/2021 |
| WO | WO 2021/252747 | 12/2021 |
| WO | WO 2021/263111 | 12/2021 |
| WO | WO 2022/025965 | 2/2022 |
| WO | WO 2022/051152 | 3/2022 |
| WO | WO 2022/060798 | 3/2022 |
| WO | WO 2022/060953 | 3/2022 |
| WO | WO 2022/061150 | 3/2022 |
| WO | WO 2022/061152 | 3/2022 |
| WO | WO 2022/087273 | 4/2022 |
| WO | WO 2022/098810 | 5/2022 |
| WO | WO 2022/099037 | 5/2022 |
| WO | WO 2022/103712 | 5/2022 |
| WO | WO 2022/109181 | 5/2022 |
| WO | WO 2022/132645 | 6/2022 |
| WO | WO 2022/140028 | 6/2022 |
| WO | WO 2022/147005 | 7/2022 |
| WO | WO 2022/147296 | 7/2022 |
| WO | WO 2022/164615 | 8/2022 |
| WO | WO 2022/178267 | 8/2022 |
| WO | WO 2022/198068 | 9/2022 |
| WO | WO 2022/221425 | 10/2022 |
| WO | WO 2022/226057 | 10/2022 |
| WO | WO 2022/015913 | 11/2022 |
| WO | WO 2022/236054 | 11/2022 |
| WO | WO 2022/243303 | 11/2022 |
| WO | WO 2022/226372 | 12/2022 |
| WO | WO 2022/256503 | 12/2022 |
| WO | WO 2022/271820 | 12/2022 |
| WO | WO 2023/287765 | 1/2023 |
| WO | WO 2023/018799 | 2/2023 |
| WO | WO 2023/034489 | 3/2023 |
| WO | WO 2023/044071 | 3/2023 |
| WO | WO 2023/076345 | 5/2023 |
| WO | WO 2023/086880 | 5/2023 |
| WO | WO 2023/102118 | 6/2023 |
| WO | WO 2023/122033 | 6/2023 |
| WO | WO 2023/130019 | 7/2023 |
| WO | WO 2023/147355 | 8/2023 |
| WO | WO 2023/150098 | 8/2023 |

(56) References Cited

FOREIGN PATENT DOCUMENTS

| | | |
|---|---|---|
| WO | WO 2023/150163 | 8/2023 |
| WO | WO 2023/150171 | 8/2023 |
| WO | WO 2023/215552 | 11/2023 |
| WO | WO 2023/225519 | 11/2023 |
| WO | WO 2023/229988 | 11/2023 |
| WO | WO 2023/250077 | 12/2023 |
| WO | WO 2024/015578 | 1/2024 |
| WO | WO 2024/035844 | 2/2024 |
| WO | WO 2024/081212 | 4/2024 |
| WO | WO 2024/086167 | 4/2024 |
| WO | WO 2024/086776 | 4/2024 |
| WO | WO 2024/102809 | 5/2024 |
| WO | WO 2024/137826 | 6/2024 |
| WO | WO 2024/145224 | 7/2024 |
| WO | WO 2024/145441 | 7/2024 |
| WO | WO 2024/145445 | 7/2024 |
| WO | WO 2024/145491 | 7/2024 |
| WO | WO 2024/206603 | 10/2024 |
| WO | WO 2024/220882 | 10/2024 |
| WO | WO 2024/238900 | 11/2024 |
| WO | WO 2024/254316 | 12/2024 |
| WO | WO 2025/029605 | 2/2025 |
| WO | WO 2025/029627 | 2/2025 |
| WO | WO 2025/043076 | 2/2025 |
| WO | WO 2025/072119 | 4/2025 |
| WO | WO 2025/090912 | 5/2025 |
| WO | WO 2025/096581 | 5/2025 |
| WO | WO 2025/101864 | 5/2025 |

OTHER PUBLICATIONS

Kuhn et al., "A novel, high-performance random array platform for quantitative gene expression profiling," Genome Res, 2004, 14:2347-2356.
Eastburn, "Microfluidic droplet enrichment for targeted sequencing," Nucleic Acids Research, 2015, 43(13):1-8.
10xGenomics.com, [online], "Visium Spatial Gene Expression Reagent Kits—Tissue Optimization—User Guide," Feb. 2022, retrieved on Mar. 29, 2024, retrieved from URL<https://cdn.10xgenomics.com/image/upload/v1660261286/support-documents/CG000238_VisiumSpatialTissueOptimizationUserGuide_RevE.pdf>, 46 pages.
Asp et al., "A spatiotemporal organ-wide gene expression and cell atlas of the developing human heart," Cell, Dec. 12, 2019, 179(7):1647-1660.
U.S. Appl. No. 61/839,313, filed Jun. 25, 2013, Chee et al.
U.S. Appl. No. 61/839,320, filed Jun. 25, 2013, Chee et al.
[No Author Listed], "Chromium Next GEM Single Cell 3' Reagent Kits v3.1—User Guide," 10x Genomics, Document No. CG000204, Nov. 2019, 58 pages.
[No Author Listed], "Chromium Next GEM Single Cell 3' Reagent Kits v3.1 (Dual Index)—User Guide," 10x Genomics, Mar. 2021, Document No. CG000315, 61 pages.
[No Author Listed], "HuSNP Mapping Assay User's Manual," Affymetrix Part No. 90094 (Affymetrix, Santa Clara, Calif.), GeneChip, 2000, 104 pages.
[No Author Listed], "Microarray technologies have excellent possibilities in genomics-related researches," Science Tools From Amersham Pharmacia Biotech, 1998, 3(4): 8 pages (with English Translation).
10xGenomics.com, [online], "Visium Spatial Gene Expression Reagent Kits—Tissue Optimization—User Guide," Jul. 2020, retrieved on May 25, 2021, retrieved from URL<https://assets.ctfassets.net/an68im79xiti/5UJrN0cH17rEk0UXwd19It/e54d99fb08a8f1500aba503005a04a56/CG000238_VisiumSpatialTissueOptimizationUserGuide_RevD.pdf>, 42 pages.
10xGenomics.com, [online], "Visium Spatial Gene Expression Reagent Kits—Tissue Optimization," Nov. 2019, retrieved on Jan. 25, 2022, retrieved from URL<https://assets.ctfassets.net/an68im79xiti/4q03w6959AJFxffSw5lee9/6a2ac61cf6388a72564eeb96bc294967/CG000238_VisiumSpatialTissueOptimizationUserGuide_Rev_A.pdf>, 46 pages.
10xGenomics.com, [online], "Visium Spatial Gene Expression Reagent Kits—Tissue Optimization," Oct. 2020, retrieved on Dec. 28, 2021, retrieved from URL<https://assets.ctfassets.net/an68im79xiti/5UJrN0cH17rEk0UXwd19It/e54d99fb08a8f1500aba503005a04a56/CG000238_VisiumSpatialTissueOptimizationUserGuide_RevD.pdf>, 43 pages.
10xGenomics.com, [online], "Visium Spatial Gene Expression Reagent Kits—User Guide," Jun. 2020, retrieved on May 25, 2021, retrieved from URL<https://assets.ctfassets.net/an68im79xiti/3GGIfH3RWpd1bFVha1pexR/8baa08d9007157592b65b2cdc7130990/CG000239_VisiumSpatialGeneExpression_UserGuide_RevD.pdf>, 69 pages.
10xGenomics.com, [online], "Visium Spatial Gene Expression Reagent Kits—User Guide," Oct. 2020, retrieved on Dec. 28, 2021, retrieved from URL<https://assets.ctfassets.net/an68im79xiti/3GGIfH3RWpd1bFVha1pexR/8baa08d9007157592b65b2cdc7130990/CG000239_VisiumSpatialGeneExpression_UserGuide_RevD.pdf>, 70 pages.
Adessi et al., "Solid phase DNA amplification: characterisation of primer attachment and amplification mechanisms," Nucl. Acids Res., 2000, 28(20):E87, 8 pages.
Affymetrix, "GeneChip Human Genome U133 Set," retrieved from the Internet: on the World Wide Web at affymetrix.com/support/technical/datasheets/hgu133_datasheet.pdf, retrieved on Feb. 26, 2003, 2 pages.
Affymetrix, "Human Genome U95Av2," Internet Citation, retrieved from the internet: on the World Wide Web affymetrix.com, retrieved on Oct. 2, 2002, 1 page.
Albretsen et al., "Applications of magnetic beads with covalently attached oligonucleotides in hybridization: Isolation and detection of specific measles virus mRNA from a crude cell lysate," Anal. Biochem., 1990, 189(1):40-50.
Allawi et al., "Thermodynamics and NMR of Internal GâT Mismatches in DNA," Biochemistry, 1996, 36(34):10581-10594.
Andor.com [online], "Discover new ways of seeing," Next Generation Digital Illumination, Mosaic 3, 2020, 11 pages.
Armani et al, "2D-PCR: a method of mapping DNA in tissue sections," Lab Chip, 2009, 9(24):3526-34.
Asp et al., "Spatially Resolved Transcriptomes-Next Generation Tools for Tissue Exploration," Bioessays, Oct. 2020, 42(10):e1900221, 16 pages.
Atkinson et al., "An Updated Protocol for High Throughput Plant Tissue Sectioning," Front Plant Sci, 2017, 8:1721, 8 pages.
Atkinson, "Overview of Translation: Lecture Manuscript," U of Texas, 2000, DD, pp. 6.1-6.8.
Bains et al., "A novel method for nucleic acid sequence determination," Journal of Theoretical Biology, 1988, 135(3), 303-7.
Barnes, "PCR amplification of up to 35-kb DNA with high fidelity and high yield from lambda bacteriophage templates," Proc. Natl. Acad. Sci USA, 1994, 91(6):2216-2220.
Beattie et al., "Advances in genosensor research," Clin Chem., May 1995, 41(5):700-6.
Beechem et al., "High-Plex Spatially Resolved RNA and Protein Detection Using Digital Spatial Profiling: A Technology Designed for Immuno-oncology Biomarker Discovery and Translational Research," Methods Mol Biol, 2020, Chapter 25, 2055:563-583.
Bergenstråhle et al., "Seamless integration of image and molecular analysis for spatial transcriptomics workflows," BMC Genomics, Jul. 2020, 21(1):482, 7 pages.
Birney et al., "Identification and analysis of functional elements in 1% of the human genome by the ENCODE pilot project," Nature, 2007, 447(7146):799-816.
Blair et al., "Microarray temperature optimization using hybridization kinetics," Methods Mol Biol., 2009, 529:171-96.
Blanchard et al., "High-density oligonucleotide arrays," Biosensors & Bioelectronics, 1996, 11(6-7):687-690.
Blokzijl et al., "Profiling protein expression and interactions: proximity ligation as a tool for personalized medicine," J Intern. Med., 2010, 268(3):232-245.
Blow, "Tissue Issues," Nature, 2007, 448(7156):959-962.
Bolotin et al., "MiXCR: software for comprehensive adaptive immunity profiling," Nat Methods., May 2015, 12(5):380-1.

(56) References Cited

OTHER PUBLICATIONS

Borm et al., "High throughput human embryo spatial transcriptome mapping by surface transfer of tissue RNA," Abstracts Selected Talks, Single Cell Genomics mtg, (SCG2019), 2019, 1 pages (Abstract Only).
Brandon et al., "Mitochondrial mutations in cancer," Oncogene, 2006, 25(34):4647-4662.
Brenner et al., "Gene expression analysis by massively parallel signature sequencing (MPSS) on microbead arrays," Nat. Biotech., 2000, 18(6):630-634.
Brenner et al., "In vitro cloning of complex mixtures of DNA on microbeads: physical separation of differentially expressed cDNAs," Proc. Natl. Acad. Sci. USA, 2000, 97(4):1665-1670.
Brow, "35—The Cleavase I enzyme for mutation and polymorphism scanning," PCR Applications Protocols for Functional Genomics, 1999, pp. 537-550.
Brown et al., "Retroviral integration: structure of the initial covalent product and its precursor, and a role for the viral IN protein," Proc Natl Acad Sci USA, Apr. 1989, 86(8):2525-9.
Buenrostro et al., "Transposition of native chromatin for multimodal regulatory analysis and personal epigenomics," Nat Methods, Dec. 2013, 10(12):1213-1218.
Bullard et al., "Direct comparison of nick-joining activity of the nucleic acid ligases from bacteriophage T4," Biochem. J. 2006, 398(1):135-144.
Burgess, "A space for transcriptomics," Nature Reviews Genetics, 2016, 17(8):436-7.
Burgess, "Finding structure in gene expression," Nature Reviews Genetics, 2018, 19(5):249, 1 page.
Burgess, "Spatial transcriptomics coming of age," Nat Rev Genet., Jun. 2019, 20(6):317, 1 page.
Burton et al., "Coverslip Mounted-Immersion Cycled in Situ RT-PCR for the Localization of mRNA in Tissue Sections," Biotechniques, 1998, 24(1):92-100.
Calvert, "Materials science. Printing cells," Science, Oct. 2007, 318(5848):208-209.
Carter et al., "Stabilization of an optical microscope to 0.1 nm in three dimensions," Applied Optics, 2007, 46:421-427.
Cha et al., "Specificity, efficiency, and fidelity of PCR," Genome Res., 1993, 3(3):S18-29.
Chandra et al., "Cell-free synthesis-based protein microarrays and their applications," Proteomics, 2009, 5(6):717-30.
Chatterjee et al., "Mitochondrial DNA mutations in human cancer. Oncogene," 2006, 25(34):4663-4674.
Chen et al., "DNA hybridization detection in a microfluidic Channel using two fluorescently labelled nucleic acid probes," Biosensors and Bioelectronics, 2008, 23(12):1878-1882.
Chen et al., "Large field of view-spatially resolved transcriptomics at nanoscale resolution," bioRxiv, Jan. 19, 2021, retrieved from URL <https://www.biorxiv.org/node/1751045.abstract>, 37 pages.
Chen et al., "Spatial Transcriptomics and In Situ Sequencing to Study Alzheimer's Disease," Cell, Aug. 2020, 182(4):976-991.
Chen et al., "μCB-seq: microfluidic cell barcoding and sequencing for high-resolution imaging and sequencing of single cells," Lab Chip, Nov. 2020, 20(21):3899-3913.
Cho et al., "Seq-Scope: Submicrometer-resolution spatial transcriptomics for single cell and subcellular studies," bioRxiv, Jan. 27, 2021, retrieved from URL <https://www.biorxiv.org/node/1754517.abstract>, 50 pages.
Cockroft et al., "A single-molecule nanopore device detects DNA polymerase activity with single-nucleotide resolution," J Am Chem Soc., Jan. 2008, 130(3):818-20.
Codeluppi et al., "Spatial organization of the somatosensory cortex revealed by osmFISH," Nature Methods, Nov. 2018, 15:932-935.
Constantine et al., "Use of genechip high-density oligonucleotide arrays for gene expression monitoring," Life Science News, Amersham Life Science, 1998, pp. 11-14.
Crosetto et al., "Spatially resolved transcriptomics and beyond," Nature Review Genetics, 2015, 16(1):57-66.

Czarnik, "Encoding methods for combinatorial chemistry," Curr Opin Chem Biol., Jun. 1997, 1(1):60-6.
Dahl et al., "Circle-to-circle amplification for precise and sensitive DNA analysis," Proc. Natl. Acad. Sci., 2004, 101(13):4548-4553.
Dalma-Weiszhausz et al., "The affymetrix GeneChip platform: an overview," Methods Enzymol., 2006, 410:3-28.
Daubendiek et al., "Rolling-Circle RNA Synthesis: Circular Oligonucleotides as Efficient Substrates for T7 RNA Polymerase," J. Am. Chem. Soc., 1995, 117(29):7818-7819.
Davies et al., "How best to identify chromosomal interactions: a comparison of approaches," Nat. Methods, 2017, 14(2):125-134.
Deamer et al., "Characterization of nucleic acids by Nanopore analysis," Acc Chem Res., Oct. 2002, 35(10):817-25.
Dean et al., "Comprehensive human genome amplification using multiple displacement amplification," Proc Natl. Acad. Sci. USA, 2002, 99(8):5261-66.
Dhindsa et al., "Virtual Electrowetting Channels: Electronic Liquid Transport with Continuous Channel Functionality," Lab Chip, 2010, 10:832-836.
Duncan et al., "Affinity chromatography of a sequence-specific DNA binding protein using Teflon-linked oligonucleotides," Anal. Biochem., 1988, 169(1):104-108.
Eguiluz et al., "Multitissue array review: a chronological description of tissue array techniques, applications and procedures," Pathology Research and Practice, 2006, 202(8):561-568.
Eldridge et al., "An in vitro selection strategy for conferring protease resistance to ligand binding peptides," Protein Eng Des Sel., 2009, 22(11):691-698.
Ellington et al., "Antibody-based protein multiplex platforms: technical and operational challenges," Clin Chem, 2010, 56(2):186-193.
Eng et al., "Transcriptome-scale super-resolved imaging in tissues by RNA seqFISH+," Nature, Apr. 2019, 568(7751):235-239, 37 pages.
Fire et al., "Rolling replication of short DNA circles," Proc. Natl. Acad. Sci., 1995, 92(10):4641-4645.
Fluidigm, "Hyperion Imaging System: Visualize a new path forward," Feb. 2018, retrieved from URL <https://www.fluidigm.com/binaries/content/documents/fluidigm/search/hippo%3Aresultset/hyperion-imaging-system-br-400326/fluidigm%3Afile>, 27 pages.
Fluidigm, "Immuno-Oncology Research with the Hyperion Imaging System: A high-parameter imaging solution at subcellular resolution to characterize the immune repertoire in the tumor microenvironment," Apr. 2018, retrieved from URL <https://www.fluidigm.com/binaries/content/documents/fluidigm/search/hippo%3Aresultset/application-note-immuno-oncology-research-with-the-hyperion%E2%84%A2-imaging-system/fluidigm%3Afile>, 6 pages.
Fluidigm, "Immuno-Oncology Research with the Hyperion Imaging System: A high-parameter imaging solution at subcellular resolution to characterize the immune repertoire in the tumor microenvironment," Aug. 2018, retrieved from URL <https://www.fluidigm.com/binaries/content/documents/fluidigm/marketing/immuno-oncology-research-with-the-hyperion-imaging-system-appnote-400332/immuno-oncology-research-with-the-hyperion-imaging-system-appnote-400332/fluidigm%3Afile>, 6 pages.
Fluidigm, "Maxpar Antibodies for Imaging Mass Cytometry," Mar. 2018, retrieved from URL <https://www.fluidigm.com/binaries/content/documents/fluidigm/search/hippo%3Aresultset/hyperion-antibodies-for-imaging-mass-cytometry-br-101-7115/fluidigm%3Afile>, 2 pages.
Fodor et al., "Light-directed, spatially addressable parallel chemical synthesis," Science, 1995, 251(4995):767-773.
Forcucci et al., "All-plastic miniature fluorescence microscope for point-of-care readout of bead-based bioassays.," J. Biomed Opt., 2015, 20(10):105010, 15 pages.
Forster et al., "A human gut bacterial genome and culture collection for improved metagenomic analyses," Nature Biotechnology, 2019, 37(2):186-192.
Frese et al., "Formylglycine aldehyde Tag—protein engineering through a novel post-translational modification," ChemBioChem., 2009, 10(3):425-27.
Fu et al., "Continuous Polony Gels for Tissue Mapping with High Resolution and RNA Capture Efficiency," bioRxiv, 2021, 20 pages.

(56) References Cited

OTHER PUBLICATIONS

Fu et al., "Counting individual DNA molecules by the stochastic attachment of diverse labels," PNAS, 2011, 108(22):9026-9031.
Fullwood et al., "Next-generation DNA sequencing of paired-end tags (PET) for transcriptome and genome analyses," Genome Res., 2009, 19(4):521-532.
Ganguli et al., "Pixelated spatial gene expression analysis from tissue," Nat Commun., Jan. 2018, 9(1):202, 9 pages.
Gene@arrays[online], BeadArray Technology, available on or before Feb. 14, 2015, via Internet Archive: Wayback Machine URL <https://web.archive.org/web/20150214084616/http://genearrays.com/services/microarrays/illumina/beadarray-technology/>, [retrieved on Jan. 30, 2020], 3 pages.
Gnanapragasam, "Unlocking the molecular archive: the emerging use of formalin-fixed paraffin-embedded tissue for biomarker research in urological cancer," BJU International, 2009, 105(2):274-278.
Goh et al., "Highly Specific Multiplexed RNA Imaging in Tissues With Split-FISH," Nat Methods, Jun. 15, 2020, 17(7):689-693, 21 pages.
Goldkorn et al., "A simple and efficient enzymatic method for covalent attachment of DNA to cellulose. Application for hybridization-restriction analysis and for in vitro synthesis of DNA probes," Nucleic Acids Res., 1986, 14(22):9171-9191.
Gracia Villacampa et al., "Genome-wide Spatial Expression Profiling in FFPE Tissues," bioRxiv, 2020, pp. 38 pages.
Gunderson et al., "Decoding randomly ordered DNA arrays," Genome Research, 2004, 14(5):870-877.
Guo et al., "Direct fluorescence analysis of genetic polymorphisms by hybridization with oligonucleotide arrays on glass supports," Nucleic Acids Res., Dec. 1994, 22(24):5456-65.
Hamaguchi et al., "Direct reverse transcription-PCR on oligo(dT)-immobilized polypropylene microplates after capturing total mRNA from crude cell lysates," Clin Chem., Nov. 1998, 44(11):2256-63.
Hattersley et al., "Development of a microfluidic device for the maintenance and interrogation of viable tissue biopsies," Lab Chip., Nov. 2008, 8(11):1842-6.
Hayes et al., "Electrophoresis of proteins and nucleic acids: I-Theory," BMJ, Sep. 1989, 299(6703):843-6.
He et al., "In situ synthesis of protein arrays," Current Opinion in Biotechnology, 2008, 19(1):4-9.
He, "Cell-free protein synthesis: applications in proteomics and biotechnology," New Biotechnology, 2008, 25(2-3):126-132.
Hejatko et al., "In situ hybridization technique for mRNA detection in whole mount *Arabidopsis* samples," Nature Protocols, 2006, 1(4):1939-1946.
Hiatt et al., "Parallel, tag-directed assembly of locally derived short sequence reads," Nature Methods, 2010, 7(2):119-25.
Hoyer et al., "Electrostatic spraying: a novel technique for preparation of polymer coatings on electrodes," Anal Chem, Nov. 1996, 68(21):3840-4.
Jamur et al., "Permeabilization of cell membranes.," Method Mol. Biol., 2010, 588:63-66.
Jemt et al., "An automated approach to prepare tissue-derived spatially barcoded RNA-sequencing libraries," Scientific Reports, 2016, 6:37137, 10 pages.
Kapteyn et al., "Incorporation of non-natural nucleotides into template-switching oligonucleotides reduces background and improves cDNA synthesis from very small RNA samples," BMC Genomics, Jul. 2010, 11:413, 9 pages.
Korbel et al., "Paired-end mapping reveals extensive structural variation in the human genome," Science, 2007, 318(5849):420-426.
Kozlov et al., "A highly scalable peptide-based assay system for proteomics," PLoS ONE, 2012, 7(6):e37441, 10 pages.
Kristensen et al., "High-Throughput Methods for Detection of Genetic Variation," BioTechniques, Feb. 2001, 30(2):318-332.
Kurz et al., "cDNA—protein fusions: covalent protein—gene conjugates for the in vitro selection of peptides and proteins," ChemBioChem., 2001, 2(9):666-72.

Kwok, "High-throughput genotyping assay approaches," Pharmocogenomics, Feb. 2000, 1(1):95-100.
Lage et al., "Whole genome analysis of genetic alterations in small DNA samples using hyperbranched strand displacement amplification and array-CGH," Genome Research, 2003, 13(2):294-307.
Landegren et al., "Reading bits of genetic information: methods for single-nucleotide polymorphism analysis," Genome Res., Aug. 1998, 8(8):769-76.
Langdale et al., "A rapid method of gene detection using DNA bound to Sephacryl," Gene, 1985, 36(3):201-210.
Leriche et al., "Cleavable linkers in chemical biology," Bioorganic & Medicinal Chemistry, 2012, 20:571-582.
Levene et al., "Zero-Mode Waveguides for Single-Molecule Analysis at High Concentrations," Science, 2003, 299:682-686.
Li et al., "DNA molecules and configurations in a solid-state nanopore microscope," Nat Mater., Sep. 2003, 2(9):611-5.
Lin et al., "Microfluidic cell trap array for controlled positioning of single cells on adhesive micropatterns," Lab Chip, Feb. 2013, 13(4):714-721.
Linnarsson, "Recent advances in DNA sequencing methods—general principles of sample preparation," Experimental Cell Research, 2010, 316(8):1339-1343.
Liu et al., "High-Spatial-Resolution Multi-Omics Atlas Sequencing of Mouse Embryos via Deterministic Barcoding in Tissue," BioRxiv, 2019, 55 pages.
Liu et al., "High-Spatial-Resolution Multi-Omics Sequencing via Deterministic Barcoding in Tissue," Cell, Nov. 13, 2020, 183(6):1665-1681, 36 pages.
Liu et al., "Spatial transcriptome sequencing of FFPE tissues at cellular level," bioRxiv 788992, Oct. 14, 2020, 39 pages.
Lizardi et al., "Mutation detection and single-molecule counting using isothermal rolling-circle amplification," Nat. Genet., 1998, 19(3):225-232.
Lu et al., "A microfluidic electroporation device for cell lysis," Lab Chip., Jan. 2005, 5(1):23-29.
Lundberg et al., "Multiplexed homogeneous proximity ligation assays for high-throughput protein biomarker research in serological material," Mol Cell Proteomics, 2011, 10(4):M110.004978, 11 pages.
Lundquist et al., "Parallel confocal detection of single molecules in real time," Opt. Lett., 2008, 33:1026-1028.
Macbeath et al., "Printing proteins as microarrays for high-throughput function determination," Science, Sep. 2000, 289(5485):1760-1763.
Marx, "Method of the Year: spatially resolved transcriptomics," Nature Methods, 2021, 18(1):9-14.
Merritt et al., "Multiplex digital spatial profiling of proteins and RNA in fixed tissue," Nat Biotechnol, May 2020, 38(5):586-599.
Metzker, "Sequencing technologies—the next generation," Nature Reviews Genetics, 2010, 11(1):31-46.
Miller et al., "Basic concepts of microarrays and potential applications in clinical microbiology," Clinical Microbiology Reviews, 2009, 22(4):611-633.
Miller et al., "Chapter 11—Solid and Suspension Microarrays for Microbial Diagnostics," Methods in Microbiology, 2015, 42:395-431.
Mishra et al., "Three-dimensional genome architecture and emerging technologies: looping in disease," Genome Medicine, 2017, 9(1):87, 14 pages.
Mitra et al., "Digital genotyping and haplotyping with polymerase colonies," Proc. Natl. Acad. Sci. USA, May 2003, 100(10):5926-5931.
Mizusawa et al., "A bacteriophage lambda vector for cloning with BamHI and Sau3A," Gene, 1982, 20(3):317-322.
Ncbi.nlm.nih.gov, [online], "Molecular Inversion Probe Assay," available on or before Oct. 14, 2014, via Internet Archive: Wayback Machine URL<https://web.archive.org/web/20141014124037/https://www.ncbi.nlm.nih.gov/probe/docs/techmip/>, retrieved on Jun. 16, 2021, retrieved from URL<https://www.ncbi.nlm.nih.gov/probe/docs/techmip/>, 2 pages.

(56) References Cited

OTHER PUBLICATIONS

Nikiforov et al., "The use of 96-well polystyrene plates for DNA hybridization-based assays: an evaluation of different approaches to oligonucleotide immobilization," Anal Biochem, May 1995, 227(1):201-9.
Nowak et al., "Entering the Postgenome Era," Science, 1995, 270(5235):368-71.
PCT International Search Report and Written Opinion in International Appln. No. PCT/US2019/065100 dated Apr. 6, 2020, 20 pages.
Pemov et al., "DNA analysis with multiplex microarray-enhanced PCR," Nucl. Acids Res., Jan. 2005, 33(2):e11, 9 pages.
Perler et al., "Intervening sequences in an Archaea DNA polymerase gen," Proc Natl Acad Sci USA, Jun. 1992, 89(12):5577-5581.
Petterson et al., "Generations of sequencing technologies," Genomics, 2009, 93(2):105-111.
Polsky-Cynkin et al., "Use of DNA immobilized on plastic and agarose supports to detect DNA by sandwich hybridization," Clin. Chem., 1985, 31(9):1438-1443.
Ranki et al., "Sandwich hybridization as a convenient method for the detection of nucleic acids in crude samples," Gene, 1983, 21(1-2):77-85.
Reijenga et. al., "Buffer Capacity, Ionic Strength and Heat Dissipation in Capillary Electrophoresis," Journal of Chromatography A, Sep. 13, 1996, 744(1-2):147-153.
Reinartz et al., "Massively parallel signature sequencing (MPSS) as a tool for in-depth quantitative gene expression profiling in all organisms," Brief Funct Genomic Proteomic, Feb. 2002, 1(1):95-104.
Rodriques et al., "Slide-seq: A scalable technology for measuring genome-wide expression at high spatial resolution," Science, 2019, 363(6434):1463-1467.
Ronaghi et al., "A sequencing method based on real-time pyrophosphate," Science, Jul. 1998, 281(5375):363-365.
Ronaghi et al., "Real-time DNA sequencing using detection of pyrophosphate release," Analytical Biochemistry, Nov. 1996, 242(1):84-89.
Ronaghi, "Pyrosequencing sheds light on DNA sequencing," Genome Res, Jan. 2001, 11(1):3-11.
Rountenberg et al., "Microfluidic probe: a new tool for integrating microfluidic environments and electronic wafer-orobina," Lab Chip, Oct. 2009, 10: 123-127.
Salmén et al., "Barcoded solid-phase RNA capture for Spatial Transcriptomics profiling in mammalian tissue sections," Nature Protocols, Oct. 2018, 13(11):2501-2534.
Saxonov et al., "10x Genomics, Mastering Biology to Advance Human Health," PowerPoint, 10x, 2020, 41 pages.
Schena et al., "Quantitative monitoring of gene expression patterns with a complementary DNA microarray," Science, Oct. 1995, 270(5235):467-470.
Shalon et al., "A DNA microarray system for analyzing complex DNA samples using two-color fluorescent probe hybridization," Genome Res., Jul. 1996, 6(7):639-45.
Soni and Meller, "Progress toward ultrafast DNA sequencing using solid-state nanopores," Clin Chem., 2007, 53:1996-2001.
Stahl et al., "Visualization and analysis of gene expression in tissue sections by spatial transcriptomics," Science, Jul. 2016, 353(6294):78-82.
Stahl et al., "Visualization and analysis of gene expression in tissue sections by spatial transcriptomics," Supplementary Materials, Science, Jul. 2016, 353(6294):78-82, 41 pages.
Stimpson et al., "Real-time detection of DNA hybridization and melting on oligonucleotide arrays by using optical wave guides," Proc Natl Acad Sci USA, Jul. 1995, 92(14):6379-83.
Strell et al., "Placing RNA in context and space—methods for spatially resolved transcriptomics," The FEBS Journal, 2019, 286(8):1468-1481.

Takei et al., "Integrated Spatial Genomics Reveals Global Architecture of Single Nuclei," Nature, Jan. 27, 2021, 590(7845):344-350, 53 pages.
Taylor et al., "Microfluidic local perfusion chambers for the visualization and manipulation of synapses," Neuron., Apr. 2010, 66(1):57-68, 25 pages.
Thomas et al., "A chamber for the perfusion of in vitro tissue with multiple solutions," J. Neurophysiol., Jul. 2013, 110:269-277.
Tijssen et al., "Overview of principles of hybridization and the strategy of nucleic acid assays" in Techniques in Biochemistry and Molecular Biology—Hybridization with Nucleic Acid Probes, 1993, 24(Chapter 2), 65 pages.
Toy et al., "A Simple Plastic Perfusion Chamber for Continuous Maintenance and Cinematography of Tissue Cultures," Experimental Cell Research, 1958, 14:97-103.
Twyman et al., "Techniques Patents for SNP Genotyping," Pharmacogenomics, Jan. 2003, 4(1):67-79.
Valley et al., "Optoelectronic tweezers as a tool for parallel single-cell manipulation and stimulation," IEEE Trans Biomed Circuits Syst., Dec. 2009, 3(6):424-31.
Van Gelder et al., "Amplified RNA synthesized from limited quantities of heterogeneous cDNA," Proc. Natl. Acad. Sci. USA, 1990, 87(5):1663-1667.
Vasiliskov et al., "Fabrication of microarray of gel-immobilized compounds on a chip by copolymerization," Biotechniques, Sep. 1999, 27(3):592-606.
Vickovic et al., "High-definition spatial transcriptomics for in situ tissue profiling," Nat Methods, Oct. 2019, 16(10):987-990.
Vickovic et al., "SM-Omics: An automated Platform for High-Throughput Spatial Multi-Omics," bioRxiv, Oct. 2020, 40 pages.
Vogelstein et al., "Digital PCR," Proceedings of the National Academy of Sciences, Aug. 1999, 96(16):9236-9241.
Walker et al., "Strand displacement amplification—an isothermal, in vitro DNA amplification technique," Nucleic Acids Research, 1992, 20(7):1691-1696.
Wang et al., "Concentration gradient generation methods based on microfluidic systems," RSC Adv., 2017, 7:29966-29984.
Wang et al., "High-fidelity mRNA amplification for gene profiling," Nature Biotechnology, Apr. 2000, 18(4):457-459.
Wang et al., "Imaging-based pooled CRISPR screening reveals regulators of lncRNA localization," Proc Natl Acad Sci USA, May 2019, 116(22):10842-10851.
Wheeler et al., "Microfluidic device for single-cell analysis," Analytical Chemistry, Jul. 2003, 75(14):3581-3586.
Worthington et al., "Cloning of random oligonucleotides to create single-insert plasmid libraries," Anal Biochem, 2001, 294(2):169-175.
Xia et al., "Spatial transcriptome profiling by MERFISH reveals subcellular RNA compartmentalization and cell cycle-dependent gene expression", Proceedings of the National Academy of Sciences, Sep. 2019, 116(39):19490-19499.
Yershov et al., "DNA analysis and diagnostics on oligonucleotide microchips," Proc. Natl. Acad. Sci. USA, May 1996, 93(10):4913-4918.
Yoda et al., "Site-specific gene expression analysis using an automated tissue micro-dissection punching system," Sci Rep., Jun. 2017, 7(1):4325, 11 pages.
Zhu et al., "Reverse transcriptase template switching: a SMART approach for full-length cDNA library construction," Biotechniques, Apr. 2001, 30(4):892-897.
Kim, "Development of Microdevices for Applications to Bioanalysis," Dissertation for the degree of Doctor of Philosophy, University of Texas at Austin, Aug. 2007, 176 pages.
Sun et al., "Statistical Analysis of Spatial Expression Pattern for Spatially Resolved Transcriptomic Studies," Nature Methods, Jan. 27, 2020, 17(2): 193-200.
Svensson et al., "SpatialDE: identification of spatially variable genes," Nature Methods, May 2018, 15:343-346, 15 pages.

\* cited by examiner

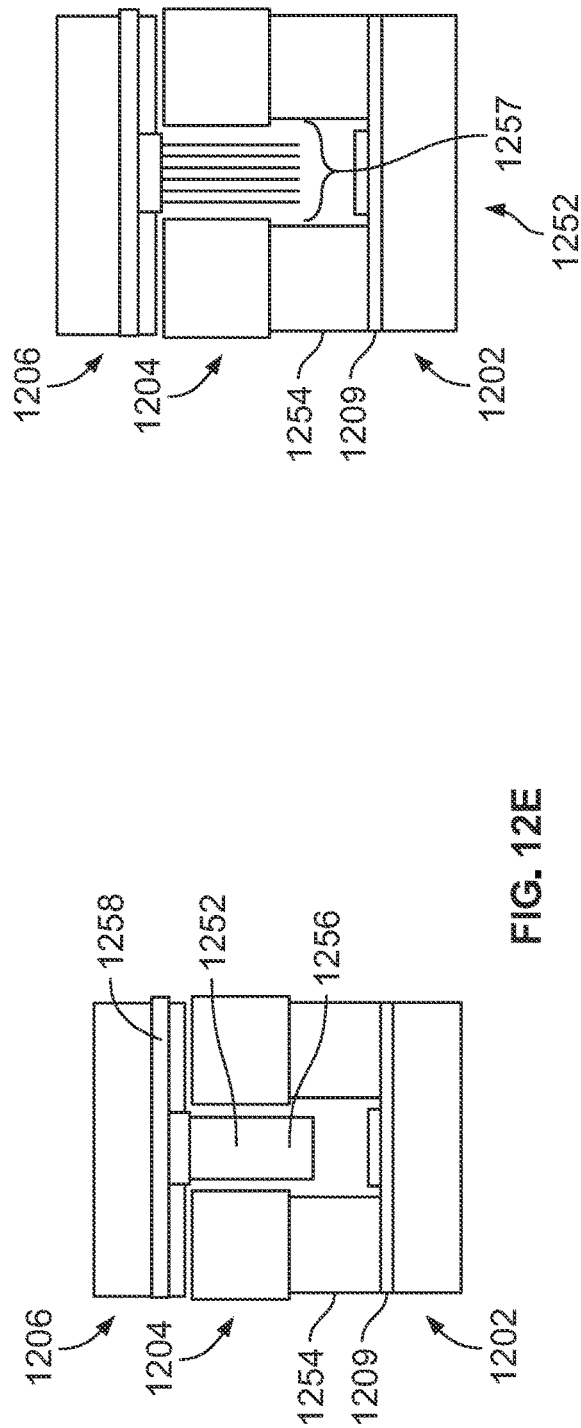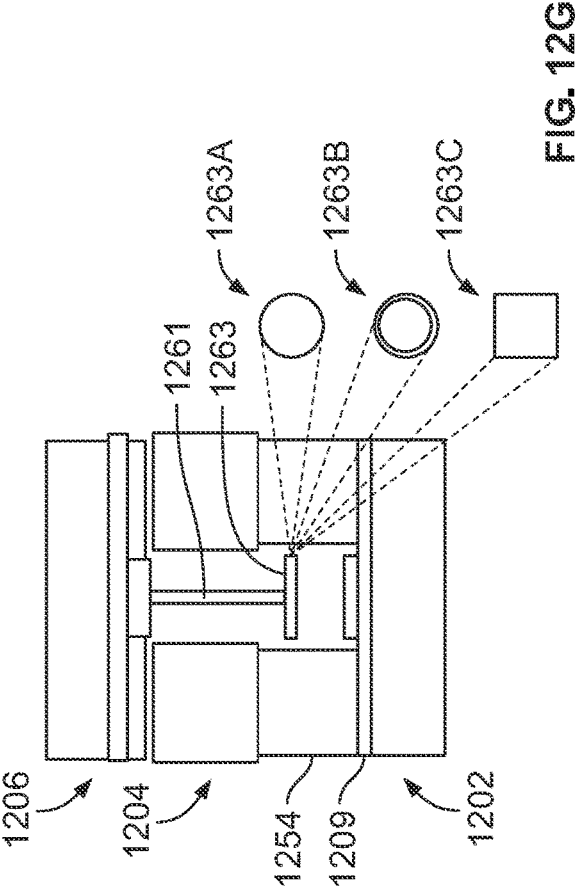

Cathode Electrode
(Single Wire or Rod)

Cathode Electrode
Ring or Multiple Electrodes
in Each Well

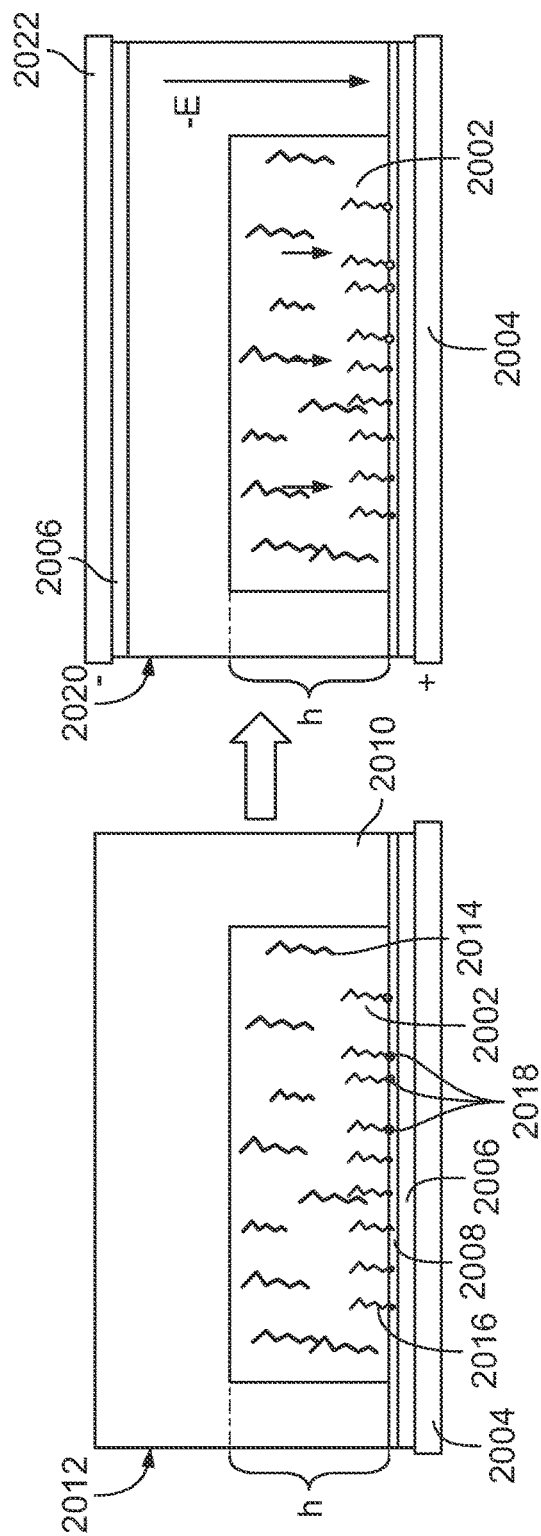
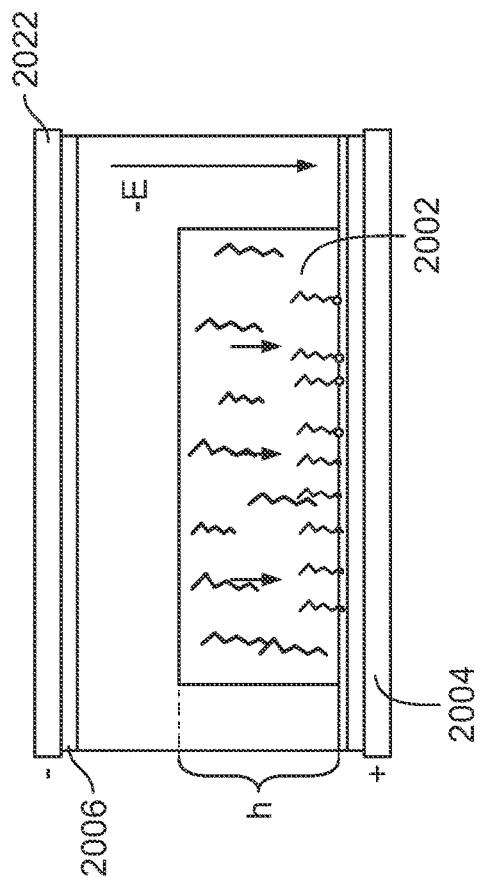
FIG. 20A
FIG. 20B

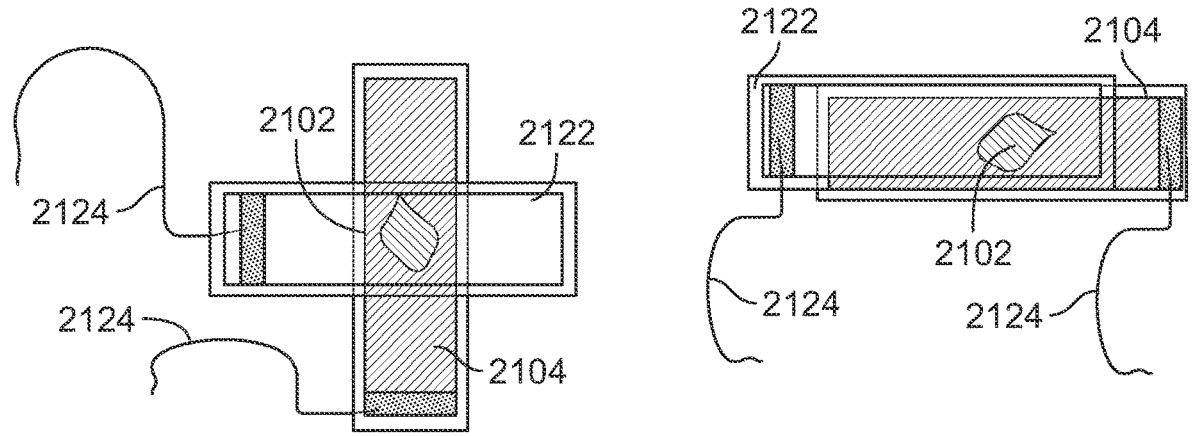
FIG. 21A
FIG. 21B
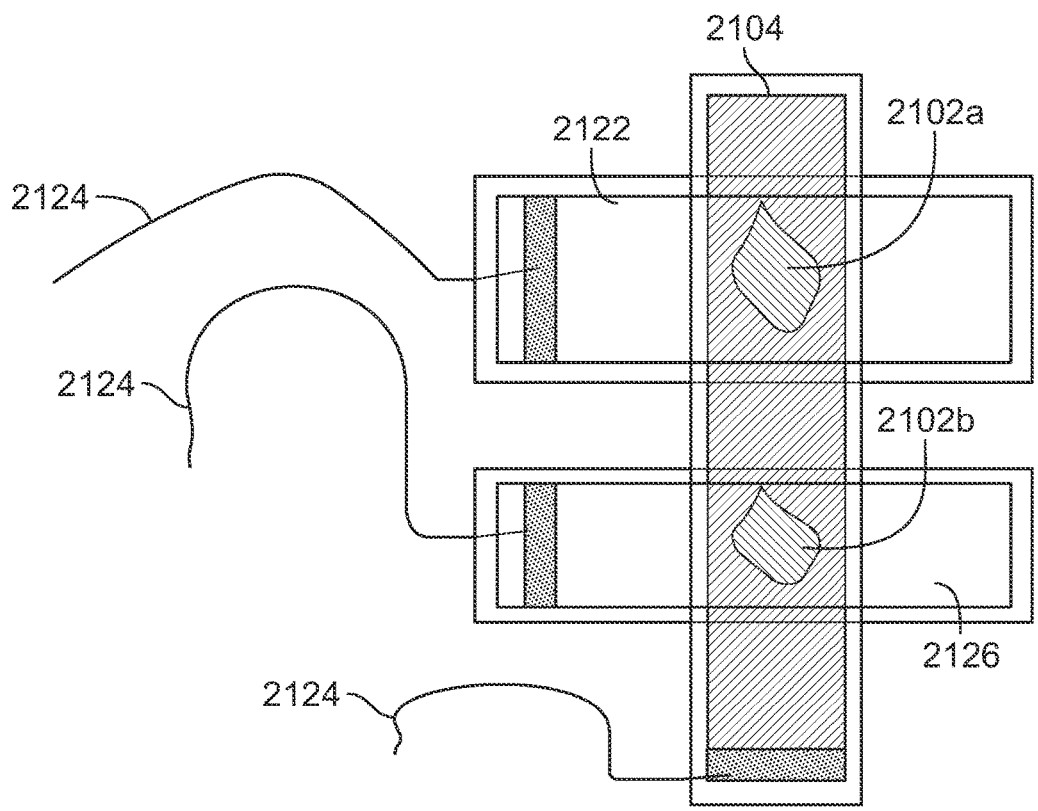
FIG. 21C

ELECTROPHORESIS CASSETTES AND INSTRUMENTATION

CROSS-REFERENCE TO RELATED APPLICATION

This application is a National Stage Application under 35 U.S.C. § 371 and claims the benefit of International Application No. PCT/US2021/032944, filed May 18, 2021, which claims the benefit of U.S. Patent Application Ser. No. 63/026,975 titled ELECTROPHORESIS CASSETTES AND INSTRUMENTATION, filed May 19, 2020, the disclosure of which is hereby incorporated by reference in its entirety.

BACKGROUND

Cells within a tissue have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, e.g., the cell's morphology, differentiation, fate, viability, proliferation, behavior, signaling, and cross-talk with other cells in the tissue.

Spatial heterogeneity has been previously studied using techniques that typically provide data for a handful of analytes in the context of intact tissue or a portion of a tissue (e.g., tissue section), or provide significant analyte data from individual, single cells, but fails to provide information regarding the position of the single cells from the originating biological sample (e.g., tissue).

Various methods have been used to prepare a biological sample for analyzing analyte data in the sample. In some applications, a biological sample can be permeabilized to facilitate transfer of analytes out of the sample, and/or to facilitate transfer of species (such as capture probes) into the sample.

SUMMARY

This document generally relates to electrophoretic devices, apparatuses, systems, instruments, and methods for analyte migration.

In general, electrophoresis can be used to migrate analytes from a sample toward a substrate that includes capture probes for spatial transcriptomics applications in order to enhance sensitivity and/or resolution. The present disclosure provides various implementations of electrophoretic devices, systems and instruments to improve electrophoresis and ease of use. Electrophoretic systems and instruments described herein provide different designs for electrode geometry and/or placement, and further provide different approaches for electrical interfacing between components. For example, various configurations of electrophoretic systems and instruments described herein utilize different electrode designs that can result in uniform electromigration of analytes. Further, the electrophoretic systems described herein consider that, where a sample tissue is very thin, relatively small angles of the electric field has no or little effect on drift of analyte migration. Moreover, various implementations of electrophoretic systems and instrumentations optimize the size and/or location (x, y, z directions) of electrodes (e.g., cathode) relative to a sample, thereby increasing uniformity of electric field and reducing or minimizing drift of analyte migration. In addition, the electrophoresis systems and instruments described herein provides a solution to conveniently check for electrical connections in the systems and instruments, and alert users of potential improper electrical connections, prior to performing electrophoresis.

Particular implementations of the present disclosure described herein provide an electrophoretic system for analyte migration. The system includes a substrate, a substrate cassette, a cathode assembly, and a power supply. The substrate may include a plurality of regions. Each region may be electrically conductive and further configured to comprise one or more capture probes and a biological sample comprising an analyte. The substrate may include a first electrode contact. The first electrode contact may be electrically connected to at least one of the plurality of regions. The substrate cassette may be disposed at the substrate and include a plurality of apertures corresponding to the plurality of regions of the substrate. The plurality of apertures may define a plurality of buffer chambers comprising the plurality of regions of the substrate. The substrate cassette may comprise a connection interface electrically coupled to the first electrode contact of the substrate. In some implementations, the substrate cassette may comprise the connection interface that exposes the first electrode contact of the substrate. The cathode assembly may include a plurality of electrodes positioned within the plurality of buffer chambers of the substrate cassette, respectively. The cathode assembly may include a second electrode contact. The second electrode contact may be electrically connected to at least one of the plurality of electrodes. The power supply may be electrically connected with the first electrode contact of the substrate at the connection interface of the substrate cassette, and electrically connected with the second electrode contact of the cathode assembly. The power supply may generate an electric field between the plurality of regions and the plurality of electrodes, respectively, such that the analyte in the biological sample migrates toward the capture probe on the substrate.

In some implementations, the system described herein can include one or more of the following features. The capture probe may be coated, spotted or printed on each of the plurality of regions. The biological sample may be placed in contact with one or more of the plurality of regions on the substrate. The substrate cassette may include a substrate holder including a substrate mount for securing the substrate, and a gasket including a plurality of gasket apertures configured to align with the plurality of regions when the substrate is secured by the substrate holder. The plurality of apertures may include the plurality of gasket apertures. The substrate holder may include a plurality of holder apertures configured to align with the plurality of gasket apertures when the substrate is secured by the substrate holder. The plurality of apertures may include the plurality of gasket apertures and the plurality of holder apertures. The substrate may include a glass slide coated with a conductive material. The conductive material may include at least one of tin oxide (TO), indium tin oxide (ITO), a transparent conductive oxide (TCO), aluminum doped zinc oxide (AZO), fluorine doped tin oxide (FTO), or any combination thereof. The electrophoretic system may include a first electrical wire connecting the power supply to the first electrode contact, and a second electrical wire connecting the power supply to the second electrode contact. The plurality of buffer chambers may receive a buffer. The buffer may include a permeabilization reagent. The electrophoretic system may include a light configured to illuminate onto the plurality of regions to permeabilize the biological sample on the plurality of regions. The sample may be permeabilized using a detergent before, after, or during enzymatic treatment. The sample may be permeabilized with a lysis reagent being added to the sample. The sample may be permeabilized by exposing the sample to a protease.

The substrate cassette may include a body defining a cavity configured to partially receive the substrate. The connection interface of the substrate cassette may include a slit defined at the body and configured for the substrate to partially extend out from the body such that the first electrode contact of the substrate is positioned outside the body. The body may include a main face and a lateral face extending from a periphery of the main face. The plurality of the apertures may be defined at the main face of the body. The slit may be defined at the lateral face of the body.

The substrate cassette may include a body defining a cavity configured to receive the substrate. The connection interface of the substrate cassette may include a contact opening defined at the body and configured to expose the first electrode contact of the substrate there through. The body may include a main face and a lateral face extending from a periphery of the main face. The plurality of the apertures may be defined at the main face of the body. The contact opening may be defined at the main face adjacent the lateral face. The contact opening may be defined further at the lateral face of the body to extend from the main face to the lateral face.

The electrophoretic system may include a first contact pin electrically attached to the substrate and providing the first electrode contact. The substrate cassette may include a body defining a cavity configured to receive the substrate. The connection interface of the substrate cassette may include a contact hole defined at the body and configured to expose the first contact pin therethrough. The body may include a main face and a lateral face extending from a periphery of the main face. The plurality of the apertures may be defined at the main face of the body. The contact hole may be defined at the main face.

The substrate cassette may include a body defining a cavity configured to receive the substrate, and a contact pin extending through a wall of the body and having a first end and a second end opposite to the first end. The first end may be arranged exterior of the body, and the second end may be arranged interior of the body and configured to electrically contact with the first electrode contact of the substrate. The electrophoretic system may include a contact bracket that electrically engages with the substrate and provides the first electrode contact of the substrate. The second end of the contact pin may electrically contact with the contact bracket.

The cathode assembly may include a cathode body configured to position at least partially on the substrate cassette. The plurality of electrodes may project from the cathode body. Each of the plurality of electrodes may include at least one of a conductive wire, a conductive rod, or an array of conductive wires. Each of the plurality of electrodes may include a conductive plate at a distal end of the at least one of the conductive wire, the conductive rod, or the array of conductive wires. The conductive plate may be configured as at least one of a circular plate, a square plate, or a ring. The cathode body may include the second electrode contact.

The substrate cassette may include a second aperture corresponding to the first electrode contact of the substrate and configured to define a second buffer chamber on the first electrode contact of the substrate. The plurality of buffer chambers may contain a first buffer. The second chamber may contain a second buffer different from the first buffer. The second buffer may have an electrolyte strength greater than the first buffer. The second buffer may include a sodium chloride solution. The cathode assembly may include a cathode body configured to position at least partially on the substrate cassette. The plurality of electrodes may project from the cathode body and be configured to position within the plurality of buffer chambers, respectively. The cathode assembly may include a second electrode projecting from the cathode body and configured to position within the second chamber. The cathode body may include an anode contact that is electrically connected to the second electrode. The power supply may be electrically connected to the anode contact of the cathode body so that the power supply is electrically connected with the first electrode contact of the substrate via the second electrode that positions within the second chamber containing the second buffer on the first electrode contact of the substrate.

The substrate cassette may include a cassette body defining a cavity configured to receive the substrate. The cassette body may include the cathode assembly such that the plurality of electrodes are configured to position within the plurality of buffer chambers. The substrate cassette may include a plurality of cathode contact pins extending through a wall of the cassette body and electrically contacting with the second electrode contact such that the cathode contact pin is electrically connected to the at least one of the plurality of electrodes. Each of the plurality of electrodes may include at least one of a conductive wire, a conductive rod, or an array of conductive wires. Each of the plurality of electrodes may include a conductive plate at a distal end of the at least one of the conductive wire, the conductive rod, or the array of conductive wires. The cassette body may include an anode contact pin extending through the wall of the body and having a first end and a second end opposite to the first end. The first end may be arranged exterior of the cassette body and the second end may be arranged interior of the cassette body and configured to electrically contact with the first electrode contact of the substrate. The electrophoretic system may include a contact bracket that electrically engages with the substrate and provides the first electrode contact of the substrate. The second end of the anode pin may electrically contact with the contact bracket.

The body may include the cathode assembly such that the plurality of electrodes are configured to position within the plurality of buffer chambers. The substrate cassette may include a cathode contact pin extending through a wall of the body and electrically contacting with the second electrode contact such that the cathode contact pin is electrically connected to the at least one of the plurality of electrodes. The substrate cassette may include an anode contact pin extending from the body, and a conductive wire having a first end and an opposite second end. The first end may be electrically connected to the anode contact pin, and the second end may be electrically connected to the first electrode contact that is positioned outside the body.

The electrophoretic system may include an anode cassette body and an anode contact pin. The anode cassette body may define a cavity configured to receive the first electrode contact of the substrate that is positioned outside the body of the substrate cassette. The anode contact pin may extend through a wall of the anode cassette body and have a first end and a second end opposite to the first end. The first end may be arranged exterior of the anode cassette body and the second end may be arranged interior of the anode cassette body and configured to electrically contact with the first electrode contact of the substrate. The electrophoretic system may include an anode contact bracket that electrically engages with the substrate and provides the first electrode contact of the substrate. The second end of the anode contact pin may electrically contact with the anode contact bracket.

The electrophoretic system may include a system housing including the power supply, a cassette tray that extends from the system housing and is configured to receive the substrate cassette thereon, and a cassette cover that extends from the system housing above the cassette tray.

The electrophoretic system may include a system housing including the power supply, a cassette tray that extends from the system housing and is configured to receive the substrate cassette thereon, and a cassette cover that extends from the system housing above the cassette tray. The cassette cover may include a cathode connector and an anode connector. The cathode connector may electrically engage with the cathode contact pin of the substrate cassette. The anode connector may electrically engage with the anode contact pin of the substrate cassette.

The electrophoretic system may include a system housing including the power supply, a cassette tray that extends from the system housing and is configured to receive the substrate cassette thereon, and a cassette cover that extends from the system housing above the cassette tray and includes the cathode assembly. The plurality of electrodes may project from the cassette cover toward the plurality of chambers of the substrate cassette. The cassette cover may include an anode connector configured to electrically engage with the contact pin of the substrate cassette.

Particular implementations of the present disclosure described herein provide a method for analyte migration. The method may include loading a substrate comprising capture probes with a substrate cassette into an electrophoresis instrument, the substrate cassette including a plurality of buffer chambers, the substrate including a plurality of regions each comprising one or more capture probes and a biological sample containing an analyte; arranging a cathode to place a plurality of electrodes within the plurality of buffer chambers, respectively; electrically connecting a power supply to the substrate; electrically connecting the power supply to the cathode; applying a first voltage between the substrate and the cathode; detecting an output parameter in response to the first voltage; determining whether the output parameter meets a threshold value; and based on the output parameter meeting the threshold value, applying a second voltage to generate electric fields between the plurality of regions of the substrate and the plurality of electrodes through the plurality of buffer chambers to cause the analytes in the biological samples to move toward the capture probes on the substrate.

In some implementations, the method described herein can optionally include one or more of the following features. The output parameter may be an impedance. The threshold value may be indicative of a propriety of at least one of an electrical connection of the power supply to the substrate, an electrical connection of the power supply to the cathode, or an electrical property of the buffers. The method may include, based on the output parameter not meeting the threshold value, generating a notification to inform an electrical connection is improper; and ceasing to apply the second voltage to generate the electric fields. The threshold value may be a predetermined range of value. The method may include, prior to loading the substrate with the substrate cassette, placing the biological samples in contact with the capture probes on the substrate; arranging the substrate cassette onto the substrate to align a plurality of apertures of the substrate cassette with a plurality of regions of the substrate and define the plurality of buffer chambers on the plurality of regions; and supplying buffers in the plurality of buffer chambers.

All publications, patents, and patent applications mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated.

The term "each," when used in reference to a collection of items, is intended to identify an individual item in the collection but does not necessarily refer to every item in the collection, unless expressly stated otherwise, or unless the context of the usage clearly indicates otherwise.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternatives to the specific embodiments described herein are also within the scope of this disclosure.

DESCRIPTION OF DRAWINGS

The following drawings illustrate certain embodiments of the features and advantages of this disclosure. These embodiments are not intended to limit the scope of the appended claims in any manner. Like reference symbols in the drawings indicate like elements.

FIG. 12E is a schematic cross sectional side view of the cathode assembly, the substrate cassette, and the substrate of FIG. 12C, in which the cathode assembly has another example electrode.

FIG. 12F is a schematic cross sectional side view of the cathode assembly, the substrate cassette, and the substrate of FIG. 12C, in which the cathode assembly has yet another example electrode.

FIG. 12G is a schematic cross sectional side view of the cathode assembly, the substrate cassette, and the substrate of FIG. 12C, in which the cathode assembly has yet another example electrode.

FIG. 20A shows a schematic of an example analytical workflow in which electrophoretic migration of analytes is performed after permeabilization.

FIG. 20B shows a schematic of an example analytical workflow in which electrophoretic migration of analytes and permeabilization are performed simultaneously.

FIG. 21A shows an example perpendicular, single slide configuration for use during electrophoresis.

FIG. 21B shows an example parallel, single slide configuration for use during electrophoresis.

FIG. 21C shows an example multi-slide configuration for use during electrophoresis.

DETAILED DESCRIPTION

As described herein, electrophoresis can be used to migrate analytes from a sample toward a substrate that includes capture probes for spatial transcriptomics applications in order to enhance sensitivity and/or resolution. The present disclosure provides various implementations of electrophoretic systems and instruments to improve electrophoresis and ease of use. Electrophoretic systems and instruments described herein provide different designs for electrode geometry and/or placement, and further provide different approaches for electrical interfacing between components. For example, various configurations of electrophoretic systems and instruments described herein utilize different electrode designs that can result in uniform electromigration of analytes. Further, the electrophoretic systems described herein consider that, where a sample tissue is very thin, relatively small angles of the electric field has no or little effect on drift of analyte migration. Moreover, various implementations of electrophoretic systems and instrumentations optimize the size and/or location (x, y, z directions) of electrodes (e.g., cathode) relative to a sample, thereby increasing uniformity of electric field and reducing or minimizing drift of analyte migration. In addition, the electrophoresis systems and instruments described herein provide a solution to conveniently check for electrical connections in the systems and instruments, and alert users of potential improper electrical connections, prior to performing electrophoresis.

Figure 1A:
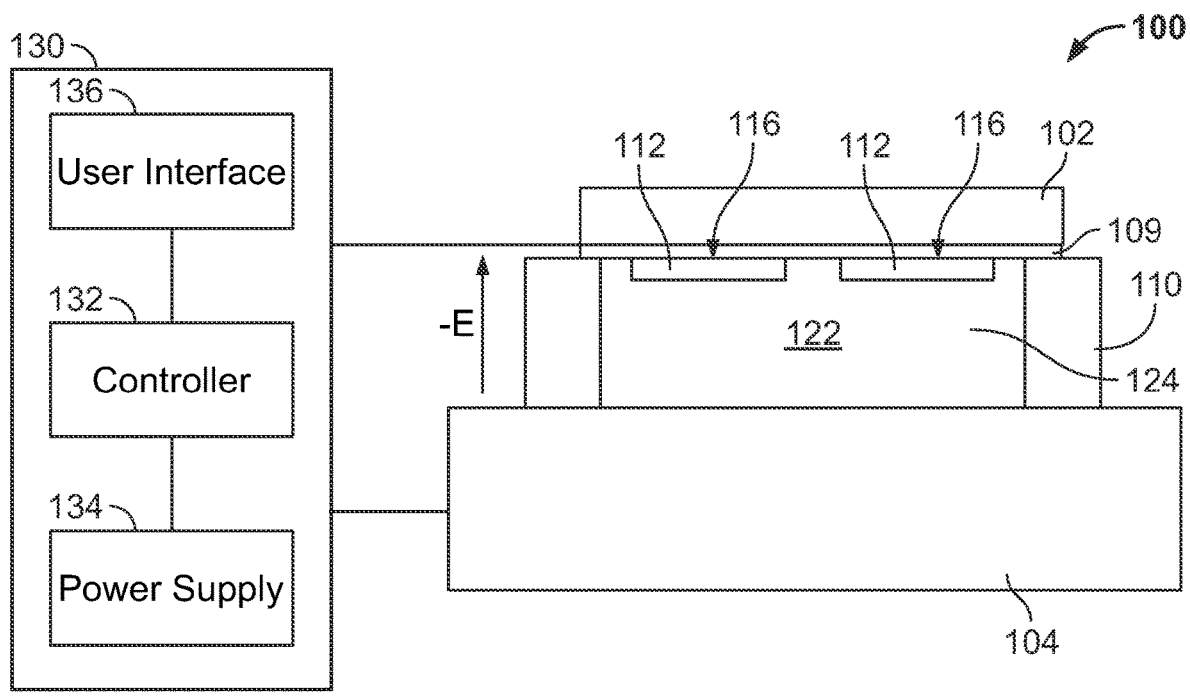
FIGS. 1A-B are schematic side and top views of an example electrophoretic system for analyte migration.
Figure 1B:
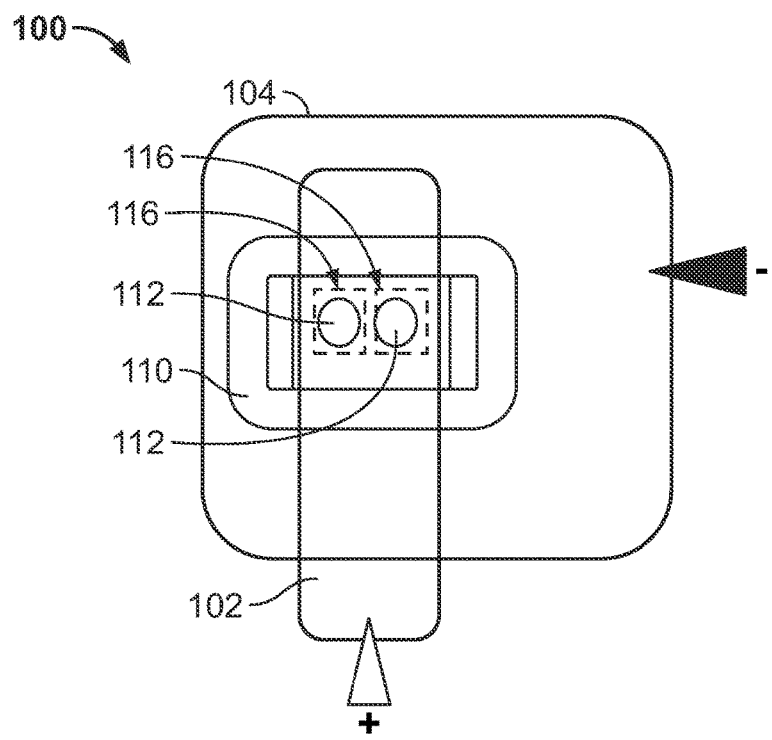

FIGS. 1A-B are schematic side and top views of an example electrophoretic system 100 for analyte migration. In some implementations, the system 100 is configured similarly to electrophoretic systems described herein, for example with reference to FIGS. 20A-B and 21A-C. The system 100 can be used to actively cause analytes described herein (e.g., nucleic acids, proteins, charged molecules, etc.) in a biological sample to migrate to capture probes on a substrate. In some implementations, the system 100 can include a substrate 102 as a first electrode (e.g., anode), a second electrode 104 (e.g., cathode), and a spacer 110 disposed between the substrate 102 and the second electrode 104.

Figure 2:
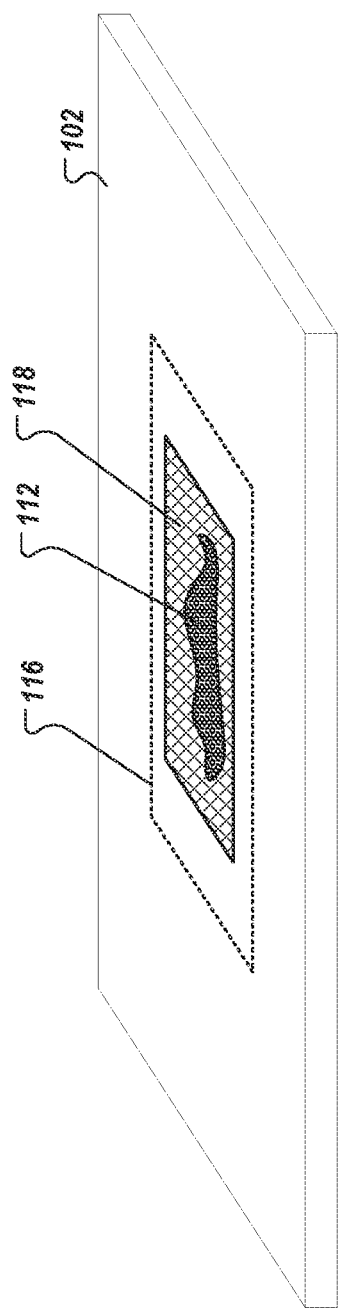
FIG. 2 is a schematic perspective view of an example substrate.
Figure 3:
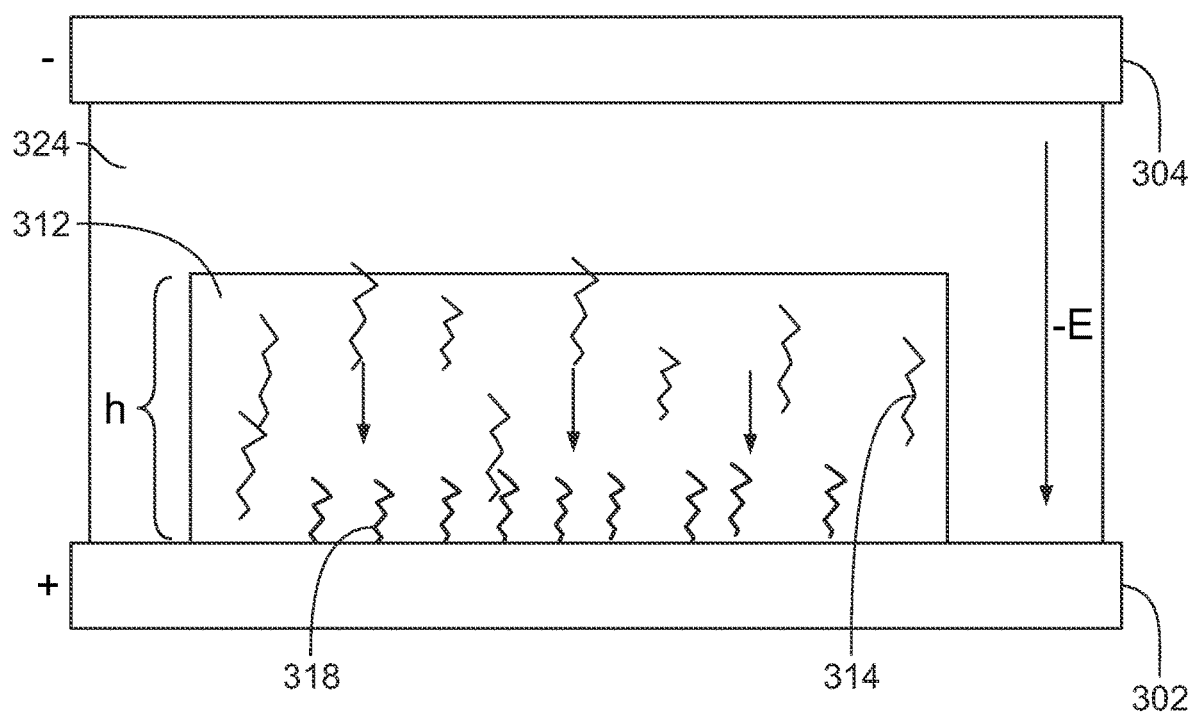
FIG. 3 illustrates an example configuration of a substrate and a sample undergoing electrophoretic process using the electrophoretic system of FIGS. 1A-B.

Referring also to FIG. 2, the substrate 102 is configured to place a biological sample 112 that contains one or more analytes 314 (not shown in FIG. 2; see FIG. 3). By way of example, the biological sample 112 can be one or more cells or a tissue sample including one or more cells. The substrate 102 can include one or more regions 116 for placing or containing a sample 112 thereon. In some implementations, the substrate 102 can further comprise one or more capture probes 118 on a substrate region 116. The capture probes 118 can be placed on the substrate region 116 in a variety of ways described herein. For example, the capture probes 118 can be attached (e.g., directly or indirectly, reversibly or non-reversibly) to a region on an array. Alternatively or in addition, the capture probes 118 can be immobilized on the substrate region 116 of the substrate 102. The sample 112 can be placed and manipulated on the substrate 102 in various ways described herein. In some implementations, the biological sample can be placed in contact with the capture probes on each region. Alternatively, the biological samples do not make contact with the capture probes. For example, an intermediate layer (e.g., gels) can be disposed between the substrate and the sample, which is compatible with electrophoresis.

In some implementations, the substrate 102 is configured to be used as a first electrode in the system 100. For example, the substrate 102 can be used as an anode. In another example, the substrate 102 can be used as a cathode. The substrate 102 can be configured to be conductive at least in the substrate region 116. In some implementations, the substrate 102 can be configured as a conductive substrate described herein. For example, the substrate 102 can include one or more conductive materials that permit the substrate 102 to function as an electrode (e.g., the anode). Examples of such a conductive material include tin oxide (TO), indium tin oxide (ITO), a transparent conductive oxide (TCO), aluminum doped zinc oxide (AZO), fluorine doped tin oxide (FTO), or any combination thereof. Alternatively or in addition, other materials may be used to provide desired conductivity to the substrate 102. In some implementations, the substrate 102 can be coated with the conductive material. For example, the substrate 102 can include a conductive coating 109 (FIG. 1A) on the surface of the substrate 102, and a sample 112 is provided on the coating 109 of the substrate 102. In other implementations, the substrate 102 can be made partially or entirely of a conductive material. For example, a sample (e.g., tissue section) can be directly placed on a conductive material (e.g., graphite, silicon, other semiconductive material, etc.). The substrate 102 can be made of glass or other transparent material for imaging purposes.

Although the substrate 102 is illustrated to include a single substrate region 116 in FIG. 2, other implementations of the substrate 102 can include a plurality of substrate regions (e.g., two substrate regions in FIGS. 1A-B, eight substrate regions in FIG. 4, etc.) configured to place multiple samples thereon, respectively. Each of such multiple substrate regions can be configured similarly to the first substrate region 116 described herein.

Referring to FIGS. 1A-B, where the substrate 102 is used as the anode, the second electrode 104 is configured as a cathode. In this example, therefore, the second electrode 104 can also be referred to as the cathode 104. As described herein, the cathode 104 can be provided in various configurations.

In some implementations, the substrate 102 and the cathode 104 can be arranged within a container (e.g., substrate cassettes described herein) that defines a buffer chamber 122 between the substrate 102 and the cathode 104. The buffer chamber 122 is configured to contain a buffer 124. In some implementations, the substrate 102 and the cathode 104 can be fully immersed into the buffer 124. In alternative implementations, either or both of the substrate 102 and the cathode 104 can be partially inserted into the buffer 124 located in the container.

The buffer 124 can be of various types. In some implementations, the buffer 124 includes a permeabilization reagent. In some embodiments, the buffer 124 is contained in the buffer chamber 122 throughout the electrophoretic process. The permeabilization reagent can permeabilize the sample before and/or during electrophoresis. In addition or alternatively, the sample can be permeabilized using other methods described herein, independently or in conjunction with permeabilization using the permeabilization reagent.

The spacer 110 can be disposed between the substrate 102 and the cathode 104 to separate the substrate 102 and the cathode 104 by a distance D. The spacer 110 can include a non-conductive material, such as plastic, glass, porcelain, rubber, silicone, etc. The distance D can be determined to provide a desired level of spatial resolution based on several factors, such as the strength and/or duration of an electric field generated between the substrate 102 and the cathode 104, and other parameters described herein. The spacer 110 can define at least part of the buffer chamber 122 between the substrate 102 and the cathode 104.

The control system 130 can generate an electric field (−E) between the substrate 102 and the cathode 104. The control system 130 can include a controller 132 configured to apply a voltage between the substrate 102 and the cathode 104 using a power supply 134. The power supply 134 can include a high voltage power supply. The controller 132 can be electrically connected to the substrate 102 and the cathode 104, for example using electrical wires. The control system 130 can include a user interface 136 configured to receive a user input of starting or stopping the electrophoretic process. The user interface 136 can include various types of input devices, such as a graphic user interface, physical or virtual buttons, switches, keypads, keyboard, etc., configured to receive a user input for adjusting operating parameters of the system 100 or for accessing other information (e.g., instructions) associated with the system 100. Examples of operating parameters can include, but are not limited to, voltage applied, duration of voltage application, etc. In some implementations, the input devices can be used to select a subset of substrate regions 116 on the sample 112 so that the subset of substrate regions 116 are electrically activated to generate an electric field between the subset of substrate regions 116 and the cathode 104. In addition, the user interface 136 can include an output device, such as a display, lamps, etc., configured to output the operating parameters of the system 100 or other information associated with the system 100.

FIG. 3 illustrates an example configuration of a substrate and a sample undergoing electrophoresis using the electrophoretic system 100. The configuration and process illustrated in FIG. 3 may be similar to the electrophoretic processes described herein, for example with reference to FIGS. 21A-C. Referring to FIG. 3, the application of an electric field (−E) causes the analytes 314 (e.g., negatively charged analytes) to move towards the capture probes 318 (e.g., positively charged analytes) in the direction of the arrows shown. In some implementations, the analytes 314 include a protein or a nucleic acid. In some embodiments, the analytes 314 are negatively charged proteins or nucleic acids. In some embodiments, the analytes 314 include a positively charged protein or a nucleic acid. In some embodiments, the analytes 314 includes a negatively charged transcript. For example, the analytes 314 include a polyA transcript. In some implementations, a detergent or other reagent can be added to change the charge of the analytes. For example, SDS as used in SDS-PAGE can coat the proteins and substantially provide a uniform negative charge on the proteins. Other implementations can be used to change the charge of molecule with a covalent attachment of another charged molecule. Yet another option is to change the pH of the solution.

In some embodiments, the capture probes 318 are configured as a coating that is in contact with the substrate 302 (e.g., a coating provided on the surface of the substrate 302). In some embodiments, the capture probes 318 can include a feature array, or can be replaced by a feature array. In some implementations, the feature array can be the same as the substrate region described herein. In alternative embodiments, the feature array can be different from the substrate region described herein. In some embodiments, the analytes 314 move towards the capture probes 318 for a distance (h). In some embodiments, the buffer 324 (e.g., permeabilization reagent) can be in contact with the sample 312, the substrate 302, the cathodes 304, or any combination thereof. The buffer 324 can include any of the permeabilization reagents disclosed including but not limited to a dried permeabilization reagent, a permeabilization buffer, a buffer without a permeabilization reagent, a permeabilization gel, and a permeabilization solution.

Referring to FIGS. 4-16, various configurations of an electrophoretic system 100 are described. In general, as described herein, the system 100 can include a substrate, a substrate cassette, a cathode assembly (e.g., FIGS. 12-13), and a control system. The substrate can be configured similarly to the substrate 102 or other substrate described herein. The substrate cassette can be configured to be disposed on the substrate and define buffer chambers (e.g., the buffer chambers 122) on the substrate. The cathode assembly is configured to implement the cathode 104 described herein. For example, the cathode assembly can include a plurality of electrodes configured to position within the plurality of buffer chambers of the substrate cassette, respectively. The control system can be configured similarly to the control system 130. For example, the control system includes a power supply electrically connected with the substrate and the cathode assembly and can supply power to generate electric field between the substrate (e.g., respective substrate regions thereof) and the cathode assembly (e.g., the plurality of electrodes thereof) such that the analytes in biological samples migrate toward capture probes on the substrate.

Referring to FIGS. 4A-D, an example of a substrate cassette 404 is described. The substrate cassette 404 includes a body 410 and a plurality of apertures 412. The body 410 can be configured to mount onto the substrate 402, or receive the substrate 402. For example, the body 410 is configured to define a cavity that can receive at least a portion of the substrate 402. The plurality of apertures 412 are configured and arranged in the body 410 such that, when the substrate cassette 404 is disposed on, or receives, the substrate 402, the plurality of apertures 412 are aligned with a plurality of substrate regions 416 (FIG. 4B) of the substrate 402 and define a plurality of buffer chambers on the plurality of substrate regions 416 of the substrate 402.

Figure 4A:
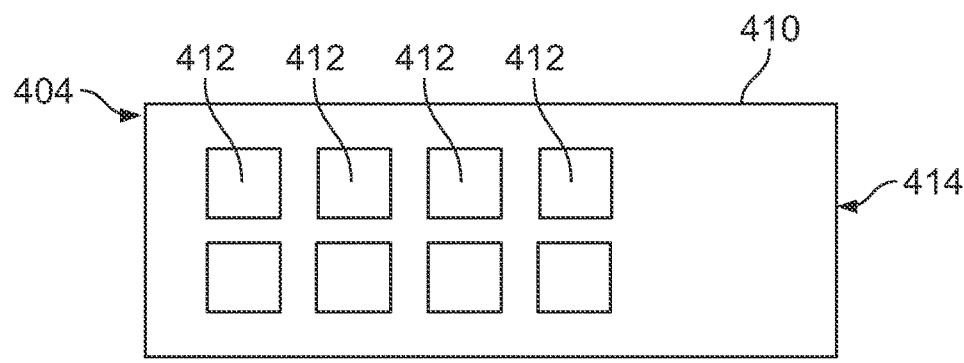
FIG. 4A is a schematic top view of an example substrate cassette.
Figure 4B:
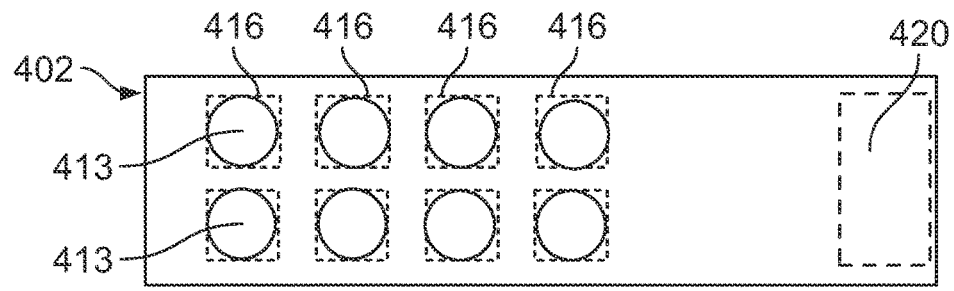
FIG. 4B is a schematic top view of an example substrate for use with the substrate cassette of FIG. 4A.
Figure 4C:
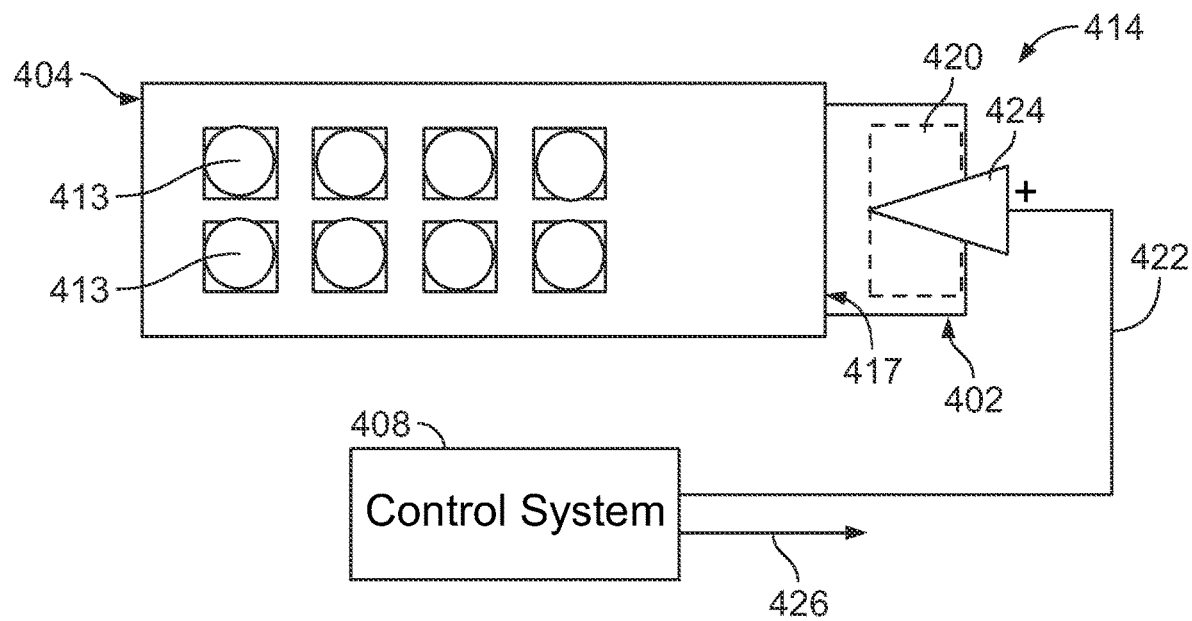
FIG. 4C is a schematic top view of the substate cassette of FIG. 4A that receives the substrate of FIG. 4B.
Figure 4D:
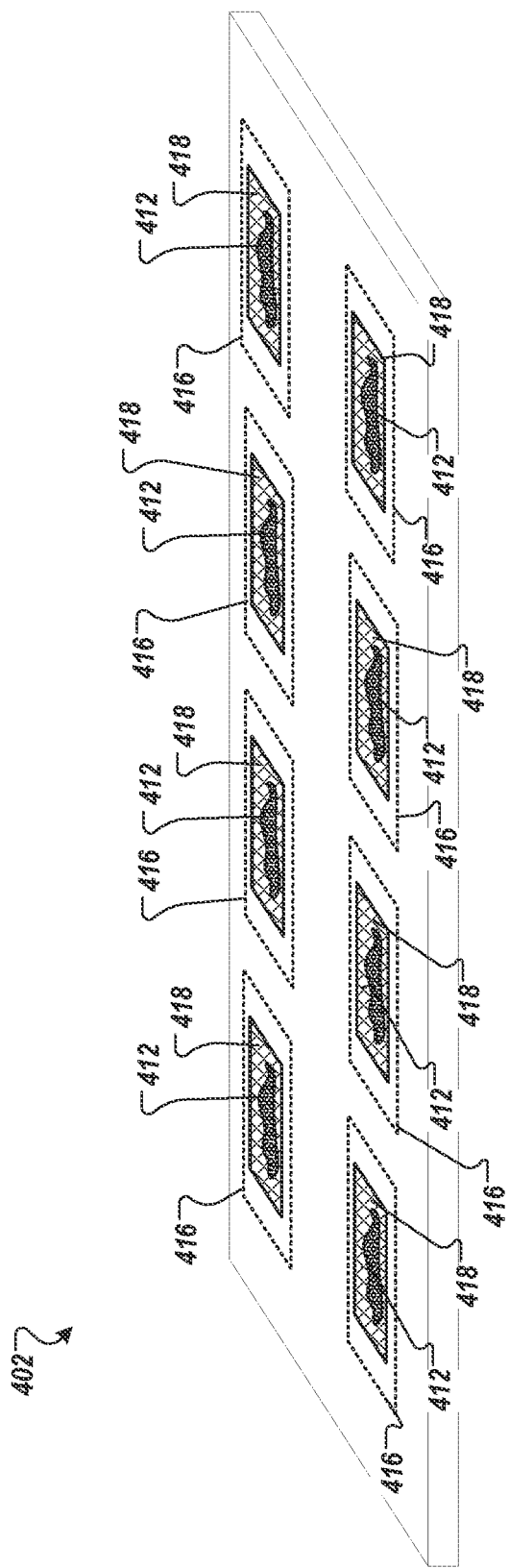
FIG. 4D is a schematic perspective view of an example substrate for use with the substrate cassette of FIG. 4A.

Referring also to FIG. 4D, the substrate 402 can be configured similarly to the substrate 102. The substrate 402 is configured to place a plurality of biological samples 413 that contains one or more analytes. By way of example, each biological sample 413 can be one or more cells or a tissue sample including one or more cells. The substrate 402 can include a plurality of substrate regions 416 for placing or containing the samples 413 thereon. In some implementations, the substrate 402 can further comprise one or more capture probes 418 on each substrate region 416. The capture probes 418 can be placed on the substrate region 416 in a variety of ways described herein. For example, the capture probes 418 can be directly attached (e.g., reversibly or non-reversibly) to a feature on an array. In another example, the capture probes 418 can be indirectly attached (e.g., reversibly or non-reversibly) to a feature on an array. Alternatively or in addition, the capture probes 418 can be immobilized on the substrate region 416 of the substrate 402. The sample 413 can be prepared on the substrate 402 in various ways described herein.

In some implementations, the substrate 402 is configured to be used as a first electrode in the electrophoretic system 100. For example, the substrate 402 can be used as an anode. In another example, the substrate 402 can be used as a cathode. The substrate 402 can be configured as a conductive substrate described herein. For example, the substrate 402 can include one or more conductive materials that permit the substrate 402 to function as an electrode (e.g., the anode). Examples of such a conductive material include tin oxide (TO), indium tin oxide (ITO), a transparent conductive oxide (TCO), aluminum doped zinc oxide (AZO), fluorine doped tin oxide (FTO), and any combination thereof. Alternatively or in addition, other materials may be used to provide desired conductivity to the substrate 402. In some implementations, the substrate 402 can be coated with the conductive material. For example, the substrate 402 can include a conductive coating on the surface of the substrate or each substrate region of the substrate, and the sample 413 is provided on the coating of the substrate 402 or each substrate region thereof.

Referring back to FIG. 4B, the substrate 402 includes a first electrode contact 420 for electrical connection to the control system 408 (e.g., a power supply thereof). For example, the first electrode contact 420 can be electrically connected with a first wire 422 (FIG. 4C) extending from the control system 408. The first electrode contact 420 is electrically connected to the plurality of substrate regions 416.

The substrate cassette 404 further includes a connection interface 414 configured to expose the first electrode contact 420 of the substrate 402 for electrical connection to the control system 408. For example, the substrate cassette 404 can include a slit 417 as the connection interface 414. The slit 417 can be defined at the body 410. As illustrated in FIG. 4C, where the substrate 402 is received in the substrate cassette 404, the slit 417 of the substrate cassette 404 can permit the substrate 402 to partially extend out from the body 410 such that the first electrode contact 420 of the substrate 402 is positioned outside the body 410. The control system 408 can be connected to the substrate 402 via the first electrode contact 420 exposed from the substrate cassette 404. For example, the first wire 422 extending from the control system 408 can be electrically connected to the first electrode contact 420 outside the substrate cassette 404. The first wire 422 can include a connecting pin or clip 424 that can be removably attached to the first electrode contact 420 of the substrate 402. Other types of fastening mechanisms can be used to connect the first wire 422 to the first electrode contact 420 of the substrate 402.

Referring to FIGS. 5-8, various examples of a substrate cassette 204 are illustrated. A substrate cassette 204 can also be referred to as a substrate holder.

Figure 5:
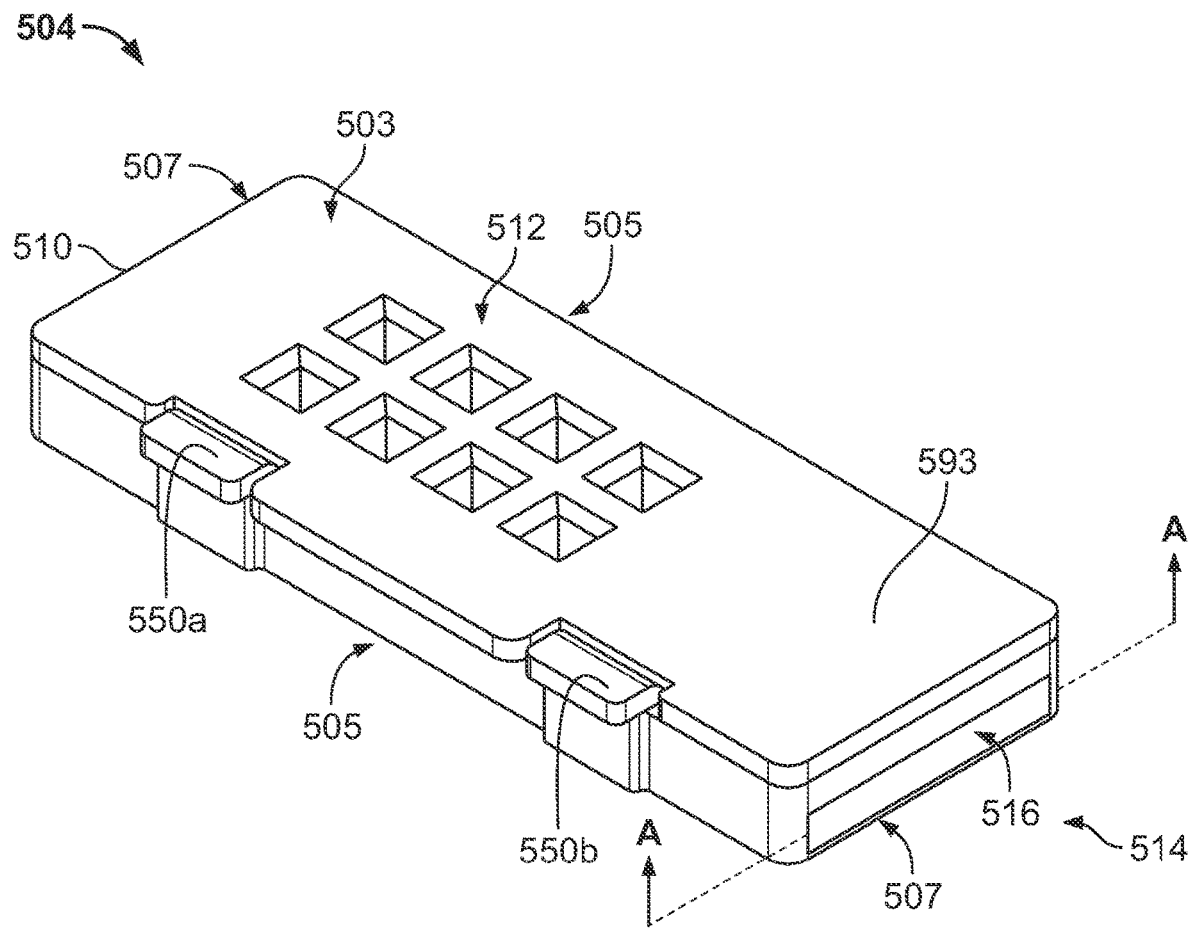
FIG. 5 illustrates an example of the substrate cassette of FIG. 4A.

FIG. 5 illustrates an example of the substrate cassette 504. This embodiment of the substrate holder 504 can advantageously provide a single-piece component that can be arranged in an open configuration or closed configuration, when desired. In particular, FIG. 5 shows a top surface 593 of the substrate holder 504 in a closed position. The substrate holder 504 includes the plurality of apertures 512. For example, the substrate holder 504 includes the body 510 having a main side 503 (e.g., a main surface or face), opposite longitudinal sides 505, and opposite latitudinal sides 507. The longitudinal sides 505 and the latitudinal sides 507 can constitute a lateral side (e.g., a lateral surface or face) extending from a periphery of the main side 503. The plurality of apertures 512 can be provided at the main side 503 of the body 510.

The substrate holder 504 can include a substrate loading mechanism for loading and holding the substrate. For example, the substrate loading mechanism can include a first tab 550*a* and a second tab 550*b*. The first tab 550*a* and the second tab 550*b* can protrude from one of the longitudinal sides 505 of the substrate holder 504. In some embodiments, any type of fastener or engagement feature that allows releasable engagement can be used instead of the first and second tabs 550*a* and 550*b*, such as, for example, screws and press fit type connectors. In some embodiments, the substrate holder 504 includes 5 tabs or less (e.g., 4 tabs or less, 3 tabs or less, 2 tabs or less, or 1 tab). In some embodiments, the substrate holder 504 is a single molded unit. Any suitable plastic or polymer can be used as a suitable molding material.

Figure 6:
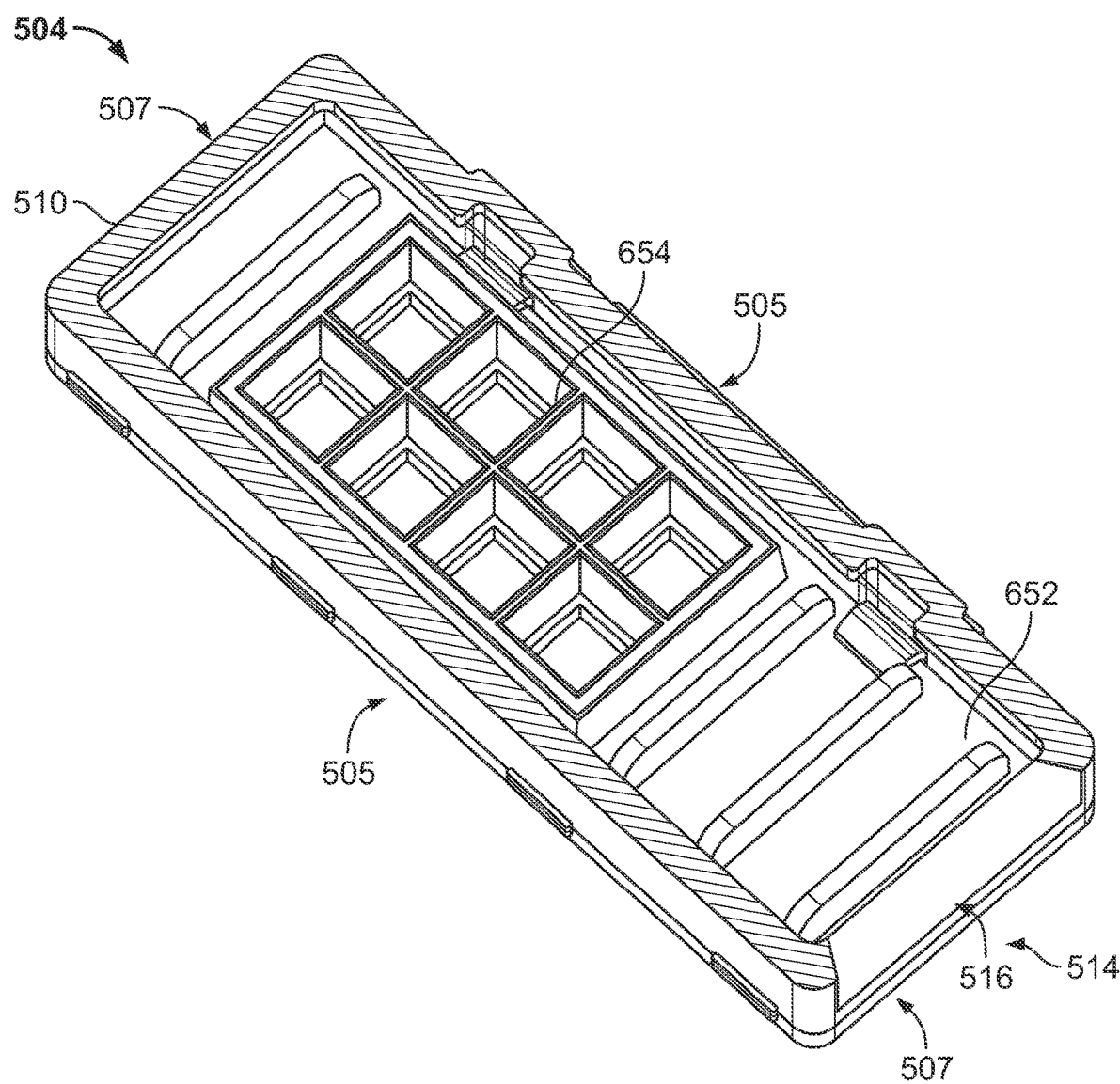
FIG. 6 is a bottom cross sectional, perspective view of the substrate cassette, taken along line A-A of FIG. 5.

FIG. 6 is a bottom cross sectional, perspective view of the substrate holder 504, taken along line A-A of FIG. 5. The substrate holder 504 includes a gasket 654 and defines a cavity 652 configured to receive the substrate 502. In some embodiments, the substrate holder 504 is a single molded unit that includes the gasket 654. That is, in some embodiments, the substrate holder 504 and the gasket 654 are one part. In some embodiments, the substrate holder 504 is overmolded with the gasket 654. For example, the substrate holder 504 is a first injection molded plastic part with a second part (e.g., a pliable material) molded onto it to create the gasket 654. In some embodiments, the pliable material is an elastomer. In some embodiments, the pliable material is silicone rubber. In some embodiments, the gasket 654 is a separate part that is not molded with the substrate holder 504.

Referring to FIGS. 5-6, the substrate holder 504 includes the slit 516 defined at the lateral face of the body 510. As described herein, the slit 516 is used as an example of the connection interface 514 for exposing the first electrode contact 420 of the substrate 502. In some implementations, the slit 516 is defined at one of the latitudinal sides 507 and configured for the substrate 502 to partially extend out from the body 510 at the one of the latitudinal sides 507, so that the first electrode contact 620 of the substrate 502 is positioned outside the body 510. In other implementations, the slit 516 can be defined at a different side of the body 510, such as any suitable one of the main side 503, the longitudinal sides 505 and the latitudinal sides 507.

Figure 7A:
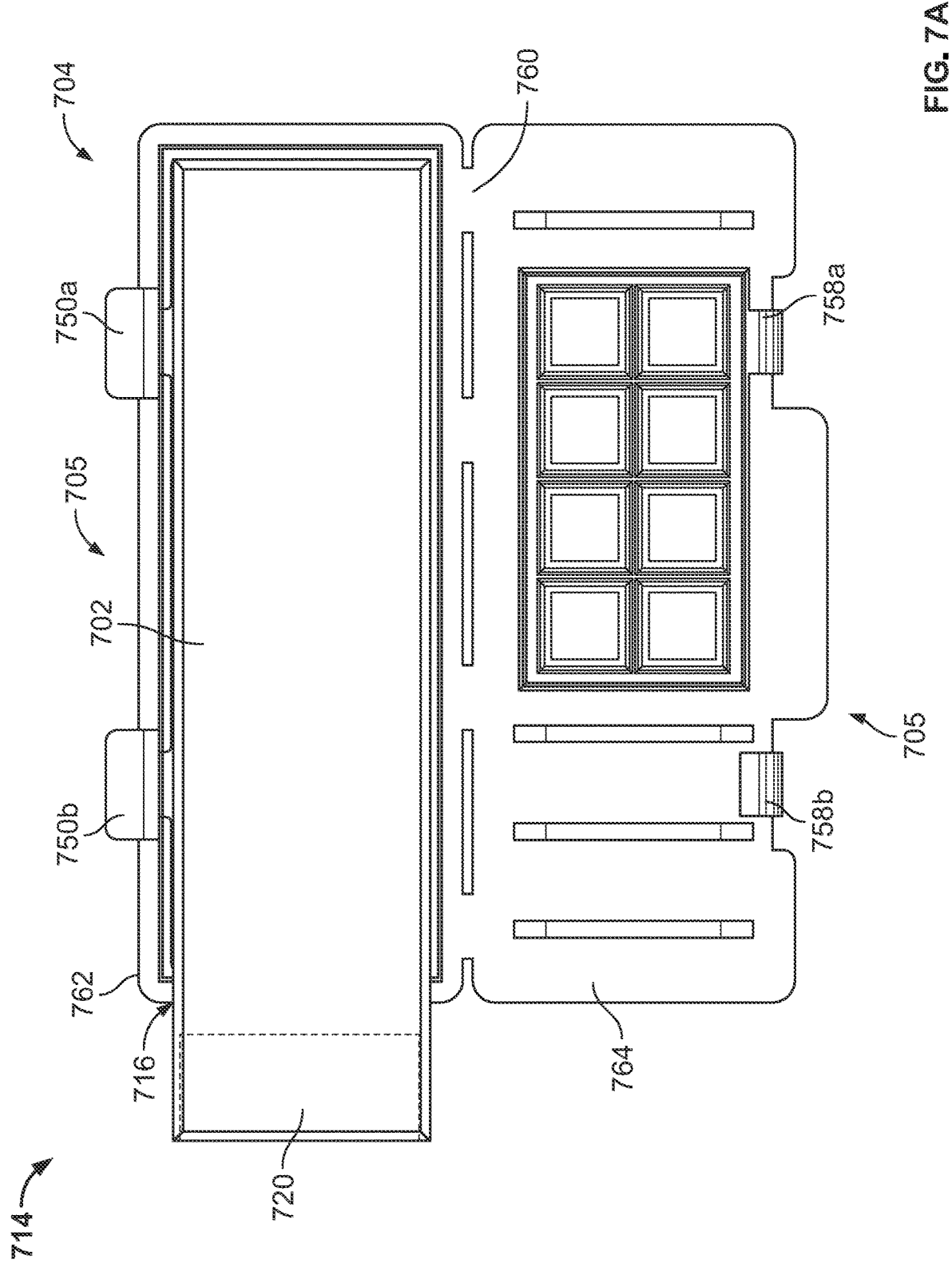
FIG. 7A shows a top view of an example substrate cassette in an open position.

FIG. 7A shows a top view of a substrate holder 704 in an open position. The opening and closing mechanism of the substrate holder 704 is a hinged mechanism. A bottom component 762 of the substrate holder 704 can be hinged to a top component 764 of the substrate holder 704 via a hinge 760. In some embodiments, the hinge 760 can be a living hinge. In some embodiments, the substrate holder 704 includes 10 hinges or less (e.g., 9 hinges or less, 8 hinges or less, 7 hinges or less, 6 hinges or less, 5 hinges or less, 3 hinges or less, 3 hinges or less, 2 hinges or less, or 1 hinge). Non-limiting examples of hinges that the substrate holder 704 can include, include a straight or flat living hinge, a butterfly living hinge, a child safe hinge, a double living hinge, and a triple living hinge.

The substrate holder 704 further includes one or more engagement features, such as a first notch 758*a* and a second notch 758*b*. The first and second notches 758*a* and 758*b* can engage the first and second tabs 750*a* and 750*b*, respectively, when pressed together. The first and second notches 758*a* and 758*b* can protrude from a longitudinal side 705 of the top component 764 of the substrate holder 704. In some embodiments, the substrate holder 704 includes three, four, five, six, seven, eight, nine, ten or more notches. In some embodiments, the notches protrude from a latitudinal side 707 of the substrate holder 704. In some embodiments, the first and second notches 758*a* and 758*b* are rigid and do not flex when engaging the first and second tabs 750*a* and 750*b*, respectively. In some embodiments, the first and second notches 758*a* and 758*b*, respectively, can be flexible.

Figure 7B:
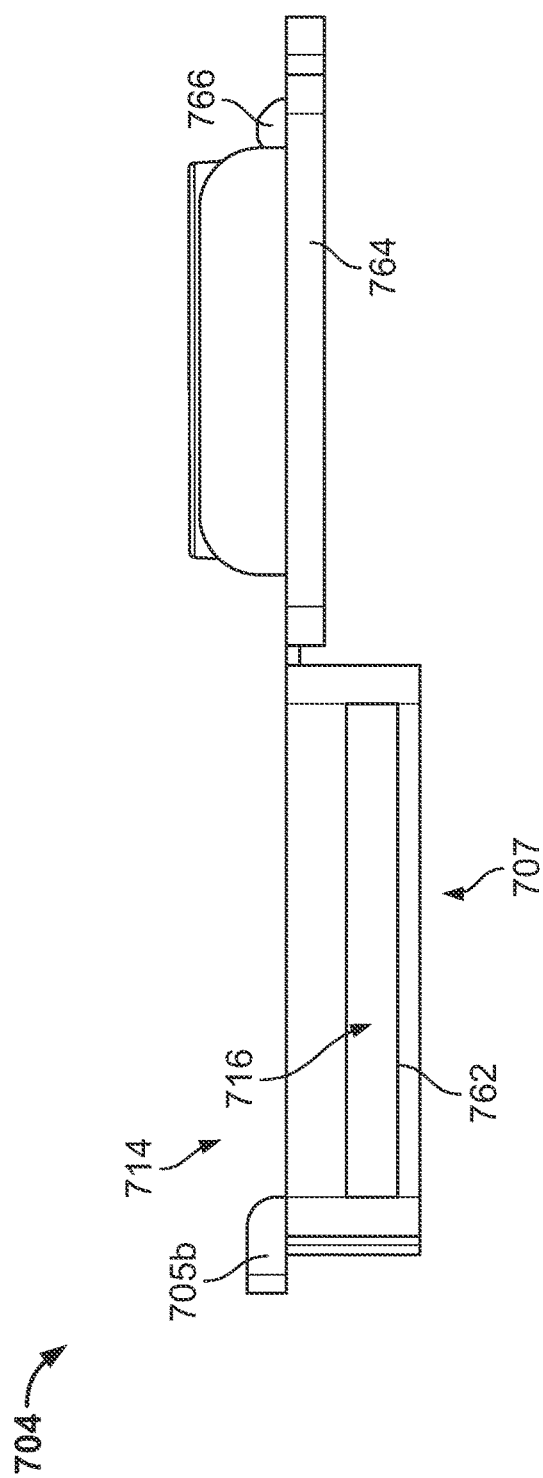
FIG. 7B shows a side view of a latitudinal side of the substrate cassette of FIG. 7A.
Figure 7C:
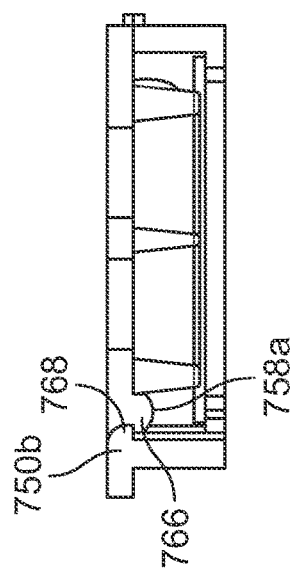
FIG. 7C shows a cross sectional view of the latitudinal side of the substrate cassette of FIG. 7B.

FIG. 7B shows a side view of a latitudinal side 707. The first and second notches 758*a* and 758*b* can project upward and include a notch ledge 766 that engages a tab ledge 768, as shown in FIG. 7C. Alternatively, in some embodiments, the substrate holder 704 includes a snap fit locking mechanism for releasably receiving and releasably securing the substrate. Non-limiting examples of other types of fasteners to be used in locking mechanisms of the substrate holder 704 include a catch, a projection, a male connector, and a female connector.

Figure 8:
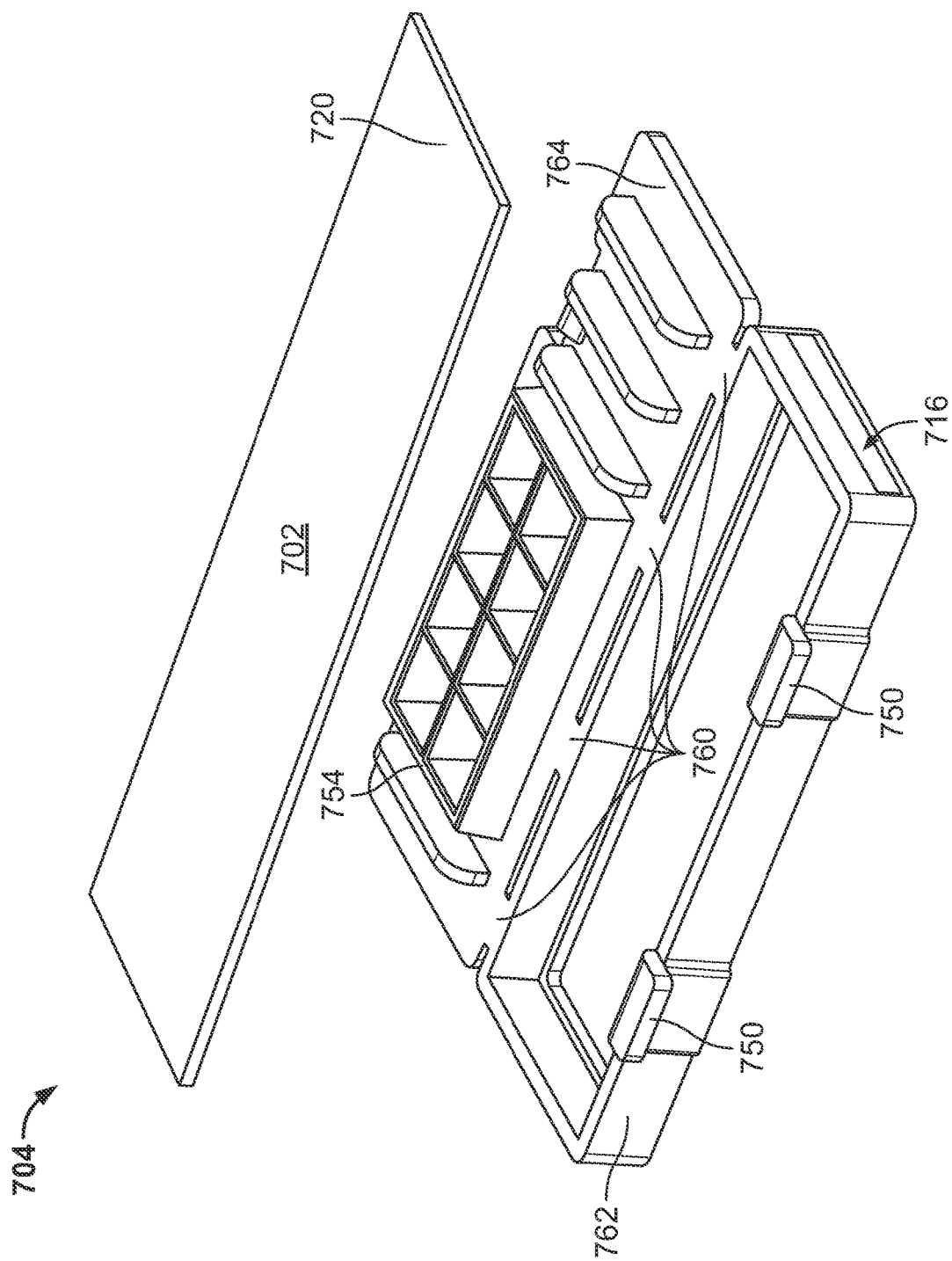
FIG. 8 illustrates an example placement of the substrate into the substrate cassette of FIG. 7A.

FIGS. 7A and 8 illustrate the placement of the substrate 702 into the substrate holder 704. In some embodiments, the substrate 702 can be "loaded" onto an inner rim or an inner edge of the bottom component 762 of the substrate holder 704, while a portion of the substrate 702 including the first electrode contact 720 is positioned exterior of the substrate holder 704. Once loaded, the top component 764 is closed by pressing the first notch 758*a* and the second notch 758*b* against the first and second tabs 750*a* and 750*b*, respectively, thereby forming a tight seal with the substrate 702. In some embodiments, the substrate does not have to be tilted under tabs 750 or any other tabs. In some embodiments, the substrate holder 704 includes one or more tabs to help load the slide onto the inner rim or inner edge of the bottom component 762 of substrate holder 704. When the substrate 702 is loaded in the substrate holder 703, the first electrode contact 720 of the substrate 702 is exposed from the substrate holder 704 through the slit 716.

In other implementations, the hinge 760 can be provided at one of the latitudinal sides 707. An example of this hinge arrangement is described in PCT/US20/79843, titled IMAGING SUPPORT DEVICES, filed Apr. 24, 7020, the disclosure of which is incorporated herein by reference in its entirety.

Figure 9:
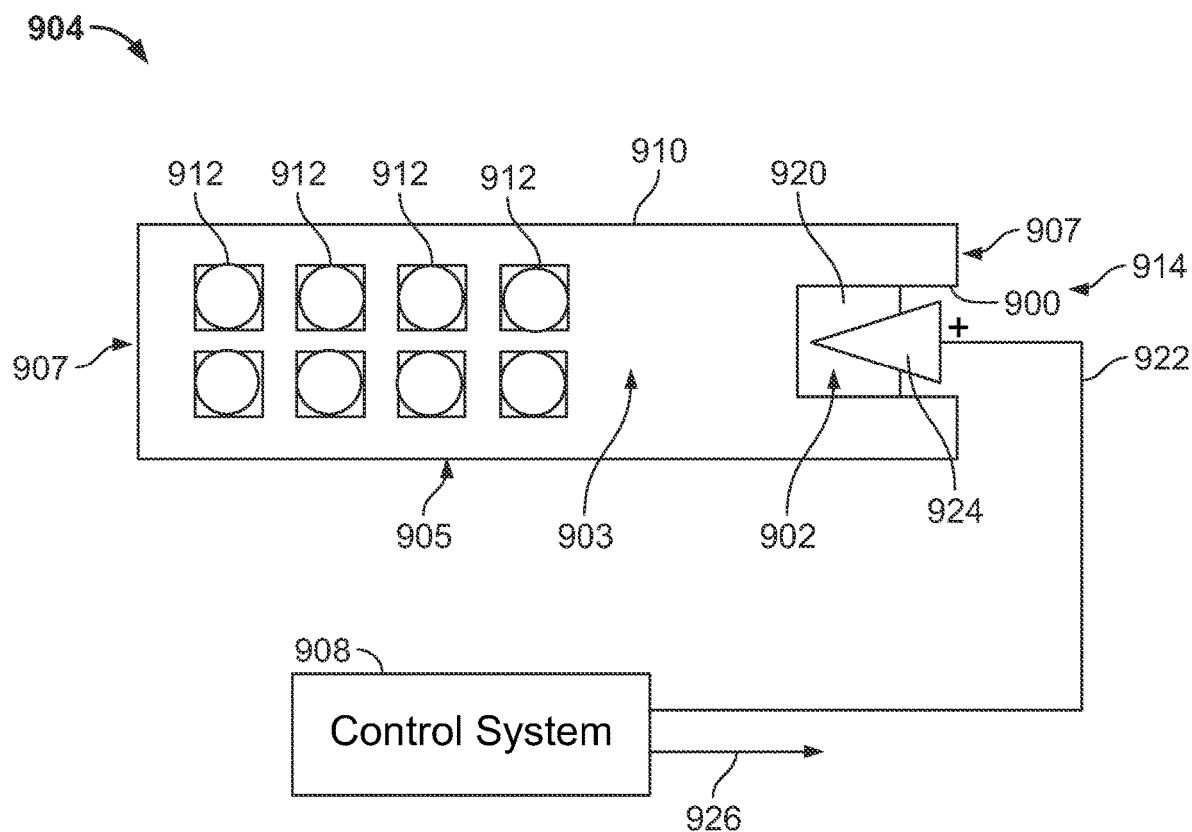
FIG. 9 is a schematic top view of another example substrate cassette.

Referring to FIG. 9, another example of the substrate cassette 904 can be configured similarly to the substrate cassettes 204, 504, and 704 described in FIGS. 4-8, except for the connection interface 214. Unlike the substrate cassette 204, 504, and 704 of FIGS. 3 and 5-8, in this example, the substrate cassette 904 can be configured to fully receive the substrate 902. Further, instead of a slit, the substrate cassette 904 includes a contact opening 900 as the connection interface 914. The contact opening 900 is defined at the body 910 and configured to expose the first electrode contact 920 of the substrate 902.

The contact opening 900 can be defined at the main side 903 of the body 910. In some implementations, the contact opening 900 is defined at the main side 903 adjacent the lateral side of the body 910. As illustrated in FIG. 9, for example, the contact opening 900 is defined at the main side 903 adjacent one of the latitudinal sides 907. The contact opening 900 can be defined at both the main side 903 and the latitudinal side 907, so as to extend from the main side 903 to the latitudinal side 907 of the body 910.

Referring to FIGS. 10A-D, yet another example of a substrate cassette 1004 is described, which includes the body 1010 and the plurality of apertures 1012 as described herein. The substrate cassette 1004 in this example is similarly configured to the substrate cassette described in FIGS. 4-8, except for the connection interface 1014. Unlike the substrate cassette 204, 504, and 704 of FIGS. 3 and 5-8, in this example, the substrate cassette 1004 can be configured to fully receive the substrate 1002.

Figure 10A:
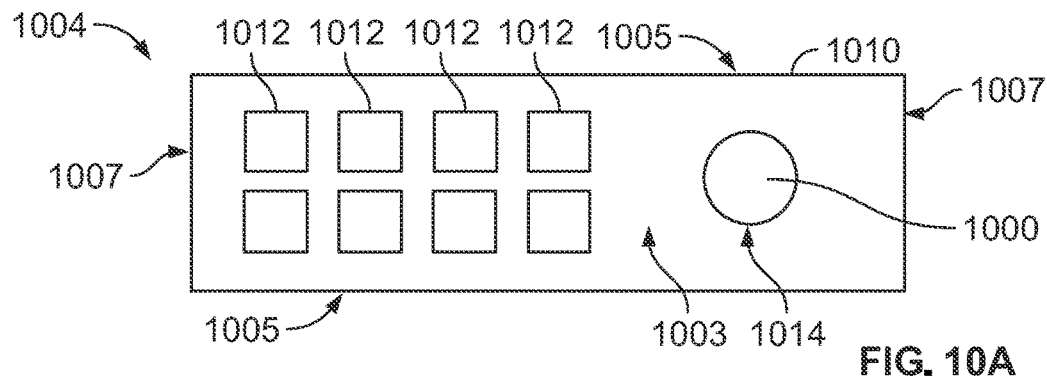
FIG. 10A is a schematic top view of yet another example substrate cassette.
Figure 10B:
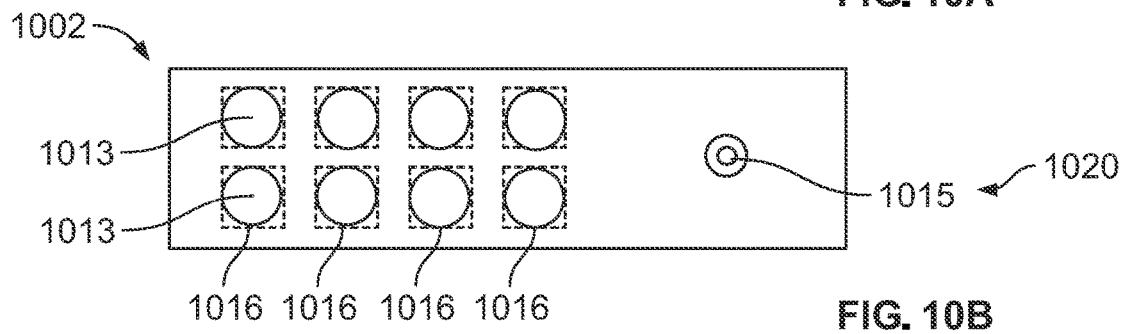
FIG. 10B is a schematic top view of yet another example substrate for use with the substrate cassette of FIG. 10A.
Figure 10C:
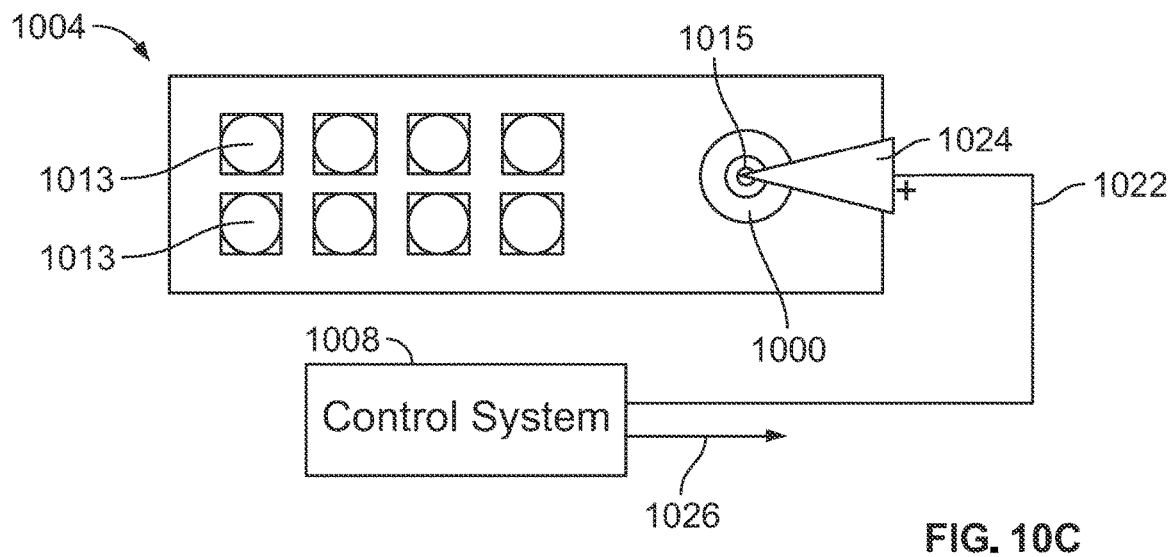
FIG. 10C is a schematic top view of the substate cassette of FIG. 10A that receives the substrate of FIG. 10B.
Figure 10D:
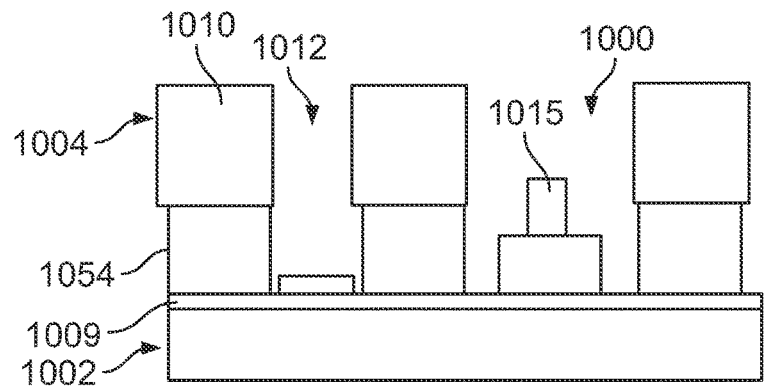
FIG. 10D is a schematic cross sectional side view of the substrate cassette of FIG. 10A that receives the substrate of FIG. 10B.

In this example, as illustrated in FIG. 10B, the substrate 1002 includes a substrate contact pin 1015 that provides the first electrode contact 1020. The substrate contact pin 1015 can extend from a surface of the substrate 1002 that includes a plurality of substrate regions 1026. The substrate contact pin 1015 is electrically connected to the substrate 1002. In embodiments where the substrate 1002 includes the conductive coating 1009, the substrate contact pin 1015 can be electrically connected to the conductive coating 1009, as illustrated in FIG. 10D.

The substrate cassette 1004 further includes a contact hole 1010 as the connection interface 1014. The contact hole 1000 can be defined at the body 1010 and configured to expose the substrate contact pin 1015 of the substrate 1002. The contact hole 1000 can be defined at the main side 1003 of the body 1010. The contact hole 1000 can be positioned to align with the substrate contact pin 1015 when the substrate 1002 is received in or held by the substrate cassette 1004.

Referring to FIGS. 11A-D, a fourth example of the substrate cassette 1104 is described, which includes the body 1110 and the plurality of apertures 1112 as described herein. The substrate cassette 1104 in this example is similarly configured to the substrate cassette described in FIGS. 4-8, except for the connection interface 1114. Unlike the substrate cassette 1104, 504, and 704 of FIGS. 3 and 5-8, in this example, the substrate cassette 1104 can be configured to fully receive the substrate 1102.

Figure 11A:
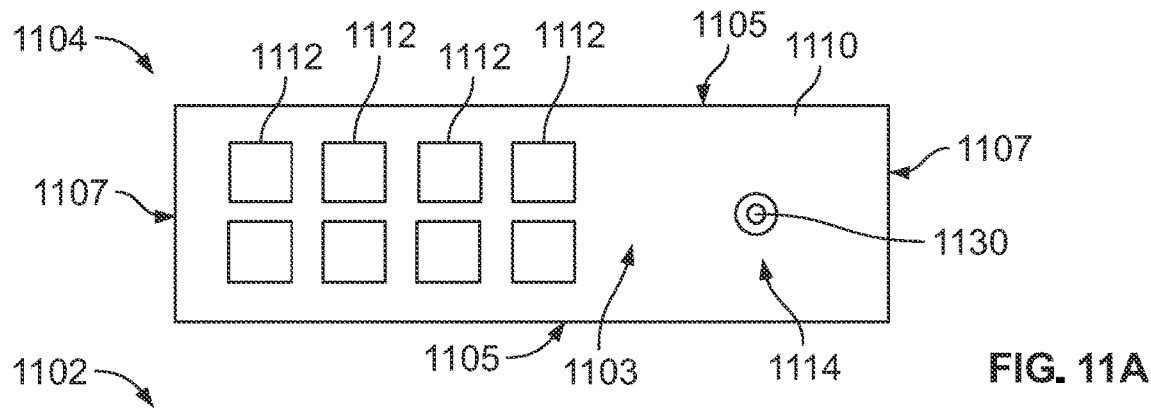
FIG. 11A is a schematic top view of yet another example substrate cassette.
Figure 11B:
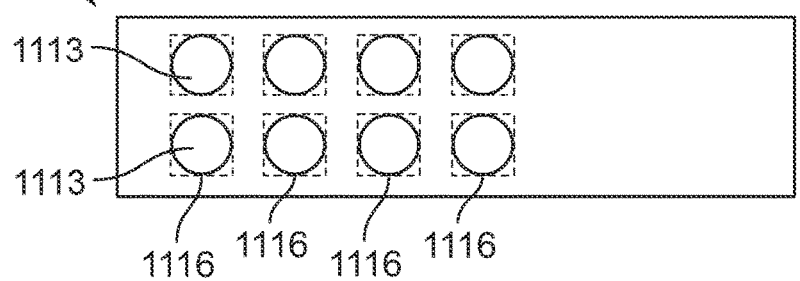
FIG. 11B is a schematic top view of yet another example substrate for use with the substrate cassette of FIG. 11A.
Figure 11C:
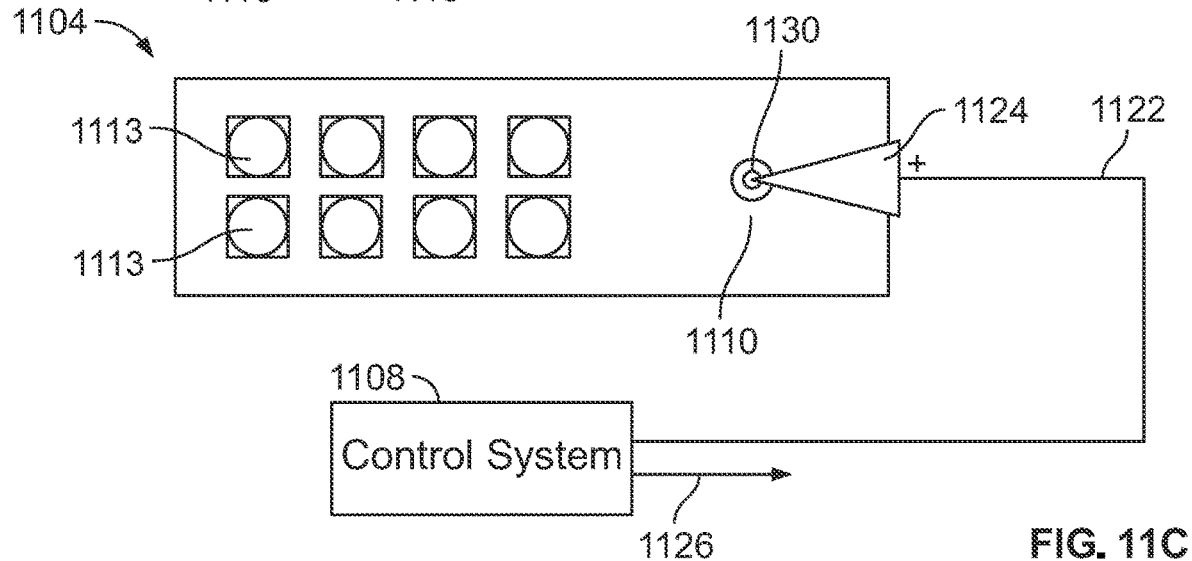
FIG. 11C is a schematic top view of the substate cassette of FIG. 11A that receives the substrate of FIG. 11B.
Figure 11D:
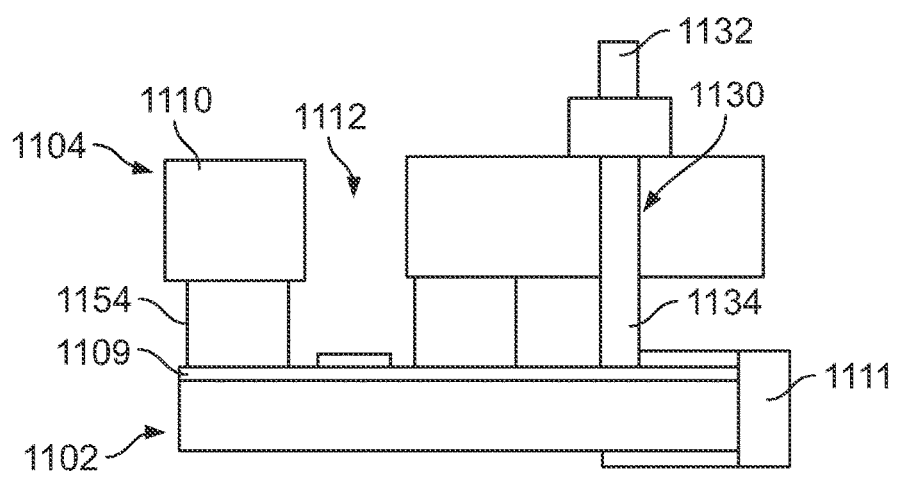
FIG. 11D is a schematic cross sectional side view of the substrate cassette of FIG. 11A that receives the substrate of FIG. 11B.

The substrate cassette 1104 includes a cassette contact pin 1130 as the connection interface 1114. The cassette contact pin 1130 can extend through the body 1110 (e.g., the main side 1103 of the body 1110) such that a first end 1132 of the cassette contact pin 1130 is placed exterior of the body 1110, and an opposite, second end 1134 of the cassette contact pin 1130 is placed interior of the body 1110. The cassette contact pin 1130 is configured to electrically connect to the substrate 1102 received in the substrate cassette 1104. In embodiments where the substrate 1102 includes the conductive coating 1109, the cassette contact pin 1130 can be electrically connected to the conductive coating 1109. For example, the second end 1134 of the cassette contact pin 1130 is configured to electrically connect to the conductive coating 1109, as illustrated in FIG. 11D.

In some implementations, the system 100 can include a substrate contact bracket 1136 configured to engage with the substrate 1102 and electrically connected to the substrate 1102. For example, the substrate contact bracket 1136 can be engaged with a portion of the substrate 1102 and electrically contact the conductive coating 1109 of the substrate 1102, as shown in FIG. 11D. The cassette contact pin 1130 can be configured to electrically connect to the substrate contact bracket 1136 when the substrate 1102 is received in the substrate cassette 1104. For example, the second end 1134 of the cassette contact pin 1130 is configured to contact with the substrate contact bracket 1136 based on the substrate 1102 held in the substrate cassette 1104. Thus, the cassette contact pin 1130 can be electrically connected to the substrate 1102 and further provide the connection interface 1114 at the exterior of the substrate cassette 1104. The first wire 1122 extending from the control system 1108 can simply be connected to the cassette contact pin 1130 (e.g., the first end 1132 thereof) so that the control system 1108 can be electrically connected to the substrate 1102 that can function as one (e.g., anode) of the electrodes in electrophoresis.

Referring to FIGS. 12A-D, an example of the cathode assembly 1206 is described. The cathode assembly 1206 can include a cathode body 1250 configured to be positioned at least partially on the substrate cassette 1204. The cathode assembly 1206 can include a plurality of electrodes 1252 that project from the cathode body 1250. The plurality of electrodes 1252 are configured to position within the plurality of apertures 1212 of the substrate cassette 1204, respectively, when the cathode body 1250 is positioned on the substrate cassette 1204. Thus, the electrodes 1252 is disposed within the respective buffer chambers that are defined by the apertures 1212 of the substrate cassette 1204 on the substrate regions 1216 of the substrate 1202. Each of the electrodes 1252 functions as a cathode in each of the buffer chambers.

The cathode assembly 1206 can include a cathode contact 1254 configured for electrical connection to the control system 1208. For example, a second wire 1226 extending from the control system 1208 is electrically connected to the cathode contact 1254. The second wire 1226 can include a connecting pin or clip 1228 that can be removably attached to the cathode contact 1254 of the cathode assembly 1206. Other types of fastening mechanisms can be used to connect the second wire 1226 to the cathode contact 1254 of the cathode assembly 1206. The cathode contact 1254 is electrically connected to the plurality of electrodes 1252. In some implementations, as shown in FIG. 12D, the cathode assembly 1206 includes a conductive layer 1258 that is electrically connected to both the cathode contact 1254 and the plurality of electrodes 1252. The cathode contact 1254 can be exposed at the cathode body 1250 so as to be easily accessible exterior of the cathode body 1250.

Figure 12A:
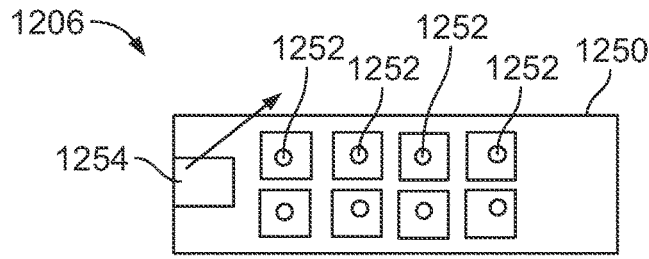
FIG. 12A is a schematic top view of an example cathode assembly.
Figure 12B:
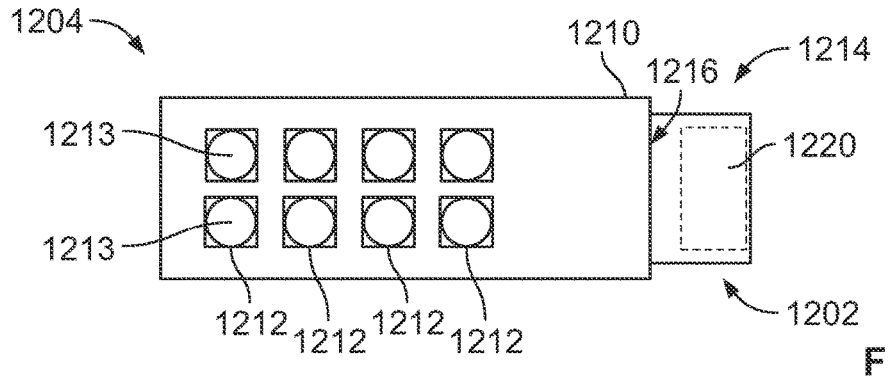
FIG. 12B is a schematic top view of an example substrate cassette that receives an example substrate.
Figure 12C:
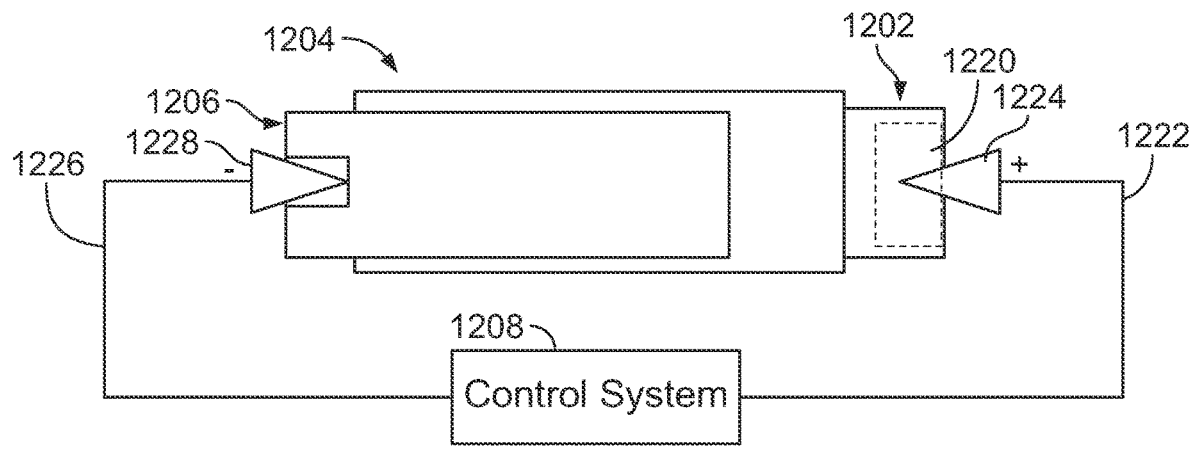
FIG. 12C is a schematic top view of the cathode assembly of FIG. 12A that is disposed on the substrate cassette and the substrate of FIG. 12B.
Figure 12D:
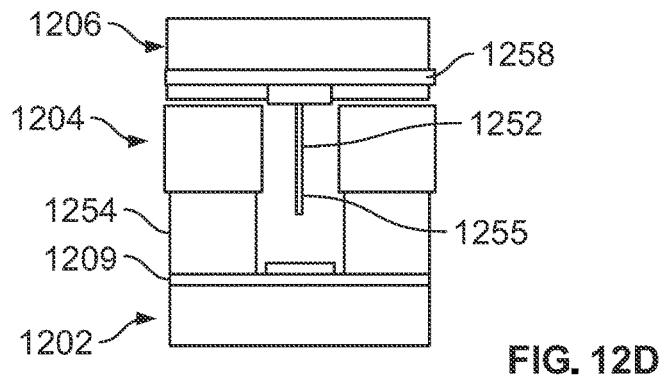
FIG. 12D is a schematic cross sectional side view of the cathode assembly, the substrate cassette, and the substrate of FIG. 12C.

As shown in FIG. 12C, the cathode assembly 1206 is disposed on the substrate 1204 that receives or holds the substrate 1202. The cathode assembly 1206 is oriented and arranged such that the plurality of electrodes 1252 are inserted into the respective apertures 1212 of the substrate cassette 1204 and thus disposed on the respective substrate regions 1216 of the substrate 1202. The cathode assembly 1206 can be used with substrates and substrate cassettes of various configurations. In the illustrated example of FIG. 12C, the cathode assembly 1206 is used with the substrate 1202 and the substrate cassette 1204 described in FIGS. 4-8. In other examples, the cathode assembly 1206 can be used with the substrates 1202 and the substrate cassettes described in FIGS. 9-11.

The electrode 1252 can be of various shapes. For example, the electrode 1252 can be configured as a conductive wire 1255 (FIG. 12D), a conductive rod 1256 (FIG. 12E), or an array of conductive wires 1257 (FIG. 12F). Alternatively, as shown in FIG. 12G, the electrode 1252 can include a conductive extension 1261 and a conductive plate 1263 at a distal end (i.e., a free end) of the conductive extension 1261. The conductive extension 1261 can be of various shapes, such as the conductive wire 1255, the conductive rod 1256, the conductive wire array 1257, or other suitable shapes. The conductive plate 1263 can be of various shapes, such as a circular plate 1263A, a ring 1263B, a square plate 1263C, or other suitable shapes.

Figure 13A:
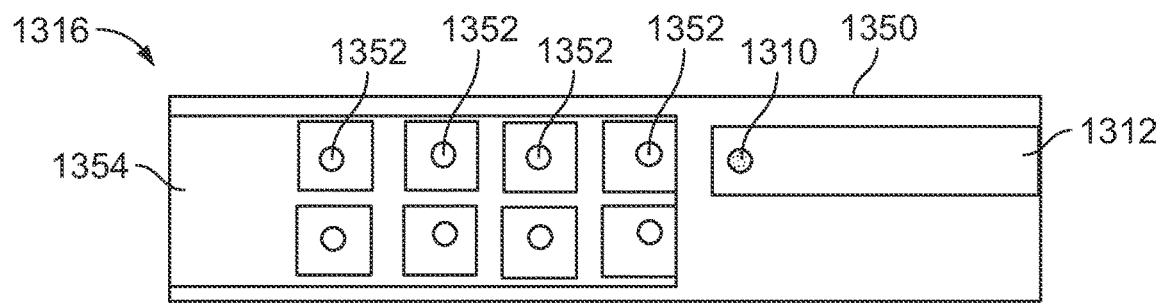
FIG. 13A is a schematic top view of another example cathode assembly.
Figure 13B:
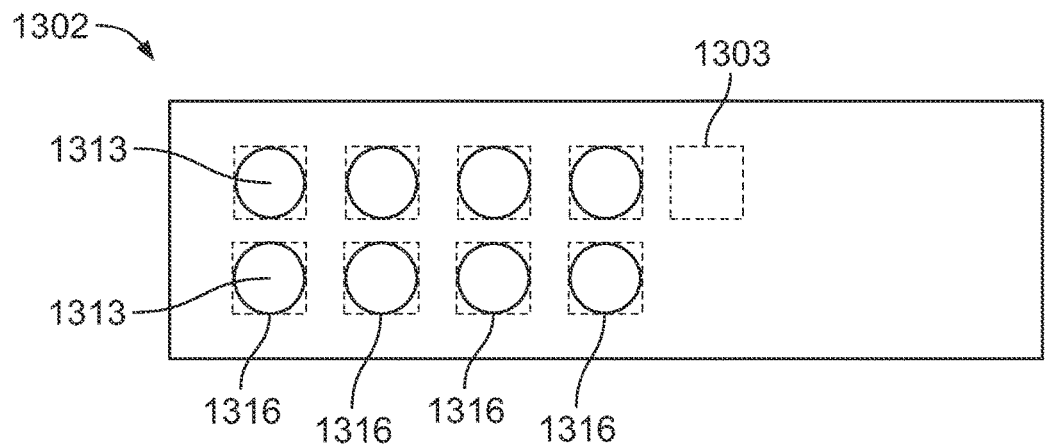
FIG. 13B is a schematic top view of an example substrate.

Referring to FIGS. 13A-E, other examples of the substrate 1302, the substrate cassette 1304, and the cathode assembly 1306 are described. Referring to FIG. 13B, the substrate 1302 in this example is configured similarly to the substrate 1302 described herein. In this example, the substrate 1302 further includes an electrode region 1303 that functions as the first electrode contact 320. The electrode region 1302 is configured to electrophoretically connect to the control system 1308 so that the substrate 1302 can be used as an electrode (e.g., anode) in the system 100. In embodiments where the substrate 1302 includes the conductive coating 1309, the electrode region 1303 is electrically connected to the conductive coating 1309. For example, the electrode region 1303 can be a hole that exposes a portion of the conductive coating 1309 of the substrate 1302 to a second buffer 1307, as illustrated in FIG. 13F.

Figure 13C:
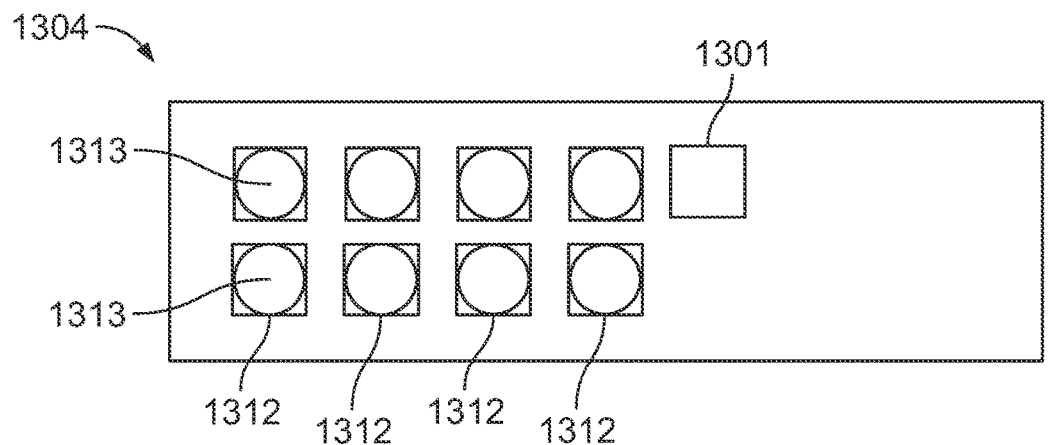
FIG. 13C is a schematic top view of an example substrate cassette.
Figure 13D:
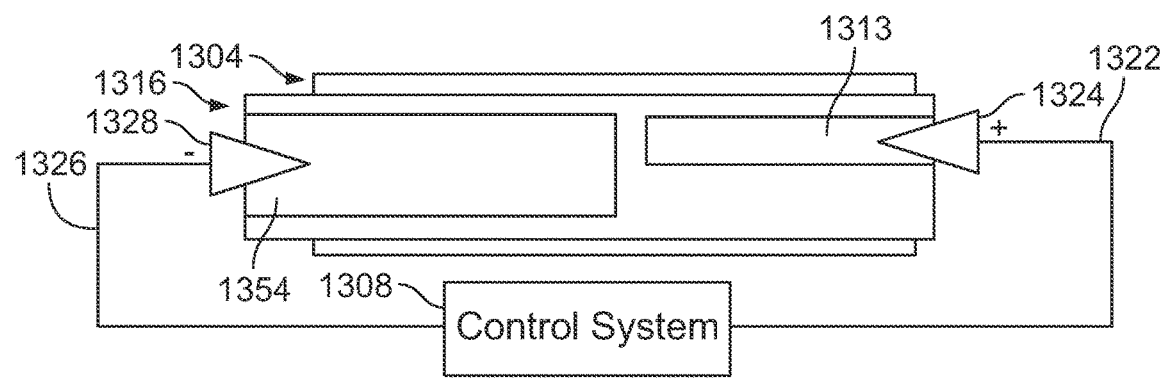
FIG. 13D is a schematic top view of the cathode assembly of FIG. 13A that is disposed on the substrate cassette of FIG. 13B and the substrate of FIG. 13C.
Figure 13E:
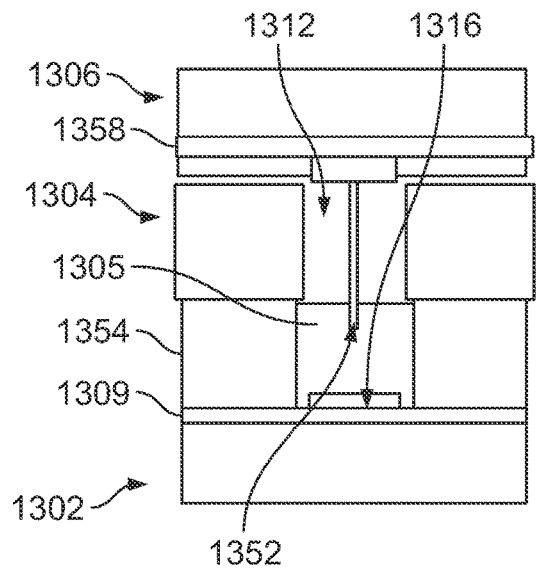
FIG. 13E is a schematic cross sectional side view of the cathode assembly, the substrate cassette, and the substrate of FIG. 13D, which illustrates an example buffer chamber.
Figure 13F:
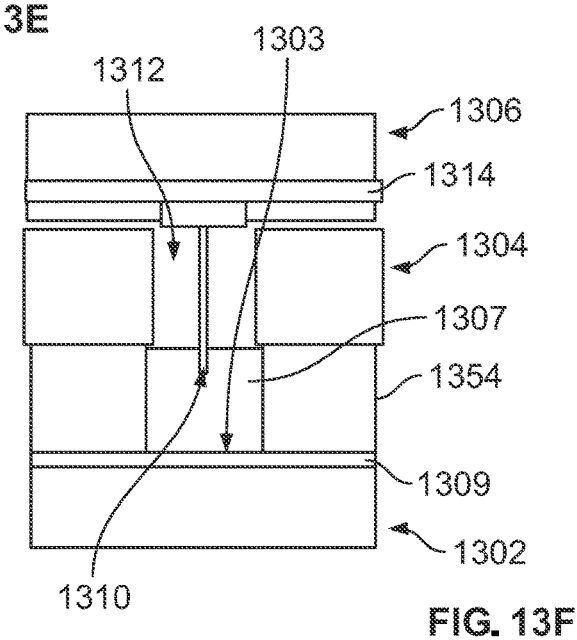
FIG. 13F is a schematic cross sectional side view of the cathode assembly, the substrate cassette, and the substrate of FIG. 13D, which illustrates an example anode chamber.

Referring to FIG. 13C, the substrate cassette 1304 in this example is configured similarly to the substrate cassette 1304 described herein. The substrate cassette 1304 can include an electrode aperture 1301, as well as the plurality of apertures 1312 described herein. The electrode aperture 1301 is configured to be aligned with the electrode region 1303 of the substrate 1302 when the substrate cassette 1304 receives the substrate 1302. As illustrated in FIG. 13C, the substrate cassette 1304 is configured to fully receive the substrate 1302. Further, as illustrated in FIGS. 13E-F, the plurality of apertures 1312 and the electrode aperture 1301 of the substrate cassette 1304 are arranged on the plurality of substrate regions 1316 and the electrode region 1303 of the substrate 1302, respectively. As described herein, the plurality of apertures 1312 (either independently or in cooperation with the gasket 1354 as shown in FIG. 13E) can define a plurality of first buffer chambers (e.g., the buffer chambers 122) on the plurality of substrate regions 1316, which are configured to receive first buffers 1305 (e.g., the buffer 124) for analyte migration under electrophoresis. In addition, the electrode aperture 1301 (either independently or in cooperation with the gasket 1354 as shown in FIG. 13F) can define a second buffer chamber on the electrode region 1303, which is configured to receive a second buffer 1307. In some implementations, the second buffer 1307 is different from the first buffer 1305. The second buffer 1307 can have an electrolyte strength that is greater than the first buffer 1305. For example, the second buffer 1307 can be selected to have ionic strength that ranges from 1 to 1300 mmol/L. One example of the second buffer 1307 is a sodium chloride solution. Other examples of the second buffer 1307 include sodium hydroxide, potassium chloride, or any buffer with a high concentration of ions, which can include the first buffer 1305 at a higher concentration. Further examples of the first and second buffers can be found in Reijenga, et al., Buffer Capacity, Ionic Strength and Heat Dissipation in Capillary Electrophoresis, Journal of Chromatography A, 744 (1996) 1347-153, the disclosure of which is incorporated herein by reference in its entirety.

Referring to FIG. 13A, the cathode assembly 1306 includes the cathode body 1350 configured to be positioned at least partially on the substrate cassette 1304. The cathode assembly 1306 can include a plurality of electrodes 1352 that project from the cathode body 1350. The plurality of electrodes 1352 are configured to position within the plurality of apertures 1312 of the substrate cassette 1304, respectively, when the cathode body 1350 is positioned on the substrate cassette 1304. Thus, the electrodes 1352 is disposed within the respective buffer chambers that are defined by the apertures 1312 of the substrate cassette 1304 on the substrate regions 316 of the substrate 1302. Each of the electrodes 1352 functions as a cathode in each of the buffer chambers.

The cathode assembly 1306 can include a second electrode contact 1354 configured for electrical connection to the control system 1308. The second electrode contact 1354 can be used for a cathode contact. For example, a second wire 1326 extending from the control system 1308 is electrically connected to the cathode contact 1354. The second wire 326 can include a connecting pin or clip 1328 that can be removably attached to the cathode contact 1354 of the cathode assembly 1306. Other types of fastening mechanisms can be used to connect the second wire 1326 to the cathode contact 1354 of the cathode assembly 1306. The cathode contact 1354 is electrically connected to the plurality of electrodes 1352. In some implementations, as shown in FIG. 13E, the cathode assembly 1306 includes a conductive layer 1358 that is electrically connected to both the cathode contact 1354 and the plurality of electrodes 1352. The cathode contact 1354 can be exposed at the cathode body 1350 so as to be easily accessible exterior of the cathode body 1350.

In this example, the cathode assembly 1306 further includes a second electrode 1310 that projects from the cathode body 1350. As illustrated in FIG. 13F, the second electrode 1310 is configured to position within the electrode aperture 1301 of the substrate cassette 1304 when the cathode body 1350 is positioned on the substrate cassette 1304. Thus, the second electrode 1310 is disposed within the second buffer chamber that is defined by the electrode aperture 1301 of the substrate cassette 1304 (independently or in cooperation with the gasket 354) on the electrode region 1303 of the substrate 1302. The second electrode 1310 can function as part of the anode in electrophoresis.

The cathode assembly 1306 can include an anode contact 1313 configured for electrical connection to the control system 1308. For example, the first wire 322 extending from the control system 1308 is electrically connected to the anode contact 1313. The first wire 1322 can include a connecting pin or clip 1328 that can be removably attached to the anode contact 1313 of the cathode assembly 1306. Other types of fastening mechanisms can be used to connect the first wire 1322 to the anode contact 1313 of the cathode assembly 1306. The anode contact 1313 is electrically connected to the second electrode 1310. In some implementations, as shown in FIG. 13F, the cathode assembly 1306 includes a conductive layer 1314 that is electrically connected to both the anode contact 1313 and the second electrode 1310. As illustrated in FIG. 13D, the anode contact 1313 can be exposed at the cathode body 1350 so as to be easily accessible exterior of the cathode body 1350. As illustrated in FIG. 13F, with the control system 1308 being electrically connected to the anode contact 1313 of the cathode assembly 1306, the control system 1308 is electrophoretically connected to the electrode region 1303 (i.e., the first electrode contact 320) of the substrate 1302 via the second electrode 1310 that is positioned within the second chamber containing the second buffer 1307 on the electrode region 1303 of the substrate 1302.

Figure 14A:
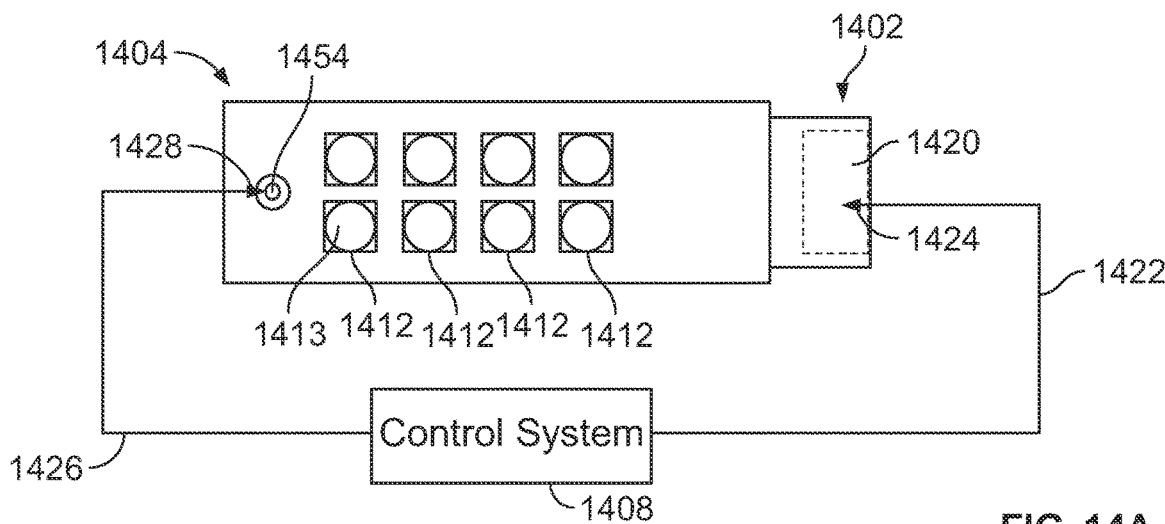
FIG. 14A is a schematic top view of yet another example substrate cassette that receives a substrate.
Figure 14B:
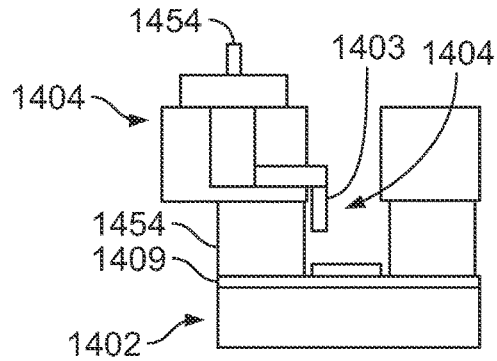
FIG. 14B is a schematic cross sectional side view of the substrate cassette and the substrate of FIG. 14A.
Figure 14C:
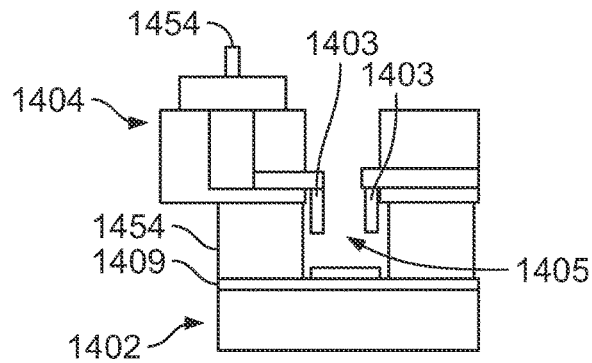
FIG. 14C is a schematic cross sectional side view of a variation of the substrate cassette and the substrate of FIG. 14A.

Referring to FIGS. 14A-C, yet another example of a substrate cassette 1404 is described. As described herein, the substrate cassette 1404 includes the body 1410 and the plurality of apertures 1412. The substrate cassette 1404 in this example is configured similarly to the substrate cassette 404 described in FIGS. 4-8. In addition, the substrate cassette 1404 is configured to incorporate at least part of the cathode assembly 1406 described herein. For example, as illustrated in FIG. 14B, the substrate cassette 1404 includes a plurality of electrodes 1403 that function as the electrodes 1452 described herein. The plurality of electrodes 1403 are configured to position within the buffer chambers 1405 (similar to the buffer chambers 122 described herein) defined at least by the apertures 1412 of the substrate cassette 1404. The electrode 1403 can be of various configurations, similarly to the electrodes 1452.

Referring to FIG. 14B, the substrate cassette 1404 can include a plurality of cathode contact pins 1406 that extend through a wall of the cassette body 1410 and electrically connect to the plurality of electrodes 1403. The plurality of cathode contact pins 1406 are electrically connected to the second electrode contact or cathode contact 1454 that is exposed at the cassette body 1410. Alternatively, one of the cathode contact pins 1456 can be exposed exterior of the cassette body 1410 and used as the cathode contact 1454. As described herein, the cathode contact 1454 is used to connect to the control system 1408, such as via the second wire 1426 extending from the control system 1408.

In this example, the substrate cassette 1404 is used with the substrate 202 described in FIGS. 4-8. In other examples, the substrate cassette 1404 can be used with the substrates 902 described in FIGS. 9-13.

The electrode 1403 can be of various configurations, similarly to the electrodes 1452. For example, the electrode 1403 can be configured as a conductive wire (similar to the conductive wire 1255 in FIG. 12D), a conductive rod (similar to the conductive rod 1256 in FIG. 12E), or an array of conductive wires (similar to the conductive wire array 1257 in FIG. 12F). Alternatively, the electrode 1403 can be configured similarly to the electrode 1252 shown in FIG. 12G. (e.g., extensions with various tips such as a circular plate, a ring, a square plate, or other suitable shapes). Referring to FIG. 14C, each buffer chamber 1405 can be provided with two or more electrodes 1403.

Figure 15A:
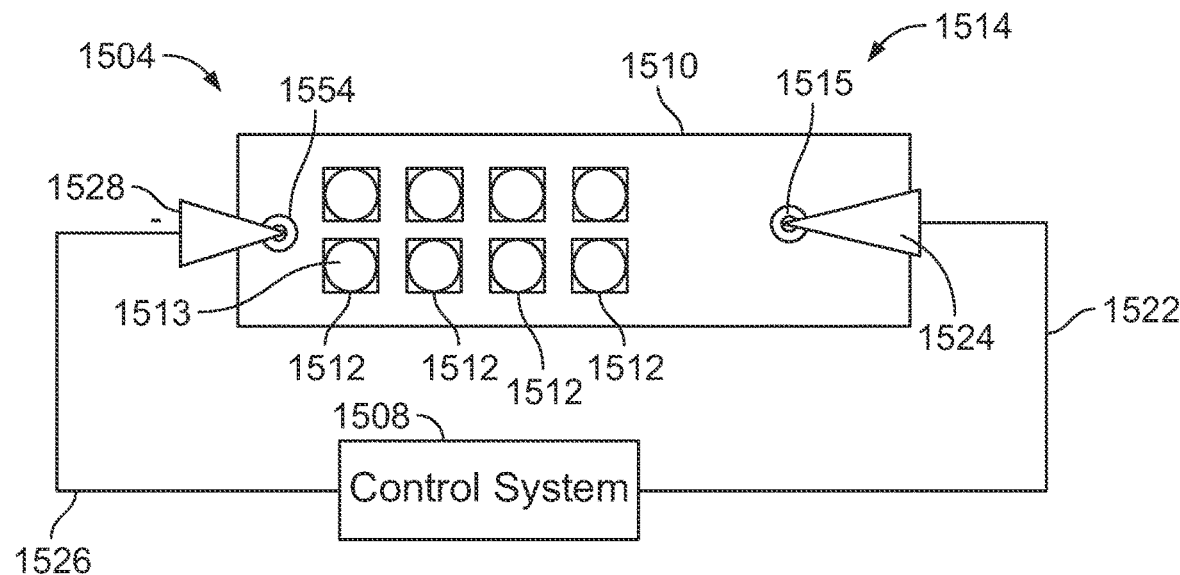
FIG. 15A is a schematic top view of yet another example substrate cassette that receives a substrate.
Figure 15B:
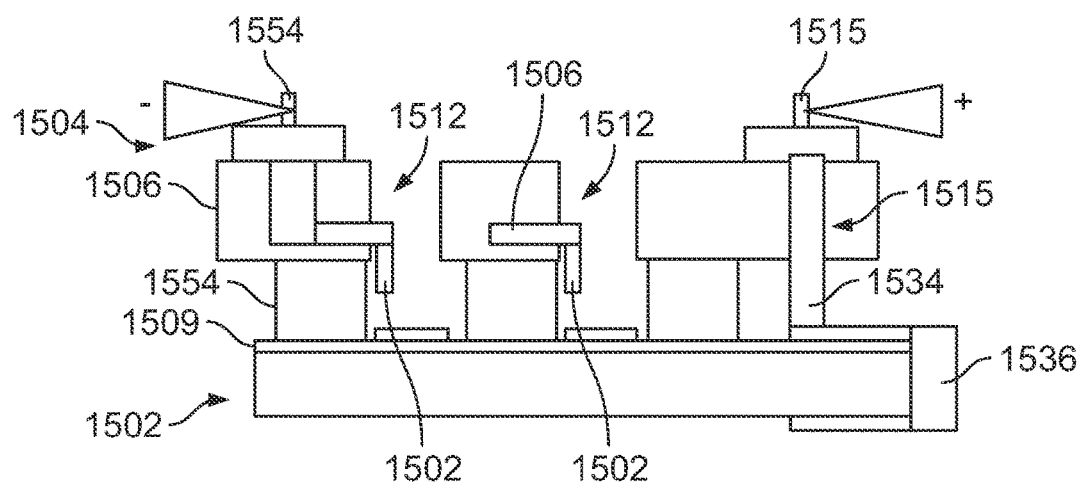
FIG. 15B is a schematic cross sectional side view of the substrate cassette and the substrate of FIG. 15A.

Referring to FIGS. 15A-B, yet another example of a substrate cassette 1504 is described. The substrate cassette 1504 in this example is configured similarly to the substrate cassette 1504 of FIGS. 14A-C. In addition, the substrate cassette 1504 includes the connection interface 1514 shown in FIGS. 11A-D. In particular, the substrate cassette 1504 in this example further includes the cassette contact pin 1530 as the connection interface 1514. The cassette contact pin 1530 can extend through the body 1510 such that the first end 1532 of the cassette contact pin 1530 is placed exterior of the body 1510, and the opposite, second end 1534 of the cassette contact pin 1530 is placed interior of the body 1510. The cassette contact pin 1530 is configured to electrically connect to the substrate 1502 received in the substrate cassette 1504. In embodiments where the substrate 1502 includes the conductive coating 1509, the cassette contact pin 1530 can be electrically connected to the conductive coating 1509. For example, the second end 1534 of the cassette contact pin 1530 is configured to electrically connect to the conductive coating 1509, as illustrated in FIG. 15B.

In some implementations, the system 1500 can include the substrate contact bracket 1536 configured to engage with the substrate 1502 and electrically connected to the substrate 1502. For example, the substrate contact bracket 1536 can be engaged with a portion of the substrate 1502 and electrically contact the conductive coating 1509 of the substrate 1502, as shown in FIG. 15B. The cassette contact pin 1530 can be configured to electrically connect to the substrate contact bracket 1536 when the substrate 1502 is received in the substrate cassette 1504. For example, the second end 1534 of the cassette contact pin 1530 is configured to contact with the substrate contact bracket 1536 based on the substrate 1502 held in the substrate cassette 1504. Thus, the cassette contact pin 1530 can be electrically connected to the substrate 1502 and further provide the connection interface 1514 at the exterior of the substrate cassette 1504.

Accordingly, the control system 1508 can be easily connected to the system 1500. For example, the first wire 1522 extending from the control system 1508 can simply be connected to the cassette contact pin 1530 (e.g., the first end 1532 thereof) so that the control system 1508 can be electrically connected to the substrate 1502 that can function as one (e.g., anode) of the electrodes in electrophoresis. Further, the second wire 1526 extending from the control system 1508 can simply be connected to the cathode contact 1554 so that the control system 1508 can be electrically connected to the electrodes 602 (e.g., cathodes) in the electrophoresis system.

Figure 16A:
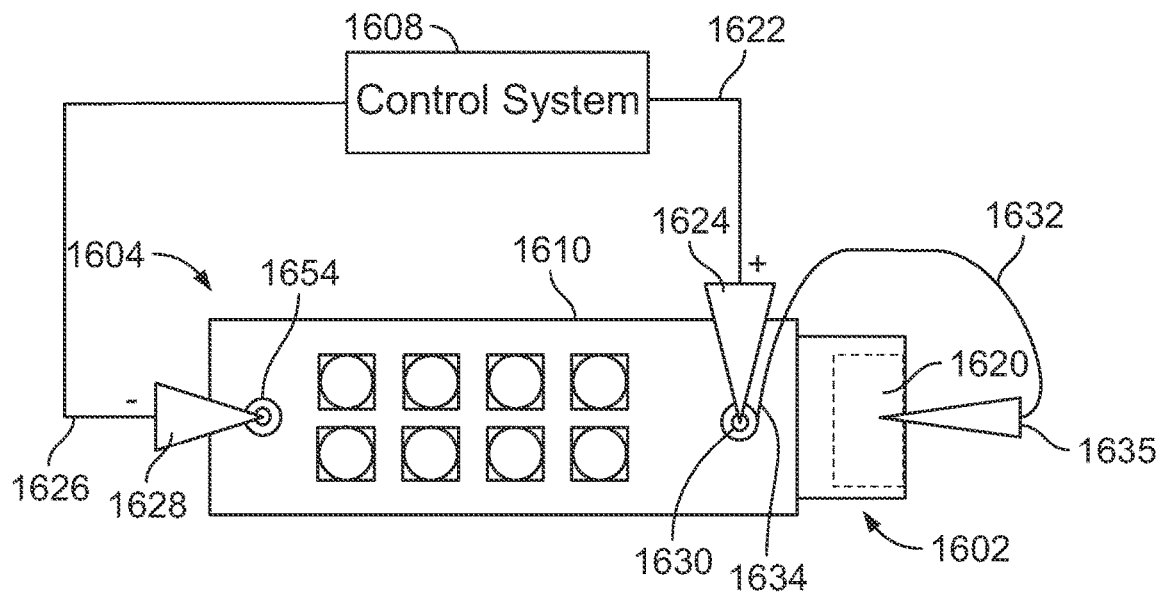
FIG. 16A is a schematic top view of an example electrical connection configuration among a substrate cassette, a substrate, and a control system.
Figure 16B:
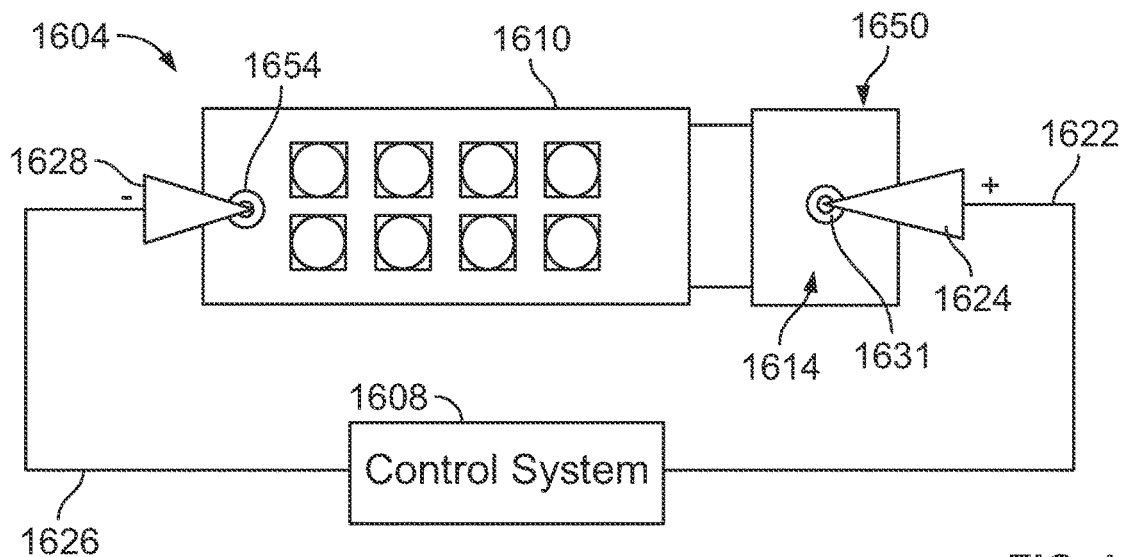
FIG. 16B is a schematic top view of another example electrical connection configuration among a substrate cassette, a substrate, and a control system.
Figure 16C:
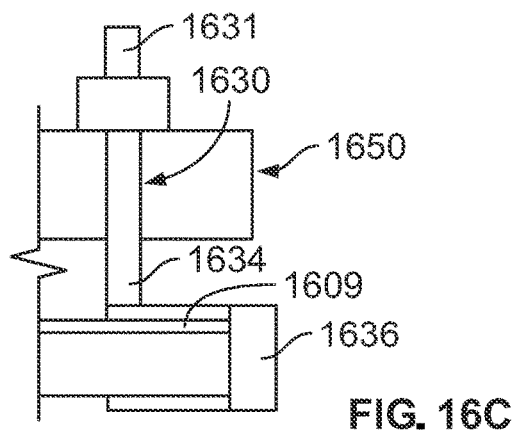
FIG. 16C is a schematic cross sectional side view of part of the electrical connection configuration of FIG. 16B.

Referring to FIGS. 16A-C, example connection schemes are described. Referring to FIG. 16A, the substrate cassette 1604 and the substrate 1602 are configured similarly to the substrate cassette 1404 and the substrate 1402 shown in FIGS. 14A-C. In addition, the substrate cassette 1604 includes an anode contact pin 1630 extending from the cassette body 1610. Further, a conductive wire 1632 is provided to electrically connect the anode contact pin 1630 to the first electrode contact 1620 of the substrate 1602. For example, the conductive wire 1632 includes a first end 1634 and an opposite second end 1635. The first end 1634 can be electrically connected to the anode contact pin 1630, and the second end 1635 can be electrically connected to the first electrode contact 1620 that is positioned outside the body 1610. Connecting pins, clips, or other suitable fastening mechanisms can be provided at the first and second ends 1634, 1635 to connect the conductive wire 1632 to the anode contact pin 1630 and the first electrode contact 1620, respectively.

Referring to FIG. 16B, the substrate cassette 1604 and the substrate 1602 are configured similarly to the substrate cassette 1404 and the substrate 1402 shown in FIGS. 14A-C. In addition, the substrate cassette 1604 includes an anode cassette body 1650. The anode cassette body 1650 can define a cavity configured to receive a portion of the substrate 1602. For example, the anode cassette body 1650 can be configured to receive at least the first electrode contact 1620 of the substrate 1602 that is positioned exterior of the cassette body 1610 of the substrate cassette 1604.

The anode cassette body 1650 can include a connection interface 1614 that is similar to the connection interface 1114 described in FIGS. 11A-D. In particular, as shown in FIG. 16C, the anode cassette body 1650 includes a cassette contact pin 1630 as the connection interface 1614. The cassette contact pin 1630 can extend through anode cassette body 1650 such that a first end 1631 of the cassette contact pin 1630 is placed exterior of anode cassette body 1650, and an opposite, second end 1634 of the cassette contact pin 1630 is placed interior of anode cassette body 1650. The cassette contact pin 1630 is configured to electrically connect to the substrate 1602 received in the anode cassette body 1650. In embodiments where the substrate 1602 includes a conductive coating 1609, the cassette contact pin 1630 can be electrically connected to the conductive coating 1609. For example, the second end 1634 of the cassette contact pin 1630 is configured to electrically connect to the conductive coating 1609, as illustrated in FIG. 16C.

In some implementations, the system 100 can include a substrate contact bracket 1636 configured to engage with the substrate 1602 and electrically connected to the substrate 1602. For example, the substrate contact bracket 1636 can be engaged with a portion of the substrate 1602 and electrically contact the conductive coating 1609 of the substrate 1602, as shown in FIG. 16C. The cassette contact pin 1630 can be configured to electrically connect to the substrate contact bracket 1636 when the substrate 1602 is received in the anode cassette body 1650. For example, the second end 1634 of the cassette contact pin 1630 is configured to contact with the substrate contact bracket 1636 based on the substrate 1602 held in the anode cassette body 1650. Thus, the cassette contact pin 1630 can be electrically connected to the substrate 1602 and further provide the connection interface 1614 at the exterior of the anode cassette body 1650. The first wire 1622 extending from the control system 1608 can simply be connected to the cassette contact pin 1630 (e.g., the first end 1631 thereof) so that the control system 1608 can be electrically connected to the substrate 1602 that can function as one (e.g., anode) of the electrodes in electrophoresis.

Figure 17A:
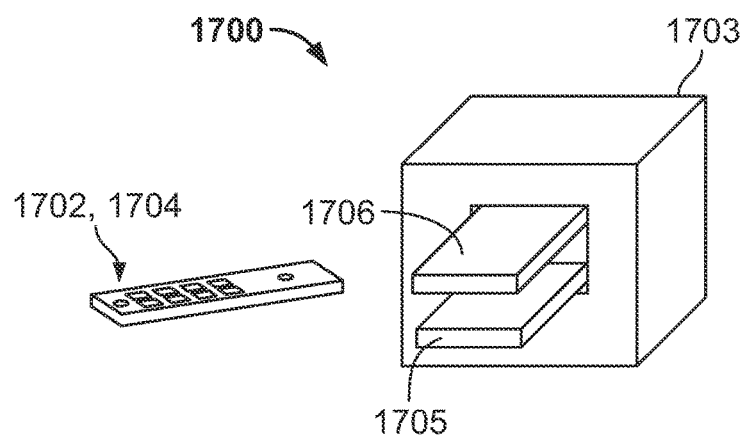
FIG. 17A is a schematic perspective view of an example instrument for electrophoresis.
Figure 17B:
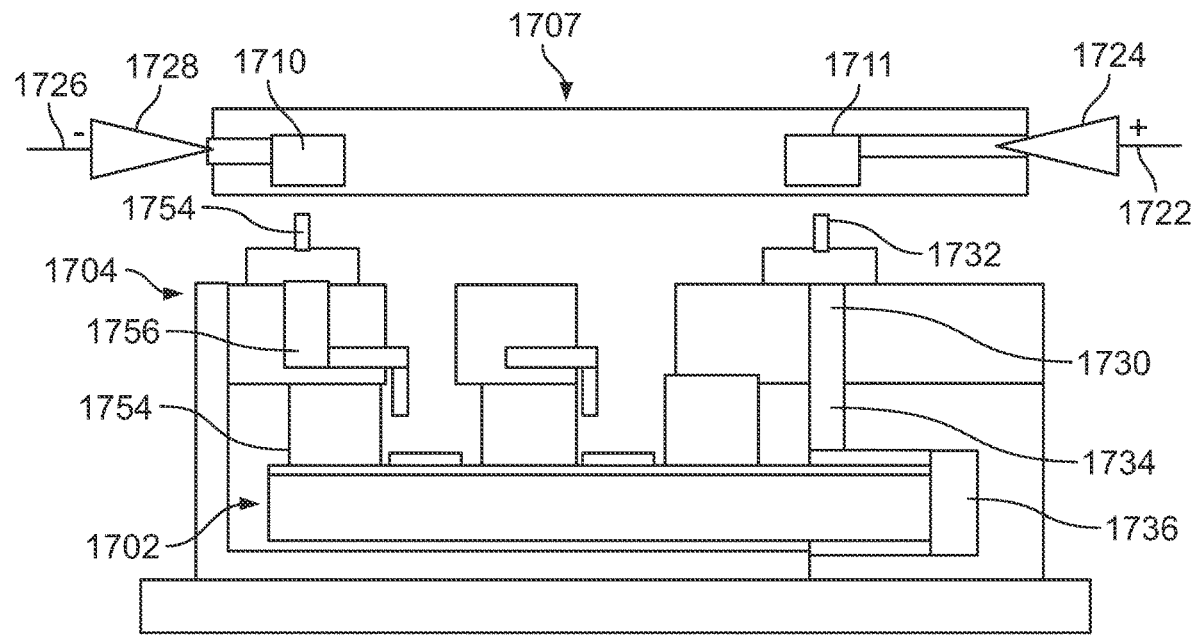
FIG. 17B is a schematic cross sectional side view of an example cassette cover of the instrument that receives an example set of substrate cassette and substrate.
Figure 17C:
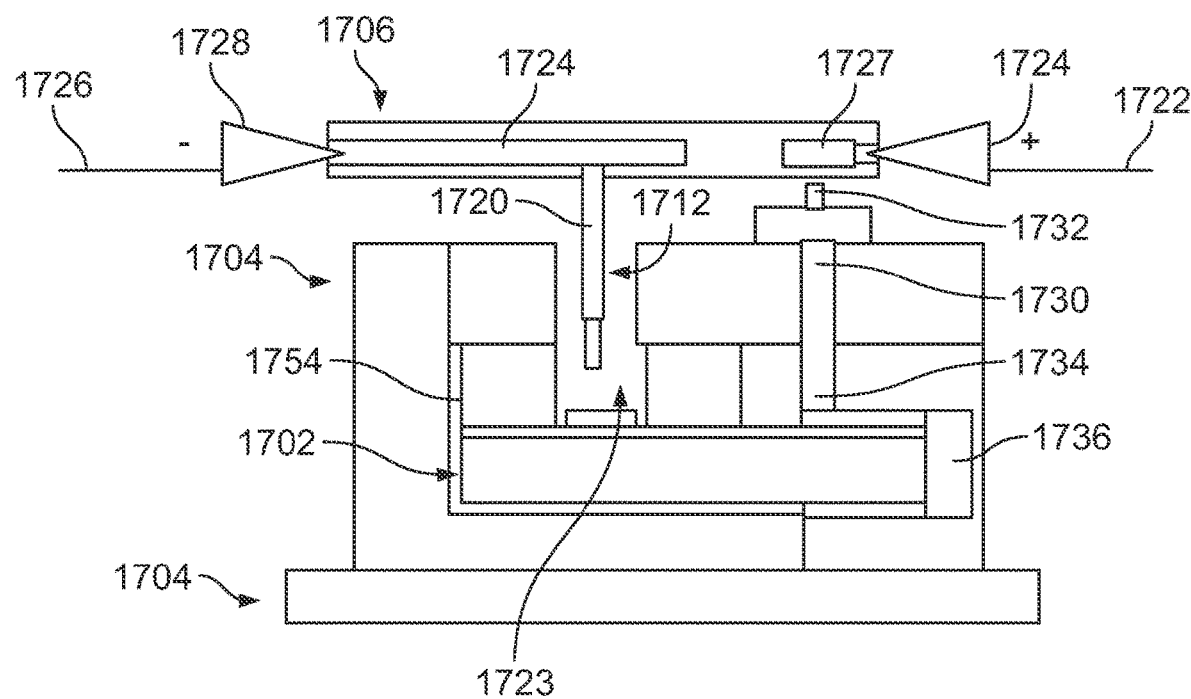
FIG. 17C is a schematic cross sectional side view of another example cassette cover of the instrument that receives an example set of substrate cassette and substrate.

Referring to FIGS. 17A-C, an example instrument 1700 for electrophoresis is described. The instrument 1700 can be used with one or more components of the electrophoretic system 100 described herein. In some implementations, the instrument 1700 is configured to automate at least part of the electrophoretic process that uses the substrate 1702, the substrate cassette 1704, the cathode assembly 1707, and the control system 1708.

Referring to FIG. 17A, the instrument 1700 has an instrument housing 1703, a cassette tray 1704, and a cassette cover 1706. The instrument housing 1703 is configured to receive at least one or all of the components of the electrophoretic system 100. For example, the instrument housing 1703 is configured to include the control system 1708. In some implementations, the instrument housing 1703 can include the controller 132 and the power supply 134. The power supply 134 can be connected to an electrical outlet external to the instrument housing 1703. Alternatively or in addition, the power supply 134 can include a battery that is received in the instrument housing 1703. The instrument housing 1703 can further include the user interface 136 of the control system 108. The user interface 136 can be placed in a location (e.g., adjacent the cassette tray 1705) suitable for a user to control the instrument 1700.

The cassette tray 1705 is configured to receive the substrate cassette 1704. For example, the substrate cassette 1704, which receives the substrate 1702, can be placed on the cassette tray 1705. In some implementations, the cassette tray 1705 extends from the instrument housing 1703 so that the substrate cassette 1704 can be conveniently placed on the cassette tray 1705. In some implementations, the cassette tray 1705 is retractable into the instrument housing 1703 so that electrophoresis can be performed within the instrument housing 1703. Once the electrophoresis is completed, the cassette tray 1705 is extended from the instrument housing 1703 so that the substrate cassette 1704 can be removed from the cassette tray 1705. Alternatively, the cassette tray 1705 can remain exterior of the instrument housing 1703 before, during, and after electrophoresis is performed.

The cassette tray 1705 can be configured to receive various implementations of the substrate cassette 1704 described herein. Referring to FIG. 17B, in one example, the substrate cassette 1704 described in FIGS. 15A-B is placed on the cassette tray 1705. In this example, the cassette cover 1706 is configured to be located above the cassette tray 1705 and provide electrical connections between the substrate cassette 1704 and the control system 1708. Referring to FIG. 17B, in embodiments where the substrate cassette 1704 described in FIGS. 15A-B is placed on the cassette tray 1705, the cassette cover 1706 can include a cathode connector 1710 and an anode connector 1711. The cathode connector 1710 is configured to electrically engage with the cathode contact 1754 (or an end of the cathode contact pin 606) of the substrate cassette 1704. The cathode connector 1710 is further electrically connected to the control system 1708. For example, the cathode connector 1710 is electrically connected to the second wire 1726 extending from the control system 1708. The anode connector 1711 is configured to electrically engage with the anode contact (i.e., the first end 1732 of the cassette contact pin 1730) of the substrate cassette 1704. The anode connector 1711 is further electrically connected to the control system 1708. For example, the anode connector 1711 is electrically connected to the first wire 1722 extending from the control system 1708.

In some implementations, the cassette cover 1706 can be movable between a raised position and a lowered position. In the raised position, the cassette cover 1706 is positioned at a first predetermined distance from the cassette tray 1705 so that the substrate cassette 1704 can be placed on the cassette tray 1705 without interference with the cassette cover 1706. Once the substrate cassette 1704 is placed on the cassette tray 1705, the cassette cover 1706 can be moved to the lowered position in which the cassette cover 1706 is positioned closer to the cassette tray 1705 and positioned at a second predetermined distance (shorter than the first predetermined distance) from the cassette tray 1705. In the lowered position, the cathode connector 1710 and the anode connector 1711 are engaged with the cathode contact 1754 and the anode contact (i.e., the first end 1732 of the cassette contact pin 1730) of the substrate cassette 1704, respectively. The cathode connector 1710 and the anode connector 1711 can be positioned so as to be aligned with the cathode contact 1754 and the anode contact (i.e., the first end 1732 of the cassette contact pin 1730) of the substrate cassette 1704 when the cassette cover 1706 is positioned in the lowered position relative to the substrate cassette 1704. In some implementations, the cassette cover 1706 can be manually operated between the raised position and the lowered position. Alternatively or in addition, the cassette cover 1706 is automatically actuated using an actuator (e.g., a motor) that is controlled by a controller (e.g., the control system 1708). For example, a user can place the substrate cassette 1704 on the cassette tray 1705 and select a menu via a user interface (e.g., the user interface 136 (FIG. 1)) to lower the cassette cover 1706, and the control system 1708 operates the actuator to move the cassette cover 1706 so that the cassette cover 1706 engages with the substrate cassette 1704 and makes necessary electrical connection with the substrate cassette 1704 as described above.

Referring to FIG. 17C, in another example, the substrate cassette 1704 described in FIGS. 11A-D is placed on the cassette tray 1705. In this example, the cassette cover 1706 is configured to be located above the cassette tray 1705 and provide at least part of the cathode assembly 1707. For example, the cassette cover 1706 can include a plurality of electrodes 1720 that project from the cassette cover 1706 and configured to extend into the plurality of buffer chambers 1723 (defined at least by the plurality of apertures 1712 of the substrate cassette 1704). The cassette cover 1706 can further include a cathode connector 1724 that electrically connects the plurality of electrodes 1720 and is further configured to electrically connect the control system 1708 via, for example, the second wire 1726 extending from the control system 1708.

Further, the cassette cover 1706 can include an anode connector 726. The anode connector 1727 is configured to electrically engage with the anode contact (i.e., the first end 1732 of the cassette contact pin 1730) of the substrate cassette 1704. The anode connector 1727 is further electrically connected to the control system 1708. For example, the anode connector 726 is electrically connected to the first wire 1722 extending from the control system 1708.

As described above, the cassette cover 1706 can be movable between the raised position and the lowered position. Once the substrate cassette 1704 is placed on the cassette tray 1705 with the cassette cover 1706 being in the raised position, the cassette cover 1706 can be moved to the lowered position. In the lowered position, the plurality of electrodes 1720 are positioned within the buffer chambers 1723, respectively. Further, in the lowered position, the anode connector 1711 are engaged with the anode contact (i.e., the first end 1732 of the cassette contact pin 1730) of the substrate cassette 1704.

Figure 18:
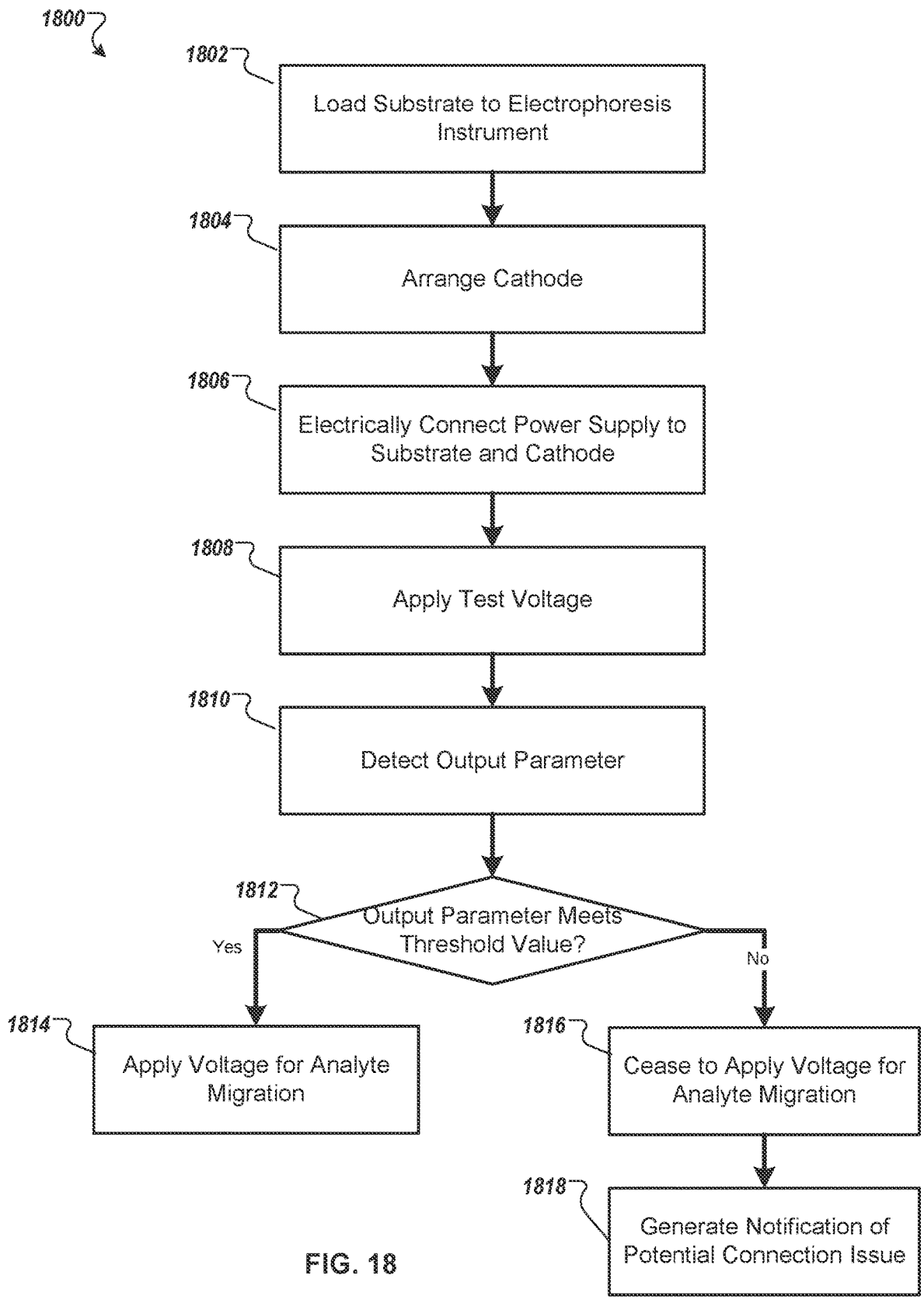
FIG. 18 is a flowchart of an example process for analyte migration.

FIG. 18 is a flowchart of an example process 1800 for analyte migration. The process 1800 can be performed using the electrophoretic system 100 (including the instrument 1700) described herein. The process 1800 can be used to check for electrical connections in the system 100 prior to execution of electrophoresis.

In some implementations, the process 1800 can include loading a substrate (e.g., the substrate 1002) to an electrophoresis instrument (e.g., the instrument 1700) (1802). For example, as described herein, the substrate 1002 comprises capture probes on the substrate regions 1016, and one or more biological samples can be placed on the substrate 1002 so that the biological samples contact with the capture probes. Alternatively, the biological samples do not make contact with the capture probes. For example, an intermediate layer (e.g., gels) can be disposed between the substrate and the sample, which is compatible with electrophoresis. A substrate cassette (e.g., the substrate cassette 1004) can be arranged on the substrate 1002 so that the plurality of apertures 1012 of the substrate cassette 1004 are aligned with the substrate regions 1016 of the substrate 1002 and define a plurality of buffer chambers (e.g., the buffer chambers 122, 1723) on the substrate regions 1016 of the substrate 1002. Then, buffers (e.g., the buffers 124) are supplied in the buffer chambers.

The process 1800 can include arranging a cathode relative to the substrate (1804). For example, the cathode can include a plurality of electrodes (e.g., the electrodes 1252, 1720) that can be placed within the plurality of chambers, respectively.

The process 1800 can include electrically connecting a power supply to the substrate and the cathode (1806). As described herein, the power supply can be included in and controlled by the control system 1008. The power supply (or the control system) can be electrically connected to the substrate (as the anode) and the cathode (e.g., the plurality of electrodes) in various ways described herein, such as using various connection interfaces implemented in the substrate 1002, the substrate cassette 1004, the cathode assembly 1006, the cassette cover 1706, etc.

The process 1800 can include applying a test voltage between the substrate (i.e., the anode) and the cathode (1808). The test voltage can be lower than a voltage necessary for executing electrophoresis in the instrument 1700. The test voltage can be applied to ensure that electrical connections are made in the electrophoretic system 100 (including the instrument 1700) before electrophoresis is performed. Such electrical connections can include at least one of an electrical connection of the power supply to the substrate, an electrical connection of the power supply to the cathode, or an electrical property of the buffers.

The process 1800 can include detecting an output parameter in response to the test voltage (1810). In some implementations, the output parameter can be an impedance. For example, the test voltage can allow a current to flow through the system 100 (including the instrument 1700), and the process 1800 can measure the current in the system 100, and calculate an impedance based on the measured current and the test voltage being applied. In other implementations, other parameters in the system 100 can be used.

The process 1800 can include determining whether the output parameter meets a threshold value (1812). The threshold value can be a value that is indicative of proper electrical connection in the system 100 (including the instrument 1700). For example, the threshold value can be an impedance of the system 100 when proper electrical connections are made in the system 100, such as the electrical connection of the power supply to the substrate, the electrical connection of the power supply to the cathode, the electrical property of the buffers, etc. The threshold value can be a single value. Alternatively, the threshold value can be a range of value.

The process 1800 can include, upon determining that the output parameter meets the threshold value, applying a voltage for analyte migration (1814). For example, when the output parameter meets the threshold value, the electrical connections in the system can be considered to be proper. Therefore, an actual voltage for electrophoresis can be applied to generate electric fields between the substrate (e.g., the plurality of substrate regions of the substrate) and the cathode (e.g., the plurality of electrodes) through one or a plurality of buffer chambers. The electrical fields can cause the analytes in the biological samples to migrate toward the capture probes on the substrate.

The process 1800 can include, upon determining that the output parameter does not meet the threshold value, ceasing to apply the voltage for analyte migration (1816). For example, when the output parameter does not meet the threshold value, the electrical connections in the system can be considered to be improper. Thus, the instrument 1700 can stop applying the actual voltage if it has already started it, or does not proceed with applying the actual voltage if it hasn't started yet.

The process 1800 can include, upon determining that the output parameter does not meet the threshold value, generating a notification of a potential electrical connection issue (1818). The notification can be output to the instrument 1700 or other devices that the user can access. For example, the notification can be output via the user interface 136. The notification can include information that alerts users of an improper electrical connection in the system 100 (including the instrument 1700). The notification can be output before advancing to subsequent steps for electrophoresis (e.g., applying the actual voltage for electrophoresis), so that the user can decide to take any action to investigate and/or remediate such improper connection. For example, based on the notification, the user can examine physical connections between the power supply and the substrate or between the power supply and the cathode, and check for the buffers. The user can then adjust the physical connections, or replace/refill the buffers, to resolve any issue. Alternatively, the notification can be output during or after performing such subsequent steps for electrophoresis (e.g., applying the actual voltage for electrophoresis). The user can consider such possibility of connection issues when analyzing the analytes captured by the electrophoresis.

Figure 19:
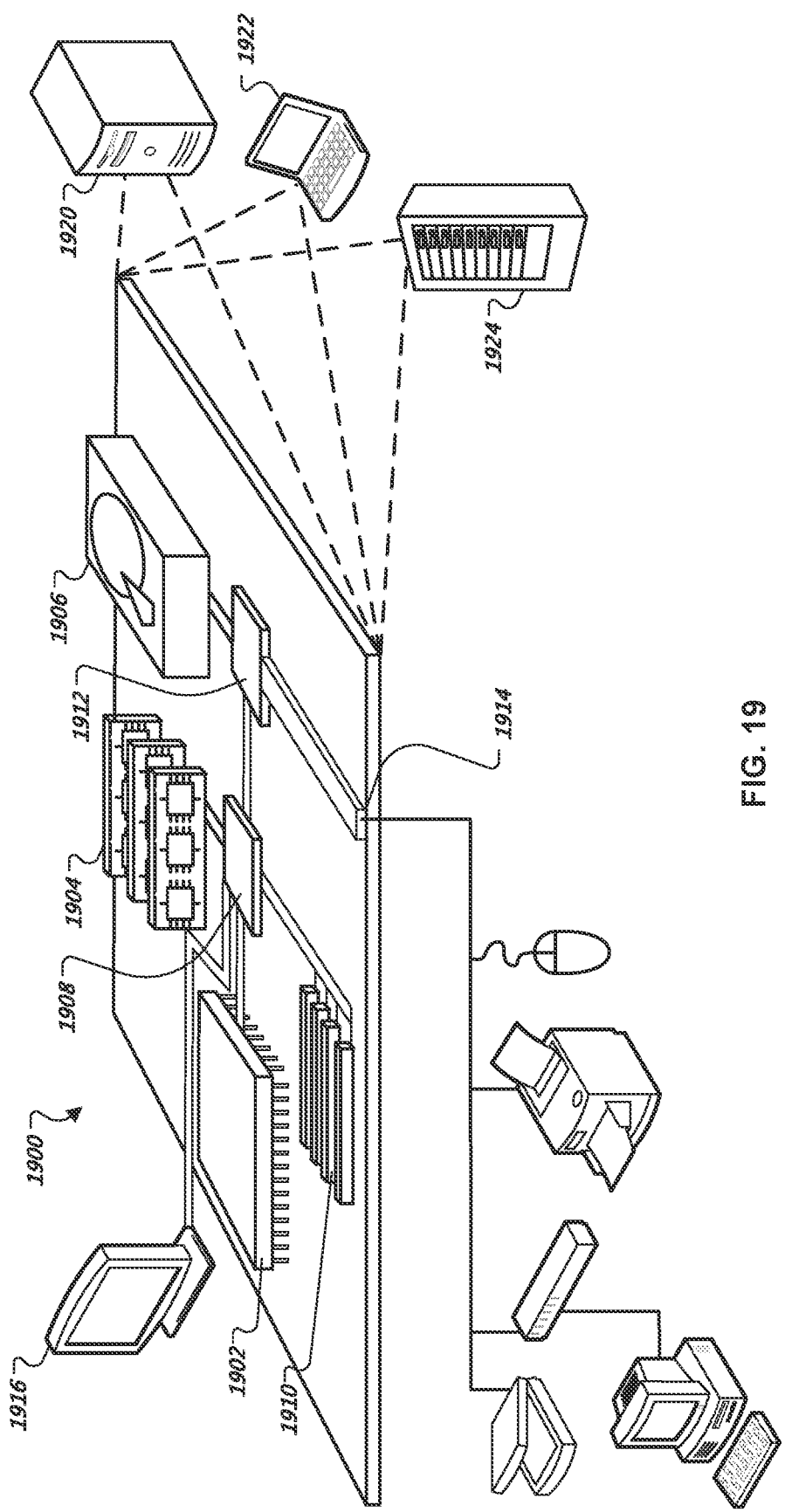
FIG. 19 is a block diagram of computing devices that may be used to implement the systems and methods described in this document, as either a client or as a server or plurality of servers.

FIG. 19 is a block diagram of computing devices 1900 that may be used to implement the systems and methods described in this document, as either a client or as a server or plurality of servers. Computing device 1900 is intended to represent various forms of digital computers, such as laptops, desktops, workstations, personal digital assistants, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1900 includes a processor 1902, memory 1904, a storage device 1906, a high-speed interface 1908 connecting to memory 1904 and high-speed expansion ports 1910, and a low speed interface 1912 connecting to low speed bus 1914 and storage device 1906. Each of the components 1902, 1904, 1906, 1908, 1910, and 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a graphic user interface (GUI) on an external input/output device, such as display 1916 coupled to high-speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or units. The memory 1904 may also be another form of computer-readable medium, such as a magnetic or optical disk.

The storage device 1906 is capable of providing mass storage for the computing device 1900. In one implementation, the storage device 1906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, or memory on processor 1902.

The high-speed controller 1908 manages bandwidth-intensive operations for the computing device 1900, while the low speed controller 1912 manages lower bandwidth-intensive operations. Such allocation of functions is an example only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown). Each of such devices may contain one or more of computing device 1900, and an entire system may be made up of multiple computing devices 1900 communicating with each other.

Additionally computing device 1900 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Active Capture Methods

In some of the methods described herein, an analyte in a biological sample (e.g., in a cell or tissue section) can be transported (e.g., passively or actively) to a capture probe (e.g., a capture probe affixed to a substrate (e.g., a substrate or bead)).

For example, analytes can be transported to a capture probe (e.g., an immobilized capture probe) using an electric field (e.g., using electrophoresis), pressure, fluid flow, gravity, temperature, and/or a magnetic field. For example, analytes can be transported through, e.g., a gel (e.g., hydrogel), a fluid, or a permeabilized cell, to a capture probe (e.g., an immobilized capture probe) using a pressure gradient, a chemical concentration gradient, a temperature gradient, and/or a pH gradient. For example, analytes can be transported through a gel (e.g., hydrogel), a fluid, or a permeabilized cell, to a capture probe (e.g., an immobilized capture probe).

In some examples, an electrophoretic field can be applied to analytes to facilitate migration of analytes towards a capture probe. In some examples, a sample containing analytes contacts a substrate having capture probes fixed on the substrate (e.g., a slide, cover slip, or bead), and an electric current is applied to promote the directional migration of charged analytes towards capture probes on a substrate. An electrophoresis assembly (e.g., an electrophoretic chamber), where a biological sample is in contact with a cathode and capture probes (e.g., capture probes fixed on a substrate), and where the capture probes are in contact with the biological sample and an anode, can be used to apply the current.

In some embodiments, methods utilizing an active capture method can employ a conductive substrate (e.g., any of the conductive substrates described herein). In some embodiments, a conductive substrate includes paper, a hydrogel film, or a glass slide having a conductive coating. In some embodiments, a conductive substrate (e.g., any of the conductive substrates described herein) includes one or more capture probes.

FIGS. 20A and 20B show different example analytical workflows of active capture methods using an electric field (e.g., using electrophoresis). In some examples, a biological sample 2002 (e.g., a tissue sample) can be in contact with a first substrate 2004. In some embodiments, first substrate 2004 can have one or more coatings (e.g., any of the conductive substrates described herein) on its surface. Non-limiting examples of coatings include, nucleic acids (e.g., RNA) and conductive oxides (e.g., indium tin oxide). In some embodiments, first substrate 2004 can have a functionalization chemistry on its surface. In the examples shown in FIGS. 20A and 20B, first substrate 2004 is overlaid with a first coating 2006, and first coating 2006 (e.g., a conductive coating) is further overlaid with a second coating 2008. In some embodiments, first coating 2006 is an indium tin oxide (ITO) coating. In some embodiments, second coating 2008 is a lawn of capture probes (e.g., any of the capture probes described herein). In some embodiments, a substrate can include an ITO coating. In some embodiments, a substrate can include capture probes or capture probes attached to features on the substrate.

Biological sample 2002 and second coating 2008 (e.g., a lawn of capture probes) can be in contact with a permeabilization solution 2010. Non-limiting examples of permeabilization solutions includes enzymes (e.g., proteinase K, pepsin, and collagenase), detergents (e.g., sodium dodecyl sulfate (SDS), polyethylene glycol tert-octylphenyl ether, polysorbate 80, and polysorbate 20), ribonuclease inhibitors, buffers optimized for electrophoresis, buffers optimized for permeabilization, buffers optimized for hybridization, or combinations thereof. Permeabilization reagents can also include but are not limited to a dried permeabilization reagent, a permeabilization buffer, a buffer without a permeabilization reagent, a permeabilization gel, and a permeabilization solution. In some examples, biological samples (e.g., tissue samples) can be permeabilized first and then be subjected to electrophoresis.

FIG. 20A shows an example analytical workflow including a first step 2012 in which biological sample 2002 can be permeabilized prior to subjecting the sample 2002 to electrophoresis. Any of the permeabilization methods disclosed herein can be used during first step 2012. Biological sample 2002 includes an analyte 2014. In some embodiments, the analyte 2014 is a negatively charged analyte. First substrate 2004 can include a capture probe 2016 that is fixed or attached to the first substrate 2004 or attached to features (e.g., beads) 2018 on the substrate. In some embodiments, capture probe 2016 can include any of the capture probes disclosed herein. In some embodiments, capture probes are directly or indirectly attached to the first substrate 2004. In some embodiments, the capture probe 2016 is positively charged.

In step 2020, after permeabilization of biological sample 2002 concludes, the sample 2002 can be subjected to electrophoresis. During electrophoresis, the biological sample 2002 is subjected to an electric field that can be generated by sandwiching biological sample 2002 between the first substrate 2004 and a second substrate 2022, connecting each substrate to a cathode and an anode, respectively, and running an electric current through the substrates. The application of the electric field "−E" causes the analyte 2004 (e.g., a negatively charged analyte) to migrate towards the substrate 2004 and capture probe 2016 (e.g., a positively charged capture probe) in the direction of the arrows shown in FIG. 20A. In some embodiments, the analyte 2014 migrates towards the capture probe 2016 for a distance "h." In some embodiments, the analyte 2014 migrates towards a capture probe 2016 through one or more permeabilized cells within the permeabilized biological sample (e.g., from an original location in a permeabilized cell to a final location in or proximal to the capture probe 2016). Second substrate 2022 can include the first coating 2006 (e.g., a conductive coating), thereby allowing electric field "−E" to be generated.

In some embodiments, the analyte 2014 is a protein or a nucleic acid. In some embodiments, the analyte 2014 is a negatively charged protein or a nucleic acid. In some embodiments, the analyte 2014 is a positively charged protein or a nucleic acid. In some embodiments, the capture probe 2016 is a protein or a nucleic acid. In some embodiments, the capture probe 2016 is a positively charged protein or a nucleic acid. In some embodiments, the capture probe 2016 is a negatively charged protein or a nucleic acid. In some embodiments, the analyte 2014 is a negatively charged transcript. In some embodiments, the analyte 2014 is a poly(A) transcript. In some embodiments, the capture probe 2016 is attached to a feature in a feature array. In some embodiments, permeabilization reagent 2010 can be in contact with sample 2002, first substrate 2004 second substrate 2022, or any combination thereof.

FIG. 20B shows an example analytical workflow in which biological sample 2002 can be permeabilized and subjected to electrophoresis simultaneously. In some embodiments, simultaneous permeabilization and electrophoresis of biological sample 2002 can decrease the total duration of the analytical workflow translating into a more efficient workflow.

In some embodiments, the permeabilization reaction is conducted at a chilled temperature (e.g., about 4° C.). In some embodiments, conducting the permeabilization reaction at a chilled temperature controls the enzyme activity of the permeabilization reaction. In some embodiments, the permeabilization reaction is conducted at a chilled temperature in order to minimize drift and/or diffusion of the analyte 2014 from an original location (e.g., a location in a cell of the biological sample 2002) until a user is ready to initiate the permeabilization reaction. In some embodiments, the permeabilization reaction is conducted at a warm temperature (e.g., a temperature ranging from about 15° C. to about 37° C. or more) in order to initiate and/or increase the rate of the permeabilization reaction. In some embodiments, once electrophoresis is applied and/or the permeabilization reaction is heated, the permeabilization reaction allows for analyte migration from an original location (e.g., a location in a cell of the biological sample 2002) to the capture probe 2016 on the first substrate 2004.

Referring generally to FIGS. 21A-C, example substrate configurations for use in the active migration of analytes from a first location to a second location via electrophoresis are shown. FIG. 21A shows an example substrate configuration for use in electrophoresis in which the first substrate 2104 and the second substrate 2122 are aligned at about 90 degrees with respect to each other. In this example, the first substrate 2104 including biological sample 2102 is placed beneath second substrate 2122. Both the first substrate 2104 and the second substrate 2122 can be connected to electrical wires 2124 that direct an electric current from a power supply to the substrates, thereby generating an electric field between the substrates. FIG. 21B shows an additional example substrate configuration for use during electrophoresis in which the first substrate 2104 and the second substrate 2122 are parallel with respect to each other. In this example, the first substrate 2104 including biological sample 2102 is also placed beneath second substrate 2122.

FIG. 21C shows yet an additional example substrate configuration for use in electrophoresis in which the second substrate 2122 and a third substrate 2126 are aligned at about 90 degrees with respect to the first substrate 2104. Thus, in this example, a first biological sample 2102a and a second biological sample 2102b can be subjected to electrophoresis simultaneously. In some embodiments, 3, 4, 5, 6, 7, 8, 9, 10, or more biological samples can be placed on a same substrate and be subjected to electrophoresis simultaneously. In some embodiments, 2, 3, 4, 5, 6, 7, 8, 9, 10, or more top substrates can be placed above a same bottom substrate containing one or more samples in order to simultaneously subject the one or more samples to electrophoresis. In some embodiments, 2, 3, 4, 5, 6, 7, 8, 9, 10, or more top substrates can be perpendicularly placed (e.g., at about 90 degrees) above a same bottom substrate containing one or more samples in order to simultaneously subject the one or more samples to electrophoresis. In some embodiments, 2, 3, 4, 5, 6, 7, 8, 9, 10, or more top substrates can be placed at a particular angle (e.g., at about 10, 20, 30, 40, 45, 50, 60, 70, or 80 degrees) with respect to a bottom substrate containing one or more samples in order to simultaneously subject the one or more samples to electrophoresis. In some embodiments, 2, 3, 4, 5, 6, 7, 8, 9, 10, or more top substrates can be placed in a parallel orientation above a same bottom substrate containing one or more biological samples in order to simultaneously subject the one or more samples to electrophoresis. In some embodiments, a configuration of top substrates can be arranged above a same bottom substrate containing one or more biological samples in order to simultaneously subject the one or more samples to electrophoresis. In some embodiments, a first configuration of top substrates can be arranged above a second array of bottom substrates containing one or more biological samples in order to simultaneously subject the one or more biological samples to electrophoresis. In some embodiments, simultaneously subjecting two or more biological samples on a same substrate to electrophoresis can provide the advantage of a more effective workflow. In some embodiments, one or more of the top substrates can contain the biological sample.

In some embodiments, methods utilizing an active capture method can include one or more solutions between the biological sample and the substrate (e.g., a substrate including capture probes). In some embodiments, the one or more solutions between the biological sample and the substrate including capture probes can include a permeabilization buffer (e.g., any of the permeabilization buffers described herein). In some embodiments, the one or more solutions between the biological sample and the substrate including capture probes can include an electrophoresis buffer.

In some embodiments, actively capturing analytes can include one or more porous materials between the biological sample and the substrate including capture probes. In some embodiments, the one or more porous materials between the biological sample and substrate including capture probes can include a paper or a blotting membrane. In some embodiments, the one or more porous materials between the biological sample and the substrate including capture probes can include a gel containing one or more solutions. For example, in a non-limiting way, the gel can be a SDS-PAGE gel. In some embodiments, the one or more porous materials between the biological sample and the substrate including capture probes can contain a permeabilization buffer. In some embodiments, the one or more porous materials between the biological sample and the substrate including capture probes can contain an electrophoresis buffer. In some embodiments, actively capturing analytes can include one or more solutions and one or more porous materials between the biological sample and the substrate including capture probes.

In some embodiments, the one or more porous materials between the biological sample and the substrate including capture probes (e.g., an array) can act as a filter to separate analytes (e.g., analytes of interest) from other molecules or analytes present in the biological sample. In some embodiments, the analytes (e.g., analytes of interest) are RNA transcripts. In some embodiments, the one or more porous materials between the biological sample and the substrate including capture probes can act as a filter to separate RNA transcripts from other molecules (e.g., analytes) such as proteins, lipids and/or other nucleic acids. In some embodiments, the one or more porous materials between the biological sample and the substrate including capture probes can act as a filter to separate the analytes and other molecules based on physicochemical properties. For example, in a non-limiting way, analytes can be separated on properties such as charge, size (e.g., length, radius of gyration, effective diameters, etc.), hydrophobicity, hydrophilicity, molecular binding (e.g., immunoaffinity), and combinations thereof. In some embodiments, the one or more porous materials between the biological sample and the substrate including capture probes can separate the analytes from other molecules to reduce non-specific binding near the capture probes and therefore improve binding between the analytes and the capture probes, thus improving subsequent assay performance.

In some embodiments, the one or more porous materials between the biological sample and the substrate including capture probes can act as molecular sieving matrices for electrophoretic analyte separation. For example, in a non-limiting way, separation of analytes can occur based on physicochemical properties such as charge, size (e.g., length, radius of gyration, and effective diameters, etc.), electrophoretic mobility, zeta potential, isoelectric point, hydrophobicity, hydrophilicity, molecular binding (e.g., immunoaffinity), and combinations thereof. In some embodiments, the one or more porous materials between the biological sample and the substrate including capture probes can be of a uniform pore size. In some embodiments, the one or more porous materials between the biological sample and the substrate including capture probes can have discontinuities in pore sizes, as generally used in different gel electrophoresis schemes. In some embodiments, the one or more porous materials between the biological sample and the substrate including capture probes can have gradients in pore sizes. For example, the one or more porous materials (e.g., a hydrogel) can have a gradient of pore sizes such that the gradient separates the analytes as the analytes migrate to the substrate including capture probes (e.g., an array).

In some embodiments, the one or more porous materials between the biological sample and the substrate including capture probes can separate the analytes based on length. For example, shorter analytes will have a higher electrophoretic mobility, and therefore migrate faster towards the capture probes relative to longer analytes in an electrophoretic setup. In some embodiments, the one or more porous materials between the biological sample and the substrate including capture probes separate the analytes based on length, such that only shorter analytes can migrate through the one or more porous materials to reach the capture probes, while longer analytes cannot reach the capture probes.

In some embodiments, specific subsets of analytes (e.g., a subset of transcripts) can be captured by applying an electrophoretic field for a certain amount of time. In some embodiments, specific subsets of analytes (e.g., a subset of transcripts) can be captured by selecting different porous materials (e.g., porous materials with different compositions) between the biological sample and the substrate including capture probes. In some embodiments, specific subsets of analytes (e.g., a subset of transcripts) can be captured by applying an electrophoretic field for a certain amount of time and selecting different porous materials between the biological sample and the substrate including capture probes (e.g., an array).

In some embodiments, the one or more porous materials between the biological sample and the substrate including capture probes can have discontinuities in pore sizes that can cause an increase in the concentration of the migrating analytes (e.g., "stacking"). For example, the one or more porous materials (e.g., a hydrogel) between the biological sample and the substrate including capture probes can have discontinuities in pore sizes that can cause an increase in the concentration of the analytes near the capture probes resulting in favorable binding kinetics and increased sensitivity. In some embodiments, the one or more porous materials between the biological sample and the substrate including capture probes can have discontinuities in pore sizes that enhance the separation between migrating analytes of different sizes and/or lengths. In some embodiments, the one or more porous materials between the biological sample and the substrate including capture probes can include a first porous material and a second porous material, with the first porous material having a larger pore size than the second porous material. In some embodiments, the first porous material is located on the surface, or near the surface, of the biological sample. In some embodiments, the second porous material (e.g., second porous material with a smaller pore size than the first porous material) can be placed on the surface, or near the surface, of the first porous material. In some embodiments, as analytes migrate (e.g., migrate via electrophoresis) from the biological sample through the first porous material and the second porous material sequentially, the migrating analytes can collect (e.g., "stack") at the interface between the first porous material and the second porous material.

In some embodiments, the one or more porous materials between the biological sample and the substrate including capture probes can include a gradient in pore sizes for continuous stacking as analytes migrate through decreasing pore sizes (e.g., decreasing pore diameter). In some embodiments, the one or more porous materials between the biological sample and the substrate including capture probes can include a gradient in pore sizes such that the pores decrease in diameter as the analytes migrate from the biological sample to the substrate including capture probes. In some embodiments, the pore size gradient can increase the resolution among analytes of different sizes. In some embodiments, the pore size gradient can increase the concentration of the analytes near the capture probes. In some embodiments, the pore size gradient can continuously reduce the speed at which the analytes migrate and collect (e.g., "stack") as the analytes migrate through the gradient of decreasing pore sizes (e.g., decreasing pore diameter).

In some embodiments, the one or more porous materials between the biological sample and the substrate including capture probes can include a gradient gel for continuous stacking as analytes migrate through decreasing pore sizes (e.g., decreasing pore diameter) of the gradient gel. In some embodiments, the gradient gel can have pores with a decreasing diameter as the analytes migrate toward the capture probes. In some embodiments, the gradient gel can increase the separation resolution among analytes of different sizes. In some embodiments, the gradient gel can increase the concentration of analytes near the capture probes. In some embodiments, the gradient gel can continuously reduce the speed at which analytes migrate and collect (e.g., "stack") as the analytes migrate through the gradient gel of decreasing pore sizes (e.g., decreasing in diameter).

In some embodiments, a biological sample can be placed in a first substrate holder (e.g., a substrate holder described herein). In some embodiments, a spatially-barcoded capture probe array (e.g., capture probes, barcoded array) can be placed on a second substrate holder (e.g., a substrate holder described herein). In some embodiments, a biological sample can be placed in a first substrate holder that also contains capture probes. In some embodiments, the first substrate holder, the second substrate holder, or both can be conductive (e.g. any of the conductive substrates described herein). In some embodiments, the first substrate holder including the biological sample, the second substrate holder including capture probes, or both, can be contacted with permeabilization reagents (e.g., a permeabilization buffer) and analytes can be migrated from the biological sample toward the barcoded array using an electric field.

In some embodiments, electrophoresis can be applied to a biological sample on a barcoded array while in contact with a permeabilization buffer. In some embodiments, electrophoresis can be applied to a biological sample on a barcoded array while in contact with an electrophoresis buffer (e.g. a buffer that lacks permeabilization reagents). In some embodiments, the permeabilization buffer can be replaced with an electrophoresis buffer after a desired amount of time. In some embodiments, electrophoresis can be applied simultaneously with the permeabilization buffer or electrophoresis buffer. In some embodiments, electrophoresis can be applied after a desired amount of time of contact between the biological sample and the permeabilization buffer or electrophoresis buffer.

In some embodiments, the biological sample can be placed on a substrate (e.g., a porous membrane, a hydrogel, paper, etc.). In some embodiments, the biological sample placed on the substrate can have a gap (e.g., a space) between the substrate and the substrate holder (e.g., conductive substrate holder). In some embodiments, the barcoded array can be placed on a substrate (e.g., a porous membrane, a hydrogel, paper, etc.). In some embodiments, the barcoded array can have a gap between the substrate and substrate holder (e.g., conductive substrate holder). In some embodiments, the barcoded array can be placed in direct proximity to the biological sample or at a desired distance from the biological sample. In some embodiments, a buffer reservoir can be used between the substrate holder (e.g., conductive substrate holder) and the barcoded array, the biological sample, or both. This setup allows the analytes to be migrated to a barcoded array while not in proximity with the electrodes (e.g. conductive substrate holder), thus resulting in more stable electrophoresis.

In some embodiments, a combination of at least two buffers with different ionic compositions can be used to differentially migrate analytes based on their ionic mobility (e.g., isotachophoresis (ITP)). For example, using two or more buffers with different ionic compositions can increase the concentration of analytes prior to contact with a barcoded array. Isotachophoresis includes at least two buffers that contain a common counter-ion (e.g., ions that have different charge sign than the analytes) and different co-ions (e.g., ions that have the same charge sign as the analytes) (Smejkal P., et al., Microfluidic isotachophoresis: A review, Electrophoresis, 34.11 1493-1509, (2013) which is incorporated herein by reference in its entirety). In some embodiments, one buffer can contain a co-ion with a higher ionic mobility (e.g. speed at which they travel through solution in an electric field) than the analytes (e.g., the "leading" buffer). In some embodiments, a second buffer can contain a co-ion with a lower ionic mobility than the analytes (e.g., the "trailing" buffer). In some embodiments, a third buffer can contain a co-ion with an ionic mobility that is between the electric mobility of the analytes. In some embodiments, a biological sample can be placed on a first substrate holder (e.g., a conductive substrate holder) and the barcoded array can be placed on a second substrate holder (e.g., a second conductive substrate holder) and contacted with a permeabilization buffer and the analytes can be migrated away from the biological sample and toward the barcoded array using an electric field. As the electric field is applied to the biological sample the analytes can be concentrated in the buffer as they are migrated toward the capture probes. In some embodiments, isotachophoresis can be used with gel-based separations (e.g., any of the gel-based separations described herein).

In some embodiments, a permeabilization buffer can be applied to a region of interest (e.g., region of interest as described herein) in a biological sample. In some embodiments, permeabilization reagents (e.g. a hydrogel containing permeabilization reagents) can be applied to a region of interest in a biological sample. For example, a region of interest can be a region that is smaller in area relative to the overall area of the biological sample. In some embodiments, the permeabilization buffer or permeabilization reagents can be contacted with the biological sample and a substrate including capture probes (e.g., an array). In some embodiments, the biological sample can have more than one region of interest (e.g. two, three). In some embodiments, the biological sample, the substrate including capture probes, or both, can be placed in a conductive substrate holder. In some embodiments, analytes can be released from the region(s) of interest and migrated from the biological sample toward the capture probes with an electric field.

In some embodiments, electrophoretic transfer of analytes can be performed while retaining the relative spatial locations of analytes in a biological sample while minimizing passive diffusion of an analyte away from its location in a biological sample. In some embodiments, an analyte captured by a capture probe (e.g., capture probes on a substrate) retains the spatial location of the analyte present in the biological sample from which it was obtained (e.g., the spatial location of the analyte that is captured by a capture probe on a substrate when the analyte is actively migrated to the capture probe by electrophoretic transfer can be more precise or representative of the spatial location of the analyte in the biological sample than when the analyte is not actively migrated to the capture probe). In some embodiments, electrophoretic transport and binding process is described by the Damkohler number (Da), which is a ratio of reaction and mass transport rates. The fraction of analytes bound and the shape of the biological sample will depend on the parameters in the Da. There parameters include electromigration velocity $U_e$ (depending on analyte electrophoretic mobility $\mu_e$ and electric field strength E), density of capture probes (e.g., barcoded oligonucleotides) $p_0$, the binding rate between probes (e.g., barcoded oligonucleotides) and analytes $k_{on}$, and capture area thickness L.

$$Da \sim \frac{k_{on} p_0 L}{\mu_e E}$$

Fast migration (e.g., electromigration) can reduce assay time and can minimize molecular diffusion of analytes.

In some embodiments, electrophoretic transfer of analytes can be performed while retaining the relative spatial alignment of the analytes in the sample. As such, an analyte captured by the capture probes (e.g., capture probes on a substrate) retains the spatial information of the cell or the biological sample from which it was obtained. Applying an electrophoretic field to analytes can also result in an increase in temperature (e.g., heat). In some embodiments, the increased temperature (e.g., heat) can facilitate the migration of the analytes towards a capture probe.

In some examples, a spatially-addressable microelectrode array is used for spatially-constrained capture of at least one charged analyte of interest by a capture probe. For example, a spatially-addressable microelectrode array can allow for discrete (e.g., localized) application of an electric field rather than a uniform electric field. The spatially-addressable microelectrode array can be independently addressable. In some embodiments, the electric field can be applied to one or more regions of interest in a biological sample. The electrodes may be adjacent to each other or distant from each other. The microelectrode array can be configured to include a high density of discrete sites having a small area for applying an electric field to promote the migration of charged analyte(s) of interest. For example, electrophoretic capture can be performed on a region of interest using a spatially-addressable microelectrode array.

A high density of discrete sites on a microelectrode array can be used. The surface can include any suitable density of discrete sites (e.g., a density suitable for processing the sample on the conductive substrate in a given amount of time). In one embodiment, the surface has a density of discrete sites greater than or equal to about 500 sites per 1 mm². In some embodiments, the surface has a density of discrete sites of about 100, about 200, about 300, about 400, about 500, about 600, about 700, about 800, about 900, about 1,000, about 2,000, about 3,000, about 4,000, about 5,000, about 6,000, about 7,000, about 8,000, about 9,000, about 10,000, about 20,000, about 40,000, about 60,000, about 80,000, about 100,000, or about 500,000 sites per 1 mm². In some embodiments, the surface has a density of discrete sites of at least about 200, at least about 300, at least about 400, at least about 500, at least about 600, at least about 700, at least about 800, at least about 900, at least about 1,000, at least about 2,000, at least about 3,000, at least about 4,000, at least about 5,000, at least about 6,000, at least about 7,000, at least about 8,000, at least about 9,000, at least about 10,000, at least about 20,000, at least about 40,000, at least about 60,000, at least about 80,000, at least about 100,000, or at least about 500,000 sites per 1 mm².

Figure 22A:
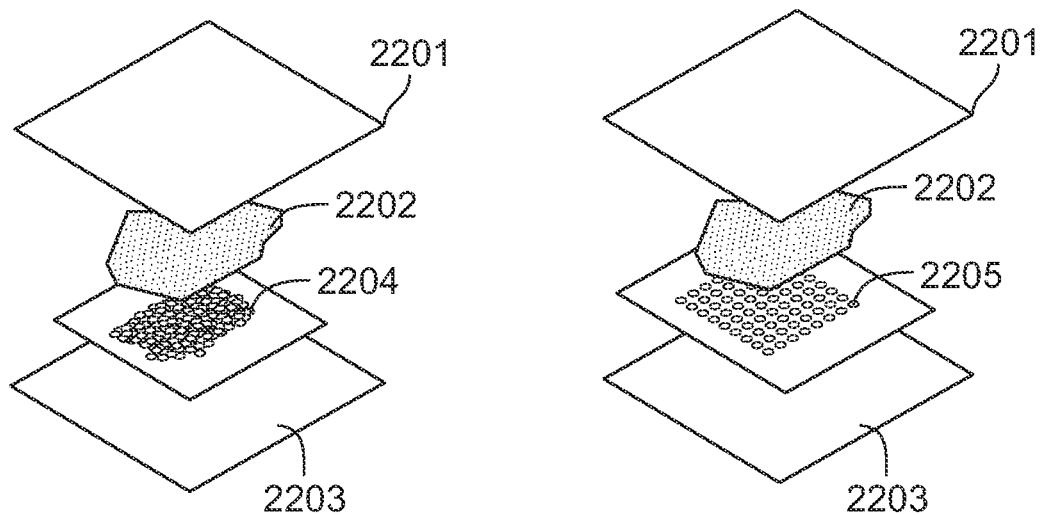
FIG. 22A-B are schematics illustrating expanded (FIG. 22A) and side views (FIG. 22B) of an electrophoretic transfer system configured to direct transcript analytes toward a spatially-barcoded capture probe array.
Figure 22B:
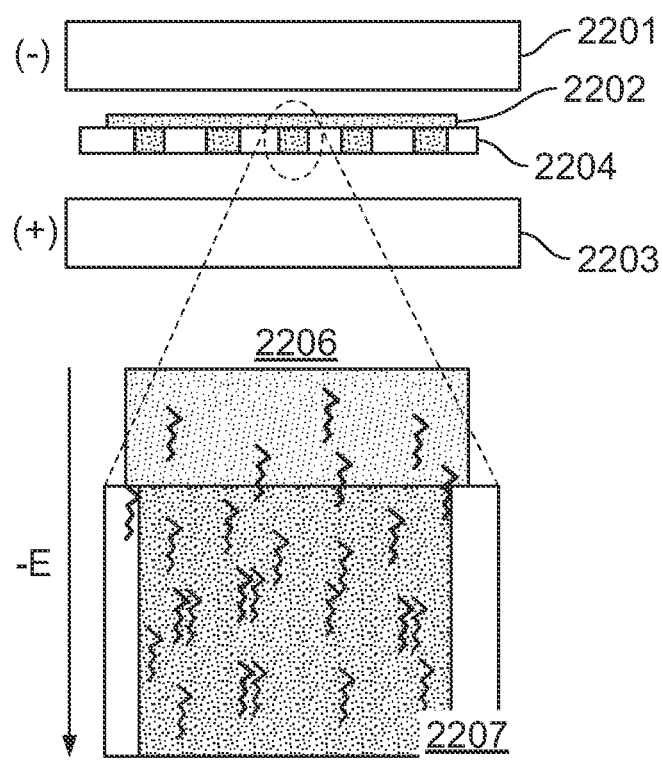

Schematics illustrating an electrophoretic transfer system configured to direct nucleic acid analytes (e.g., mRNA transcripts) toward a spatially-barcoded capture probe array are shown in FIG. 22A and FIG. 22B. In this exemplary configuration of an electrophoretic system, a sample 2202 is sandwiched between the cathode 2201 and the spatially-barcoded capture probe array 2204, 2205, and the spatially-barcoded capture probe array 2204, 2205 is sandwiched between the sample 2202 and the anode 2203, such that the sample 2202 is in contact with the spatially-barcoded capture probes 2207. When an electric field is applied to the electrophoretic transfer system, negatively charged nucleic acid analytes 2206 will be pulled toward the positively charged anode 2203 and into the spatially-barcoded array 2204, 2205 containing the spatially-barcoded capture probes 2207. The spatially-barcoded capture probes 2207 interact with the nucleic acid analytes (e.g., mRNA transcripts hybridize to spatially-barcoded nucleic acid capture probes forming DNA/RNA hybrids) 2207, making the analyte capture more efficient. The electrophoretic system set-up may change depending on the target analyte. For example, proteins may be positive, negative, neutral, or polar depending on the protein as well as other factors (e.g., isoelectric point, solubility, etc.). The skilled practitioner has the knowledge and experience to arrange the electrophoretic transfer system to facilitate capture of a particular target analyte.

Figure 23:
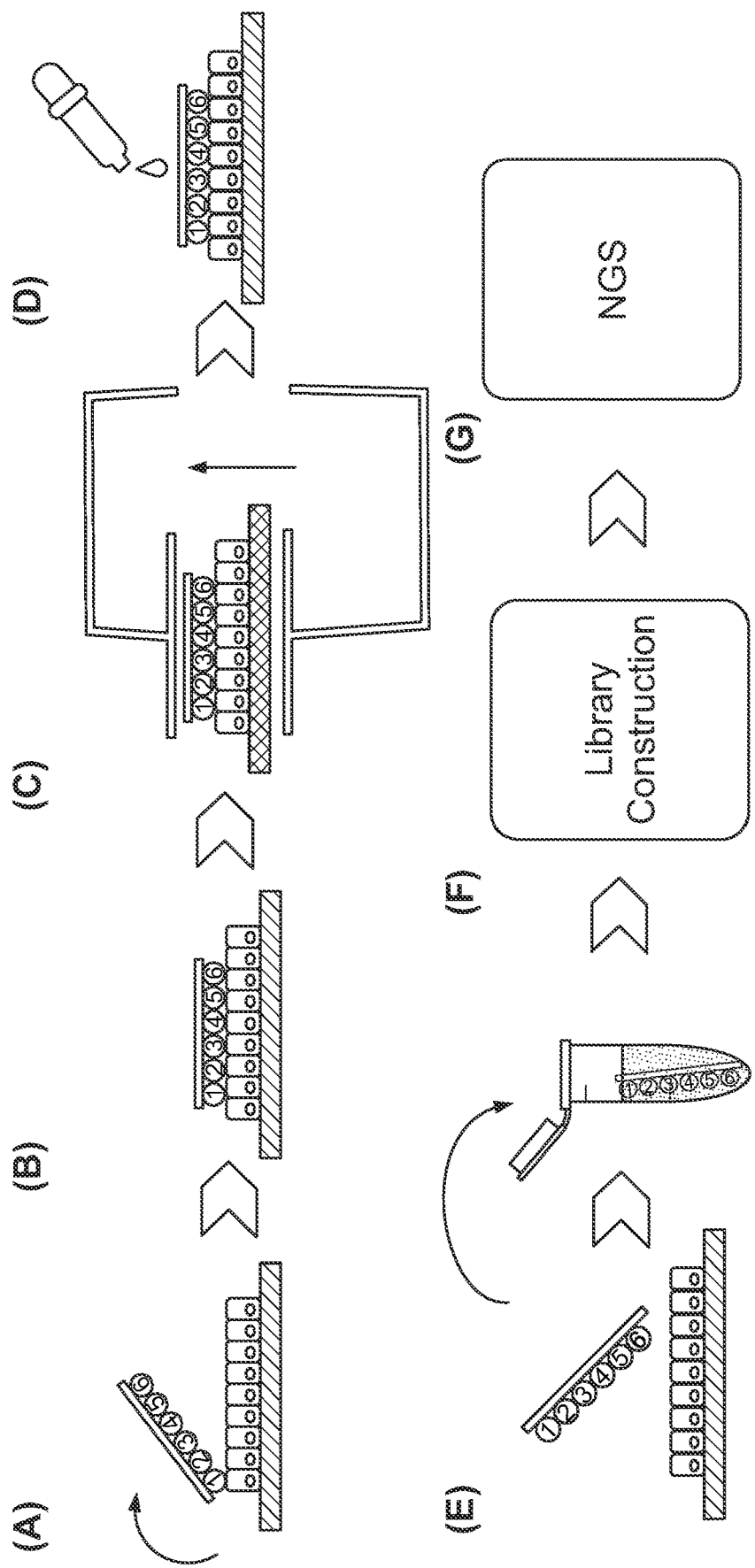
FIG. 23 is a schematic illustrating an exemplary workflow protocol utilizing an electrophoretic transfer system.

FIG. 23 is an illustration showing an exemplary workflow protocol utilizing an electrophoretic transfer system. In the example, Panel A depicts a flexible spatially-barcoded feature array being contacted with a sample. The sample can be a flexible array, wherein the array is immobilized on a hydrogel, membrane, or other flexible substrate. Panel B depicts contact of the array with the sample and imaging of the array-sample assembly. The image of the sample/array assembly can be used to verify sample placement, choose a region of interest, or any other reason for imaging a sample on an array as described herein. Panel C depicts application of an electric field using an electrophoretic transfer system to aid in efficient capture of a target analyte. Here, negatively charged mRNA target analytes migrate toward the positively charged anode. Panel D depicts application of reverse transcription reagents and first strand cDNA synthesis of the captured target analytes. Panel E depicts array removal and preparation for library construction (Panel F) and next-generation sequencing (Panel G).

Spatial analysis methodologies and compositions described herein can provide a vast amount of analyte and/or expression data for a variety of analytes within a biological sample at high spatial resolution, while retaining native spatial context. Spatial analysis methods and compositions can include, e.g., the use of a capture probe including a spatial barcode (e.g., a nucleic acid sequence that provides information as to the location or position of an analyte within a cell or a tissue sample (e.g., mammalian cell or a mammalian tissue sample) and a capture domain that is capable of binding to an analyte (e.g., a protein and/or a nucleic acid) produced by and/or present in a cell. Spatial analysis methods and compositions can also include the use of a capture probe having a capture domain that captures an intermediate agent for indirect detection of an analyte. For example, the intermediate agent can include a nucleic acid sequence (e.g., a barcode) associated with the intermediate agent. Detection of the intermediate agent is therefore indicative of the analyte in the cell or tissue sample.

Non-limiting aspects of spatial analysis methodologies and compositions are described in U.S. Pat. Nos. 10,774,374, 10,724,078, 10,480,022, 10,059,990, 10,041,949, 10,002,316, 9,879,313, 9,783,841, 9,727,810, 9,593,365, 8,951,726, 8,604,182, 7,709,198, U.S. Patent Application Publication Nos. 2020/239946, 2020/080136, 2020/0277663, 2020/024641, 2019/330617, 2019/264268, 2020/256867, 2020/224244, 2019/194709, 2019/161796, 2019/085383, 2019/055594, 2018/216161, 2018/051322, 2018/0245142, 2017/241911, 2017/089811, 2017/067096, 2017/029875, 2017/0016053, 2016/108458, 2015/000854, 2013/171621, WO 2018/091676, WO 2020/176788, Rodrigues et al., Science 363(6434):1463-1467, 2019; Lee et al., Nat. Protoc. 10(3):442-458, 2015; Trejo et al., PLoS ONE 14(2): e0212031, 2019; Chen et al., Science 348(6233):aaa6090, 2015; Gao et al., BMC Biol. 15:50, 2017; and Gupta et al., Nature Biotechnol. 36:1197-1202, 2018; the Visium Spatial Gene Expression Reagent Kits User Guide (e.g., Rev C, dated June 2020), and/or the Visium Spatial Tissue Optimization Reagent Kits User Guide (e.g., Rev C, dated July 2020), both of which are available at the 10× Genomics Support Documentation website, and can be used herein in any combination. Further non-limiting aspects of spatial analysis methodologies and compositions are described herein.

Some general terminology that may be used in this disclosure can be found in Section (I)(b) of WO 2020/176788 and/or U.S. Patent Application Publication No. 2020/0277663. Typically, a "barcode" is a label, or identifier, that conveys or is capable of conveying information (e.g., information about an analyte in a sample, a bead, and/or a capture probe). A barcode can be part of an analyte, or independent of an analyte. A barcode can be attached to an analyte. A particular barcode can be unique relative to other barcodes. For the purpose of this disclosure, an "analyte" can include any biological substance, structure, moiety, or component to be analyzed. The term "target" can similarly refer to an analyte of interest.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral proteins (e.g., viral capsid, viral envelope, viral coat, viral accessory, viral glycoproteins, viral spike, etc.), extracellular and intracellular proteins, antibodies, and antigen binding fragments. In some embodiments, the analyte(s) can be localized to subcellular location(s), including, for example, organelles, e.g., mitochondria, Golgi apparatus, endoplasmic reticulum, chloroplasts, endocytic vesicles, exocytic vesicles, vacuoles, lysosomes, etc. In some embodiments, analyte(s) can be peptides or proteins, including without limitation antibodies and enzymes. Additional examples of analytes can be found in Section (I)(c) of WO 2020/176788 and/or U.S. Patent Application Publication No. 2020/0277663. In some embodiments, an analyte can be detected indirectly, such as through detection of an intermediate agent, for example, a ligation product or an analyte capture agent (e.g., an oligonucleotide-conjugated antibody), such as those described herein.

A "biological sample" is typically obtained from the subject for analysis using any of a variety of techniques including, but not limited to, biopsy, surgery, and laser capture microscopy (LCM), and generally includes cells and/or other biological material from the subject. In some embodiments, a biological sample can be a tissue section. In some embodiments, a biological sample can be a fixed and/or stained biological sample (e.g., a fixed and/or stained tissue section). Non-limiting examples of stains include histological stains (e.g., hematoxylin and/or eosin) and immunological stains (e.g., fluorescent stains). In some embodiments, a biological sample (e.g., a fixed and/or stained biological sample) can be imaged. Biological samples are also described in Section (I)(d) of WO 2020/176788 and/or U.S. Patent Application Publication No. 2020/0277663.

In some embodiments, a biological sample is permeabilized with one or more permeabilization reagents. For example, permeabilization of a biological sample can facilitate analyte capture. Exemplary permeabilization agents and conditions are described in Section (I)(d)(ii)(13) or the Exemplary Embodiments Section of WO 2020/176788 and/or U.S. Patent Application Publication No. 2020/0277663.

Array-based spatial analysis methods involve the transfer of one or more analytes from a biological sample to an array of features on a substrate, where each feature is associated with a unique spatial location on the array. Subsequent analysis of the transferred analytes includes determining the identity of the analytes and the spatial location of the analytes within the biological sample. The spatial location of an analyte within the biological sample is determined based on the feature to which the analyte is bound (e.g., directly or indirectly) on the array, and the feature's relative spatial location within the array.

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe includes a barcode (e.g., a spatial barcode and/or a unique molecular identifier (UMI)) and a capture domain). In some embodiments, a capture probe can include a cleavage domain and/or a functional domain (e.g., a primer-binding site, such as for next-generation sequencing (NGS)). See, e.g., Section (II)(b) (e.g., subsections (i)-(vi)) of WO 2020/176788 and/or U.S. Patent Application Publication No. 2020/0277663. Generation of capture probes can be achieved by any appropriate method, including those described in Section (II)(d)(ii) of WO 2020/176788 and/or U.S. Patent Application Publication No. 2020/0277663.

In some embodiments, more than one analyte type (e.g., nucleic acids and proteins) from a biological sample can be detected (e.g., simultaneously or sequentially) using any appropriate multiplexing technique, such as those described in Section (IV) of WO 2020/176788 and/or U.S. Patent Application Publication No. 2020/0277663.

In some embodiments, detection of one or more analytes (e.g., protein analytes) can be performed using one or more analyte capture agents. As used herein, an "analyte capture agent" refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) an analyte capture sequence. As used herein, the term "analyte binding moiety barcode" refers to a barcode that is associated with or otherwise identifies the analyte binding moiety. As used herein, the term "analyte capture sequence" refers to a region or moiety configured to hybridize to, bind to, couple to, or otherwise interact with a capture domain of a capture probe. In some cases, an analyte binding moiety barcode (or portion thereof) may be able to be removed (e.g., cleaved) from the analyte capture agent. Additional description of analyte capture agents can be found in Section (II)(b)(ix) of WO 2020/176788 and/or Section (II)(b)(viii) U.S. Patent Application Publication No. 2020/0277663.

There are at least two methods to associate a spatial barcode with one or more neighboring cells, such that the spatial barcode identifies the one or more cells, and/or contents of the one or more cells, as associated with a particular spatial location. One method is to promote analytes or analyte proxies (e.g., intermediate agents) out of a cell and towards a spatially-barcoded array (e.g., including spatially-barcoded capture probes). Another method is to cleave spatially-barcoded capture probes from an array and promote the spatially-barcoded capture probes towards and/ or into or onto the biological sample.

In some cases, capture probes may be configured to prime, replicate, and consequently yield optionally barcoded extension products from a template (e.g., a DNA or RNA template, such as an analyte or an intermediate agent (e.g., a ligation product or an analyte capture agent), or a portion thereof), or derivatives thereof (see, e.g., Section (II)(b)(vii) of WO 2020/176788 and/or U.S. Patent Application Publication No. 2020/0277663 regarding extended capture probes). In some cases, capture probes may be configured to form ligation products with a template (e.g., a DNA or RNA template, such as an analyte or an intermediate agent, or portion thereof), thereby creating ligations products that serve as proxies for a template.

As used herein, an "extended capture probe" refers to a capture probe having additional nucleotides added to the terminus (e.g., 3' or 5' end) of the capture probe thereby extending the overall length of the capture probe. For example, an "extended 3' end" indicates additional nucleotides were added to the most 3' nucleotide of the capture probe to extend the length of the capture probe, for example, by polymerization reactions used to extend nucleic acid molecules including templated polymerization catalyzed by a polymerase (e.g., a DNA polymerase or a reverse transcriptase). In some embodiments, extending the capture probe includes adding to a 3' end of a capture probe a nucleic acid sequence that is complementary to a nucleic acid sequence of an analyte or intermediate agent specifically bound to the capture domain of the capture probe. In some embodiments, the capture probe is extended using reverse transcription. In some embodiments, the capture probe is extended using one or more DNA polymerases. The extended capture probes include the sequence of the capture probe and the sequence of the spatial barcode of the capture probe.

In some embodiments, extended capture probes are amplified (e.g., in bulk solution or on the array) to yield quantities that are sufficient for downstream analysis, e.g., via DNA sequencing. In some embodiments, extended capture probes (e.g., DNA molecules) act as templates for an amplification reaction (e.g., a polymerase chain reaction).

Additional variants of spatial analysis methods, including in some embodiments, an imaging step, are described in Section (II)(a) of WO 2020/176788 and/or U.S. Patent Application Publication No. 2020/0277663. Analysis of captured analytes (and/or intermediate agents or portions thereof), for example, including sample removal, extension of capture probes, sequencing (e.g., of a cleaved extended capture probe and/or a cDNA molecule complementary to an extended capture probe), sequencing on the array (e.g., using, for example, in situ hybridization or in situ ligation approaches), temporal analysis, and/or proximity capture, is described in Section (II)(g) of WO 2020/176788 and/or U.S. Patent Application Publication No. 2020/0277663. Some quality control measures are described in Section (II)(h) of WO 2020/176788 and/or U.S. Patent Application Publication No. 2020/0277663.

Spatial information can provide information of biological and/or medical importance. For example, the methods and compositions described herein can allow for: identification of one or more biomarkers (e.g., diagnostic, prognostic, and/or for determination of efficacy of a treatment) of a disease or disorder; identification of a candidate drug target for treatment of a disease or disorder; identification (e.g., diagnosis) of a subject as having a disease or disorder; identification of stage and/or prognosis of a disease or disorder in a subject; identification of a subject as having an increased likelihood of developing a disease or disorder; monitoring of progression of a disease or disorder in a subject; determination of efficacy of a treatment of a disease or disorder in a subject; identification of a patient subpopulation for which a treatment is effective for a disease or disorder; modification of a treatment of a subject with a disease or disorder; selection of a subject for participation in a clinical trial; and/or selection of a treatment for a subject with a disease or disorder.

Spatial information can provide information of biological importance. For example, the methods and compositions described herein can allow for: identification of transcriptome and/or proteome expression profiles (e.g., in healthy and/or diseased tissue); identification of multiple analyte types in close proximity (e.g., nearest neighbor analysis); determination of up- and/or down-regulated genes and/or proteins in diseased tissue; characterization of tumor microenvironments; characterization of tumor immune responses; characterization of cells types and their co-localization in tissue; and identification of genetic variants within tissues (e.g., based on gene and/or protein expression profiles associated with specific disease or disorder biomarkers).

Typically, for spatial array-based methods, a substrate functions as a support for direct or indirect attachment of capture probes to features of the array. A "feature" is an entity that acts as a support or repository for various molecular entities used in spatial analysis. In some embodiments, some or all of the features in an array are functionalized for analyte capture. Exemplary substrates are described in Section (II)(c) of WO 2020/176788 and/or U.S. Patent Application Publication No. 2020/0277663. Exemplary features and geometric attributes of an array can be found in Sections (II)(d)(i), (II)(d)(iii), and (II)(d)(iv) of WO 2020/176788 and/or U.S. Patent Application Publication No. 2020/ 0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) comprising capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No. 2020/0277663.

In some cases, spatial analysis can be performed by attaching and/or introducing a molecule (e.g., a peptide, a lipid, or a nucleic acid molecule) having a barcode (e.g., a spatial barcode) to a biological sample (e.g., to a cell in a biological sample). In some embodiments, a plurality of molecules (e.g., a plurality of nucleic acid molecules) having a plurality of barcodes (e.g., a plurality of spatial barcodes) are introduced to a biological sample (e.g., to a plurality of cells in a biological sample) for use in spatial analysis. In some embodiments, after attaching and/or introducing a molecule having a barcode to a biological sample, the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

In some cases, spatial analysis can be performed by detecting multiple oligonucleotides that hybridize to an analyte. In some instances, for example, spatial analysis can be performed using RNA-templated ligation (RTL). Methods of RTL have been described previously. See, e.g., Credle et al., *Nucleic Acids Res.* 2017 Aug. 21; 45(14):e128. Typically, RTL includes hybridization of two oligonucleotides to adjacent sequences on an analyte (e.g., an RNA molecule, such as an mRNA molecule). In some instances, the oligonucleotides are DNA molecules. In some instances, one of the oligonucleotides includes at least two ribonucleic acid bases at the 3' end and/or the other oligonucleotide includes a phosphorylated nucleotide at the 5' end. In some instances, one of the two oligonucleotides includes a capture domain (e.g., a poly(A) sequence, a non-homopolymeric sequence). After hybridization to the analyte, a ligase (e.g., SplintR ligase) ligates the two oligonucleotides together, creating a ligation product. In some instances, the two oligonucleotides hybridize to sequences that are not adjacent to one another. For example, hybridization of the two oligonucleotides creates a gap between the hybridized oligonucleotides. In some instances, a polymerase (e.g., a DNA polymerase) can extend one of the oligonucleotides prior to ligation. After ligation, the ligation product is released from the analyte. In some instances, the ligation product is released using an endonuclease (e.g., RNAse H). The released ligation product can then be captured by capture probes (e.g., instead of direct capture of an analyte) on an array, optionally amplified, and sequenced, thus determining the location and optionally the abundance of the analyte in the biological sample.

During analysis of spatial information, sequence information for a spatial barcode associated with an analyte is obtained, and the sequence information can be used to provide information about the spatial distribution of the analyte in the biological sample. Various methods can be used to obtain the spatial information. In some embodiments, specific capture probes and the analytes they capture are associated with specific locations in an array of features on a substrate. For example, specific spatial barcodes can be associated with specific array locations prior to array fabrication, and the sequences of the spatial barcodes can be stored (e.g., in a database) along with specific array location information, so that each spatial barcode uniquely maps to a particular array location.

Alternatively, specific spatial barcodes can be deposited at predetermined locations in an array of features during fabrication such that at each location, only one type of spatial barcode is present so that spatial barcodes are uniquely associated with a single feature of the array. Where necessary, the arrays can be decoded using any of the methods described herein so that spatial barcodes are uniquely associated with array feature locations, and this mapping can be stored as described above.

When sequence information is obtained for capture probes and/or analytes during analysis of spatial information, the locations of the capture probes and/or analytes can be determined by referring to the stored information that uniquely associates each spatial barcode with an array feature location. In this manner, specific capture probes and captured analytes are associated with specific locations in the array of features. Each array feature location represents a position relative to a coordinate reference point (e.g., an array location, a fiducial marker) for the array. Accordingly, each feature location has an "address" or location in the coordinate space of the array.

Some exemplary spatial analysis workflows are described in the Exemplary Embodiments section of WO 2020/176788 and/or U.S. Patent Application Publication No. 2020/0277663. See, for example, the Exemplary embodiment starting with "In some non-limiting examples of the workflows described herein, the sample can be immersed . . ." of WO 2020/176788 and/or U.S. Patent Application Publication No. 2020/0277663. See also, e.g., the Visium Spatial Gene Expression Reagent Kits User Guide (e.g., Rev C, dated June 2020), and/or the Visium Spatial Tissue Optimization Reagent Kits User Guide (e.g., Rev C, dated July 2020).

In some embodiments, spatial analysis can be performed using dedicated hardware and/or software, such as any of the systems described in Sections (II)(e)(ii) and/or (V) of WO 2020/176788 and/or U.S. Patent Application Publication No. 2020/0277663, or any of one or more of the devices or methods described in Sections Control Slide for Imaging, Methods of Using Control Slides and Substrates for, Systems of Using Control Slides and Substrates for Imaging, and/or Sample and Array Alignment Devices and Methods, Informational labels of WO 2020/123320.

Suitable systems for performing spatial analysis can include components such as a chamber (e.g., a flow cell or sealable, fluid-tight chamber) for containing a biological sample. The biological sample can be mounted for example, in a biological sample holder. One or more fluid chambers can be connected to the chamber and/or the sample holder via fluid conduits, and fluids can be delivered into the chamber and/or sample holder via fluidic pumps, vacuum sources, or other devices coupled to the fluid conduits that create a pressure gradient to drive fluid flow. One or more valves can also be connected to fluid conduits to regulate the flow of reagents from reservoirs to the chamber and/or sample holder.

The systems can optionally include a control unit that includes one or more electronic processors, an input interface, an output interface (such as a display), and a storage unit (e.g., a solid state storage medium such as, but not limited to, a magnetic, optical, or other solid state, persistent, writeable and/or re-writeable storage medium). The control unit can optionally be connected to one or more remote devices via a network. The control unit (and components thereof) can generally perform any of the steps and functions described herein. Where the system is connected to a remote device, the remote device (or devices) can perform any of the steps or features described herein. The systems can optionally include one or more detectors (e.g., CCD, CMOS) used to capture images. The systems can also optionally include one or more light sources (e.g., LED-based, diode-based, lasers) for illuminating a sample, a substrate with features, analytes from a biological sample captured on a substrate, and various control and calibration media.

The systems can optionally include software instructions encoded and/or implemented in one or more of tangible storage media and hardware components such as application specific integrated circuits. The software instructions, when executed by a control unit (and in particular, an electronic processor) or an integrated circuit, can cause the control unit, integrated circuit, or other component executing the software instructions to perform any of the method steps or functions described herein.

In some cases, the systems described herein can detect (e.g., register an image) the biological sample on the array. Exemplary methods to detect the biological sample on an array are described in PCT Application No. 2020/061064 and/or U.S. patent application Ser. No. 16/951,854.

Prior to transferring analytes from the biological sample to the array of features on the substrate, the biological sample can be aligned with the array. Alignment of a biological sample and an array of features including capture probes can facilitate spatial analysis, which can be used to detect differences in analyte presence and/or level within different positions in the biological sample, for example, to generate a three-dimensional map of the analyte presence and/or level. Exemplary methods to generate a two- and/or three-dimensional map of the analyte presence and/or level are described in PCT Application No. 2020/053655 and spatial analysis methods are generally described in WO 2020/061108 and/or U.S. patent application Ser. No. 16/951,864.

In some cases, a map of analyte presence and/or level can be aligned to an image of a biological sample using one or more fiducial markers, e.g., objects placed in the field of view of an imaging system which appear in the image produced, as described in the Substrate Attributes Section, Control Slide for Imaging Section of WO 2020/123320, PCT Application No. 2020/061066, and/or U.S. patent application Ser. No. 16/951,843. Fiducial markers can be used as a point of reference or measurement scale for alignment (e.g., to align a sample and an array, to align two substrates, to determine a location of a sample or array on a substrate relative to a fiducial marker) and/or for quantitative measurements of sizes and/or distances.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An electrophoretic system for analyte migration, the system
   a substrate including a plurality of regions, each region configured to be electrically conductive, each region configured to comprise one or more capture probes and a biological sample comprising an analyte, wherein the substrate includes a first electrode contact, the first electrode contact being electrically connected to at least one of the plurality of regions, the substrate including a conductive material, the conductive material including at least one of tin oxide (TO), indium tin oxide (ITO), a transparent conductive oxide (TCO), aluminum doped zinc oxide (AZO), fluorine doped tin oxide (FTO), or any combination thereof;
   a substrate cassette configured to be disposed at the substrate and including a plurality of apertures corresponding to the plurality of regions of the substrate, the plurality of apertures configured to define a plurality of buffer chambers comprising the plurality of regions of the substrate, wherein the substrate cassette comprises a connection interface electrically coupled to the first electrode contact of the substrate;
   a cathode assembly including a plurality of electrodes positioned within the plurality of buffer chambers of the substrate cassette, respectively, wherein the cathode assembly includes a second electrode contact, the second electrode contact being electrically connected to at least one of the plurality of electrodes; and
   a power supply electrically connected with the first electrode contact of the substrate at the connection interface of the substrate cassette, and electrically connected with the second electrode contact of the cathode assembly, the power supply configured to generate an electric field between the plurality of regions and the plurality of electrodes, respectively, such that the analyte in the biological sample moves toward the one or more capture probes on the substrate.

2. The electrophoretic system of claim 1, wherein the plurality of buffer chambers are configured to receive a buffer.

3. The electrophoretic system of claim 1, further comprising:
a light configured to illuminate the plurality of regions.

4. The electrophoretic system of claim 1, further comprising:
a first contact pin electrically attached to the substrate and providing the first electrode contact;
wherein the substrate cassette includes:
a body defining a cavity configured to receive the substrate,
wherein the connection interface of the substrate cassette includes a contact hole defined at the body and configured to expose the first contact pin therethrough;
wherein the body includes a main face and a lateral face extending from a periphery of the main face;
wherein the plurality of the apertures are defined at the main face of the body; and
wherein the contact hole is defined at the main face.

5. The electrophoretic system of claim 1, wherein the substrate cassette includes:
a body defining a cavity configured to receive the substrate; and
a contact pin extending through a wall of the body and having a first end and a second end opposite to the first end, the first end arranged exterior of the body, and the second end arranged interior of the body and configured to electrically contact with the first electrode contact of the substrate.

6. The electrophoretic system of claim 5, further comprising:
a contact bracket that electrically engages with the substrate and provides the first electrode contact of the substrate,
wherein the second end of the contact pin is configured to electrically contact with the contact bracket.

7. The electrophoretic system of claim 5, further comprising:
a system housing including the power supply;
a cassette tray that extends from the system housing and is configured to receive the substrate cassette thereon; and
a cassette cover that extends from the system housing above the cassette tray and includes the cathode assembly, wherein the plurality of electrodes project from the cassette cover toward the plurality of buffer chambers of the substrate cassette, the cassette cover further including:
an anode connector configured to electrically engage with the contact pin of the substrate cassette.

8. The electrophoretic system of claim 1, wherein the substrate cassette includes a second aperture corresponding to the first electrode contact of the substrate and configured to define a second buffer chamber on the first electrode contact of the substrate,
wherein the plurality of buffer chambers are configured to contain a first buffer, and
wherein the second buffer chamber is configured to contain a second buffer different from the first buffer;
wherein the second buffer has an electrolyte strength greater than the first buffer;
wherein the cathode assembly includes:
a cathode body configured to position at least partially on the substrate cassette, wherein the plurality of electrodes projecting from the cathode body and configured to position within the plurality of buffer chambers, respectively; and
a second electrode projecting from the cathode body and configured to position within the second buffer chamber.

9. The electrophoretic system of claim 8, wherein the cathode body includes:
an anode contact that is electrically connected to the second electrode,
wherein the power supply is electrically connected to the anode contact of the cathode body so that the power supply is electrically connected with the first electrode contact of the substrate via the second electrode that positions within the second buffer chamber containing the second buffer on the first electrode contact of the substrate.

10. The electrophoretic system of claim 1, wherein the substrate cassette includes:
a cassette body defining a cavity configured to receive the substrate, wherein the cassette body includes the cathode assembly such that the plurality of electrodes are configured to position within the plurality of buffer chambers; and
a plurality of cathode contact pins extending through a wall of the cassette body and electrically contacting with the second electrode contact such that a cathode contact pin of the cathode contact pins is electrically connected to the at least one of the plurality of electrodes;
wherein each of the plurality of electrodes includes at least one of a conductive wire, a conductive rod, or an array of conductive wires; and
wherein each of the plurality of electrodes includes a conductive plate at a distal end of the at least one of the conductive wire, the conductive rod, or the array of conductive wires.

11. The electrophoretic system of claim 10, wherein the cassette body includes:
an anode contact pin extending through the wall of the cassette body and having a first end and a second end opposite to the first end, the first end arranged exterior of the cassette body and the second end arranged interior of the cassette body and configured to electrically contact with the first electrode contact of the substrate.

12. The electrophoretic system of claim 11, further comprising:
a contact bracket that electrically engages with the substrate and provides the first electrode contact of the substrate,
wherein the second end of the anode contact pin is configured to electrically contact with the contact bracket.

13. The electrophoretic system of claim 1, wherein the substrate cassette includes:
a body defining a cavity configured to partially receive the substrate,
wherein the connection interface of the substrate cassette includes a slit defined at the body and configured for the substrate to partially extend out from the body such that the first electrode contact of the substrate is positioned outside the body;
wherein the body includes the cathode assembly such that the plurality of electrodes are configured to position within the plurality of buffer chambers,
wherein the substrate cassette further includes:
a cathode contact pin extending through a wall of the body and electrically contacting with the second electrode contact such that the cathode contact pin is electrically connected to the at least one of the plurality of electrodes;

an anode contact pin extending from the body; and a conductive wire having a first end and an opposite second end, the first end electrically connected to the anode contact pin, and the second end electrically connected to the first electrode contact that is positioned outside the body.

14. The electrophoretic system of claim 1, wherein the substrate cassette includes a body defining a cavity configured to partially receive the substrate, wherein the connection interface of the substrate cassette includes a slit defined at the body and configured for the substrate to partially extend out from the body such that the first electrode contact of the substrate is positioned outside the body; and the electrophoretic system further comprising:

an anode cassette body defining a cavity configured to receive the first electrode contact of the substrate that is positioned outside the body of the substrate cassette; and an anode contact pin extending through a wall of the anode cassette body and having a first end and a second end opposite to the first end, the first end arranged exterior of the anode cassette body and the second end arranged interior of the anode cassette body and configured to electrically contact with the first electrode contact of the substrate.

15. A method for analyte migration, the method comprising:

loading a substrate comprising capture probes with a substrate cassette into an electrophoresis instrument, the substrate cassette including a plurality of buffer chambers, the substrate including a plurality of regions each comprising one or more capture probes and a biological sample containing analytes;

arranging a cathode to place a plurality of electrodes within the plurality of buffer chambers, respectively;

electrically connecting a power supply to the substrate;

electrically connecting the power supply to the cathode;

applying a first voltage between the substrate and the cathode;

detecting an output parameter in response to the first voltage;

determining whether the output parameter meets a threshold value; and based on the output parameter meeting the threshold value, applying a second voltage to generate electric fields between the plurality of regions of the substrate and the plurality of electrodes through the plurality of buffer chambers to cause the analytes in the biological sample to move toward the capture probes on the substrate.

16. The method of claim 15, wherein the output parameter is an impedance.

17. The method of claim 15, wherein the threshold value is indicative of a property of at least one of an electrical connection of the power supply to the substrate, an electrical connection of the power supply to the cathode, or an electrical property of one or more buffers within the plurality of buffer chambers.

18. The method of claim 15, further comprising:

based on the output parameter not meeting the threshold value, generating a notification that an electrical connection is improper; and ceasing to apply the second voltage to generate the electric fields.

19. The method of claim 15, wherein the threshold value is a predetermined range of values.

20. The method of claim 15, further comprising:

prior to loading the substrate with the substrate cassette, placing the biological sample in contact with the capture probes on the substrate;

arranging the substrate cassette onto the substrate to align a plurality of apertures of the substrate cassette with the plurality of regions of the substrate and define the plurality of buffer chambers on the plurality of regions; and supplying buffers in the plurality of buffer chambers.

* * * * *

UNITED STATES PATENT AND TRADEMARK OFFICE
CERTIFICATE OF CORRECTION

| | | |
|---|---|---|
| PATENT NO. | : 12,416,603 B2 | Page 1 of 1 |
| APPLICATION NO. | : 17/923436 | |
| DATED | : September 16, 2025 | |
| INVENTOR(S) | : Augusto Manuel Tentori et al. | |

It is certified that error appears in the above-identified patent and that said Letters Patent is hereby corrected as shown below:

In the Claims

Column 44, Line 29, in Claim 1, after "system" insert -- comprising: --.

Signed and Sealed this
Twenty-eighth Day of October, 2025

John A. Squires
*Director of the United States Patent and Trademark Office*